(12) United States Patent
Wankewycz et al.

(10) Patent No.: US 11,912,438 B2
(45) Date of Patent: Feb. 27, 2024

(54) LANDING PLATFORM WITH IMPROVED CHARGING FOR UNMANNED VEHICLES

(71) Applicant: H3 Dynamics Holdings Pte. Ltd., Singapore (SG)

(72) Inventors: Taras Wankewycz, Singapore (SG); Matthew Mehmet Crawford, Singapore (SG); Cher Chuan Lee, Singapore (SG); Bo Han, Singapore (SG); Harshavardhan Thakar, Singapore (SG)

(73) Assignee: H3 Dynamics Holdings Pte. Ltd., Singapore (SG)

( * ) Notice: Subject to any disclaimer, the term of this patent is extended or adjusted under 35 U.S.C. 154(b) by 841 days.

(21) Appl. No.: 16/967,360

(22) PCT Filed: Jan. 31, 2019

(86) PCT No.: PCT/SG2019/050052
§ 371 (c)(1),
(2) Date: Aug. 4, 2020

(87) PCT Pub. No.: WO2019/151947
PCT Pub. Date: Aug. 8, 2019

(65) Prior Publication Data
US 2021/0031947 A1    Feb. 4, 2021

(30) Foreign Application Priority Data

Feb. 5, 2018  (SG) .......................... 10201800995P
Oct. 8, 2018  (SG) .......................... 10201808859S

(51) Int. Cl.
*B64F 1/36*     (2017.01)
*B60L 50/60*    (2019.01)
(Continued)

(52) U.S. Cl.
CPC .............. *B64F 1/362* (2013.01); *B60L 50/60* (2019.02); *B60L 53/10* (2019.02); *B60L 53/305* (2019.02);
(Continued)

(58) Field of Classification Search
CPC .......... B64F 1/362; B64F 1/005; B64F 1/222; B64C 39/024; B64D 27/24; B64D 47/08;
(Continued)

(56) References Cited

U.S. PATENT DOCUMENTS

2015/0179388 A1\*  6/2015  Hemberg ................ H01J 29/62
                                                    250/503.1
2016/0009413 A1    1/2016  Lee et al.
(Continued)

FOREIGN PATENT DOCUMENTS

JP       2016175490       10/2016
JP       2017124758       7/2017
(Continued)

OTHER PUBLICATIONS

H3 Dynamics Holdings Pte. Ltd.; Office Action for Singapore application No. 11202007467X, dated Jun. 13, 2023, 12 pgs.
(Continued)

*Primary Examiner* — Rodney A Bonnette
(74) *Attorney, Agent, or Firm* — Taylor English Duma LLP

(57) ABSTRACT

An unmanned vehicle module can include, in some aspects, a landing platform including a landing area for receiving an unmanned vehicle, wherein the landing area includes a predetermined charging region; a first charging plate; a second charging plate, wherein the first charging plate and the second charging plate are positioned in the predetermined charging region; an electrical energy storage device for connecting electrically with the first charging plate and
(Continued)

Figure 1:
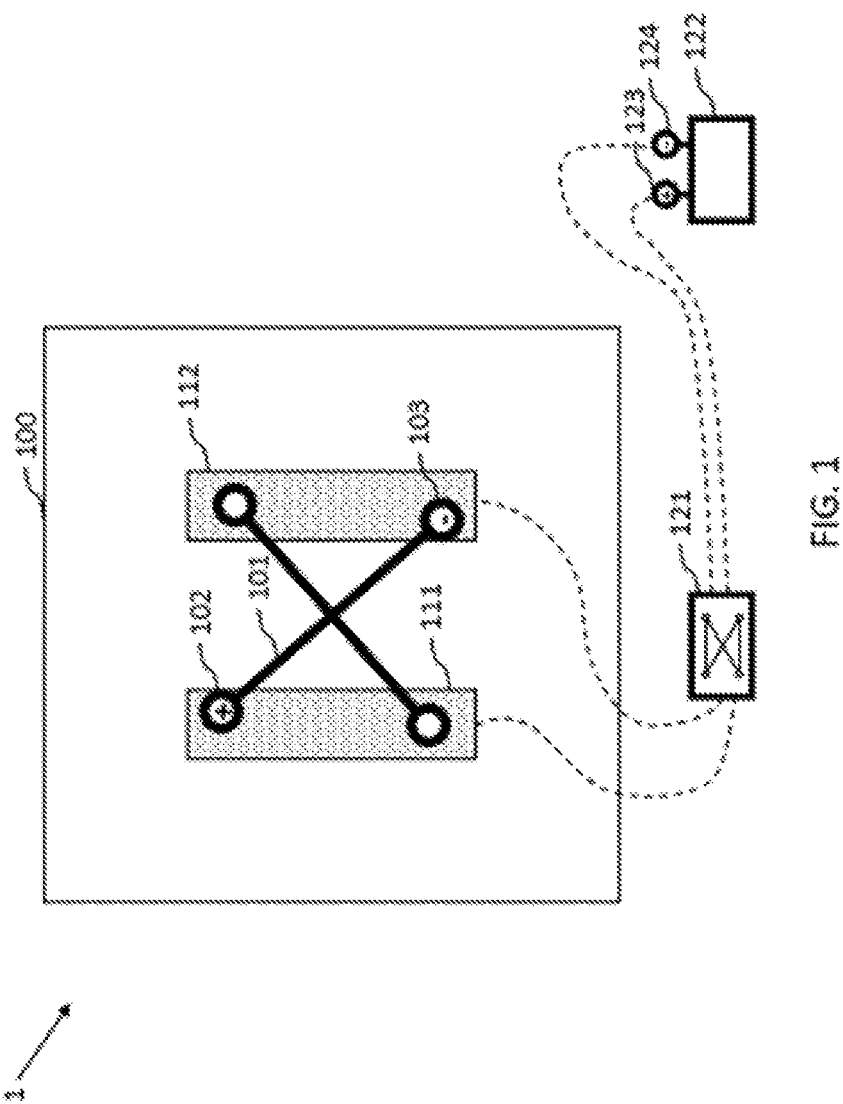

with the second charging plate; and an unmanned vehicle alignment mechanism configured to move the unmanned vehicle into the predetermined charging region; wherein the unmanned vehicle alignment mechanism includes a first beam, a second beam, a third beam, a fourth beam, and an actuation device for actuating at least two of the first beam, the second beam, the third beam, and the fourth beam to push the unmanned vehicle into the charging region.

17 Claims, 23 Drawing Sheets

(51) Int. Cl.
    *B60L 53/10*     (2019.01)
    *B60L 53/30*     (2019.01)
    *B60L 53/36*     (2019.01)
    *B60L 53/51*     (2019.01)
    *B64C 39/02*     (2023.01)
    *B64D 27/24*     (2006.01)
    *B64D 47/08*     (2006.01)
    *B64F 1/00*     (2006.01)
    *B64F 1/22*     (2006.01)
    *B64U 10/13*     (2023.01)
    *B64U 50/19*     (2023.01)
    *B64U 80/70*     (2023.01)
    *E04H 6/44*     (2006.01)

(52) U.S. Cl.
CPC ............... *B60L 53/36* (2019.02); *B60L 53/51* (2019.02); *B64C 39/024* (2013.01); *B64D 27/24* (2013.01); *B64D 47/08* (2013.01); *B64F 1/005* (2013.01); *B64F 1/222* (2013.01); *E04H 6/44* (2013.01); *B60L 2200/10* (2013.01); *B64U 10/13* (2023.01); *B64U 50/19* (2023.01); *B64U 80/70* (2023.01); *B64U 2201/20* (2023.01)

(58) Field of Classification Search
CPC ........ E04H 6/44; B60L 50/60; B60L 2200/10; B60L 53/51; B60L 53/305; B60L 53/36; B60L 53/10; B64U 10/13; B64U 2201/20; B64U 80/70; B64U 50/19
See application file for complete search history.

(56) References Cited

U.S. PATENT DOCUMENTS

| 2016/0144982 | A1* | 5/2016 | Sugumaran ............ A01D 41/12 244/108 |
| 2017/0225802 | A1 | 8/2017 | Lussier et al. |
| 2018/0092484 | A1* | 4/2018 | Lewis ..................... A47G 29/20 |
| 2019/0002127 | A1* | 1/2019 | Straus .................. G08G 5/0091 |
| 2019/0002128 | A1* | 1/2019 | Raz ........................ B64C 39/024 |
| 2019/0152326 | A1* | 5/2019 | Nishikawa .............. B60L 53/38 |
| 2019/0308724 | A1* | 10/2019 | Cooper .................. B64C 39/024 |
| 2020/0001735 | A1* | 1/2020 | Cheng .................... B64U 10/13 |

FOREIGN PATENT DOCUMENTS

| WO | 2015195175 | 12/2015 |
| WO | 2017029611 | 2/2017 |
| WO | 2017109780 | 6/2017 |

OTHER PUBLICATIONS

Wankewysz Taras; International Search Report and Written Opinion for PCT/SG2019/050052, filed Jan. 31, 2019, dated Apr. 26, 2019, 16 pgs.

H3 Dynamics Holdings Pte. Ltd.; Office Action for Korean application No. 10-2020-7025596, dated Apr. 10, 2023, 7 pgs.

H3 Dynamics Holdings Pte. Ltd.; Office Action for Japanese patent application No. 2020-542400, dated Nov. 7, 2022, 6 pgs.

\* cited by examiner

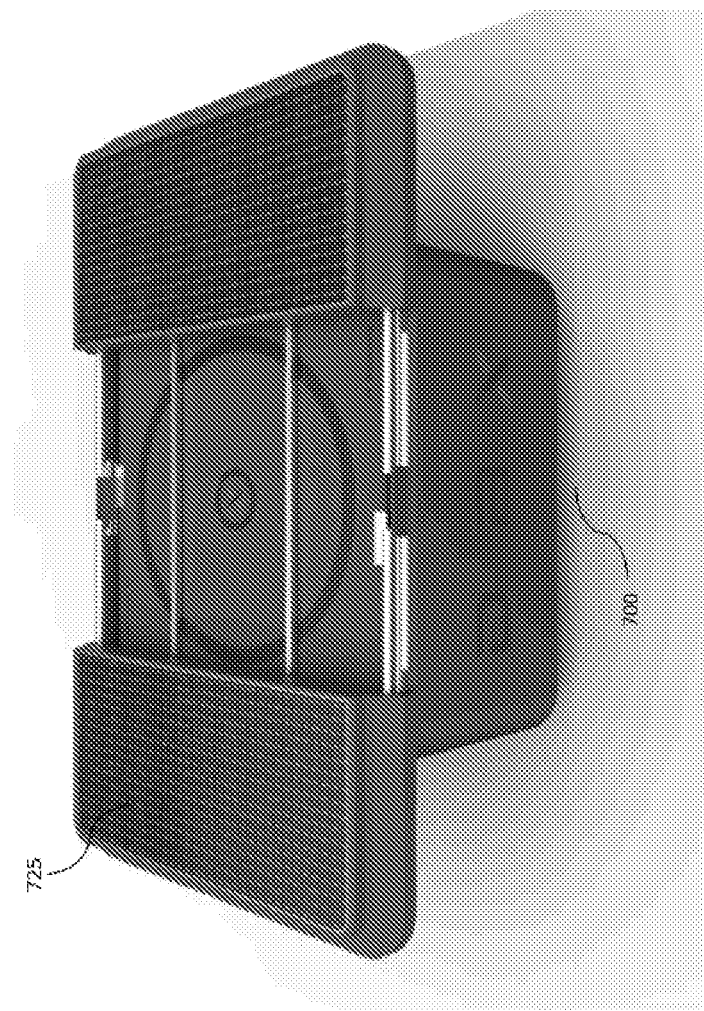
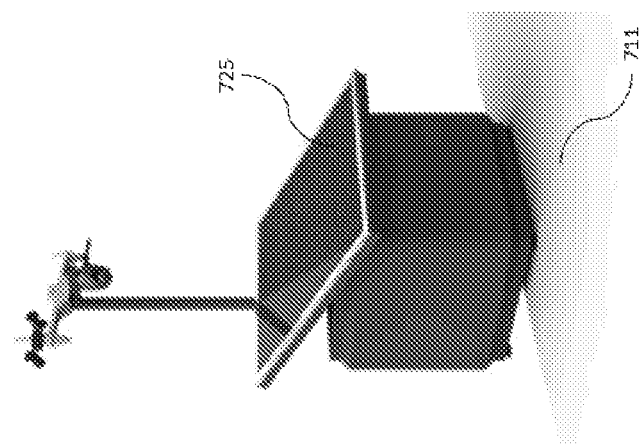
Fig. 20

LANDING PLATFORM WITH IMPROVED CHARGING FOR UNMANNED VEHICLES

The application relates to a landing platform and deployment system (which governs the launch, receiving/landing, alignment of the vehicle's charging contacts to the charging plate, charging of the energy storage medium, storing of the vehicle, etc. functions) for an unmanned vehicle (such as aerial multi-rotor, single-rotor, vertical takeoff landing vehicle that is also known as VTOL, hybrid-VTOL, fixed wing, vertically-launched vehicle, horizontally-launched vehicle, catapult-launched vehicle, hand-launched vehicle, or any other similar platform that is collectively known as "unmanned aerial vehicle" or "unmanned vehicle", or "drone") that has autonomous precision landing, automatic (or autonomous) alignment of the unmanned vehicle's charging mechanism for improved charging, and storing functionalities in addition to other relevant functions that are needed to safely deploy, control, and have all of the essential hardware for autonomous or human-piloted flight activities. The invention disclosed here is not limited to aerial vehicles, because other unmanned vehicles such as ground or underground robots, or underwater robots can also utilize the disclosed hardware and methods for deploying, charging, receiving, and storing purposes.

The recent years have seen a surge in the use of unmanned vehicles (air, ground, maritime, underground, underwater, etc.) for remote sensing, surveillance, and numerous other applications. The unmanned vehicle provides the advantage of being used in situations where manned flight is considered too risky or difficult. In order to increase the use of unmanned vehicles in the field, there is a critical need to improve their autonomous landing platform and deployment systems that have improved charging, landing, launch, storing, and all other functionalities integrated in a smart way to give to the unmanned vehicles the capacity to deploy, receive, store, and recharge with energy when needed on its own. The content of this invention/method/hardware is not limited to the unmanned vehicles with autonomous nature; other human-piloted unmanned vehicles can also benefit from the disclosed concepts and hardware.

It is an object of this application to provide an improved landing platform and deployment system with autonomous precision landing and alignment of unmanned vehicle on the landing platform and improved charging mechanisms, having the landing platform's electrical contact made with unmanned vehicle's charging mechanism automatically (or autonomously), and also providing storage for an unmanned vehicle. While it is highly desired to have such functions (deployment, landing, launching, charging, alignment for charging, charging, storing, etc.) carried out autonomously or automatically, the concepts disclosed here are also applicable to human-piloted (meaning non-autonomous) and other means controlled unmanned vehicles as this invention discloses an improved energy autonomous nature for any unmanned vehicle platforms. In order to utilize unmanned vehicles at their full potential, there is a critical need for a landing platform and deployment system with automatic charging in order to improve the charging process and potentially enable the landing platform and deployment system to carry out this process by their own. The content of this invention discloses novel strategies for improved charging mechanisms that are not only integrated into the airframe of the unmanned vehicle, but also integrated into the landing platform that is smart and facilitates precision landing to the unmanned vehicle.

Currently deployed unmanned vehicles have not been utilized to their full potential due to lack of advanced landing platforms that has smart functionalities such as autonomous precision landing, changing the orientation of the unmanned vehicle in order to match or mate the on-board charging contacts to the charging mechanism existing on the landing platform, and automatically initiate and complete the charging process.

Once the energy stored in the on-board energy storage and conversion devices of existing unmanned vehicles, the recharging of these vehicles usually requires the assistance of an operator and having operators in the field drastically limits the usage of these unmanned vehicles.

The disclosed invention provides the details of an advanced landing platform and deployment system (and iterations of the baseline system) that has the following advanced functions with full executability of the disclosed concepts: smart and precision landing for the unmanned vehicle, automatic (or autonomous) alignment of the unmanned vehicle in order to match the on-board charging contacts to the charging mechanism existing on the landing platform, self-initiating of the charging process and self-termination of the charging process, storing of the vehicle, and numerous other features that are needed to autonomously deploy, control, and store it.

The unmanned vehicle can have an onboard computer for its autonomous controlling its flight or can be piloted by a human pilot, who is on the ground or in another vehicle (whether moving or idle), can remotely control the flight of the unmanned vehicle with the help of a remote control mechanism, protocol, approach, or device. Furthermore, a virtual command center application (either web-based or application-based) can also be utilized by the pilot or operator to manage various functions of the mission such as scheduling the flight, planning the unmanned vehicle flight path for area scanning or detection, virtual teleoperation of the unmanned vehicle, and etc.

The application provides an improved self-aligning unmanned vehicle landing system to charge the on-board electrical energy storage and conversion device of the unmanned vehicle. The landing system is also designed to facilitate landing of the unmanned vehicle. The landing system comprises a polarity switch, a first contact surface electrically connected to the polarity switch, a second contact surface electrically connected to the polarity switch, a power source electrically connected to the polarity switch, a first longitudinal adjustment beam, a first lateral adjustment beam, a motor, and a transmission system connected to the motor, to the first longitudinal adjustment beam and to the first lateral adjustment beam to convert motor movement into linear movement of the longitudinal adjustment beam and of the lateral adjustment beam.

The system can be powered by an electric power supply grid, or by batteries, which can be electrically charged using solar cells, wind generators, stand-alone petrol, diesel, natural gas, bio-mass fueled gen-sets, and/or fuel cells, or any other relevant power source including the grid supply. The electric power supply grid acts a channel to transmit electricity from an electric power plant. The following power sources can also be utilized by the system: internal combustion engines, solar power, photovoltaic arrays, hydrothermal power, radioisotope or radioactive power systems, nuclear fission based power generators, thermal energy conversion devices, Stirling convertors, Brayton converters, Rankine converters, micro-miniature dynamic power converters that are integrated with radioisotope heater units, alpha/beta-voltaic energy conversion devices, bio-inspired power generation devices, etc. The content of this invention is not limited to the type of power used and with the appropriate design considerations and use of the right materials/hardware, different power sources can easily be utilized to obtain a landing platform and deployment system with improved charging properties to not only charge the unmanned vehicle's depleted power source, but the same landing platform and deployment system can also be used for landing, receiving, storing and numerous other processes that are relevant to the operation and charging of the unmanned vehicle.

The unmanned vehicle comprises a positive electrode at one bottom end of the unmanned vehicle, and a negative electrode at an opposite bottom end of the unmanned vehicle. Typically, the electrodes are located at protruding parts of the unmanned vehicle, for example at its feet. If there are multiple legs for landing such as four, then care needs to be given that these electrodes are placed on the legs that are diagonal to each other in order to prevent the electrical shorting.

The adjustment beams are moved linearly towards a center of the landing pad and hereby push the unmanned vehicle into predetermined region that is allocated for landing. Since the unmanned vehicle has an essentially square layout (though the content of this invention is not limited to square layout, with simple adjustments in the design, other layouts can also benefit from this invention), for example because it has four feet positioned on four equidistant corners of the unmanned vehicle, the unmanned vehicle is brought into an aligned position by being pushed by one of the adjustment beams. By aligning the unmanned vehicle on the landing pad, the electrodes of the unmanned vehicle can make electric contact with the contact surfaces, thereby allowing for the unmanned vehicle to be charged, i.e. a power source of the unmanned vehicle is charged. The said contact surfaces can be a part of the landing pad such as metal surfaces laminated to the surface of the landing pad, metal contacts placed or attached directly onto the surface of the landing pad, or metal structures placed separately such as beams sliding over the landing pad, and other similar approaches that allows the unmanned vehicle's charging contacts to be in physical contact with another charging point that is existing on the landing platform and deployment system.

The polarity switch is configured to electrically connect the first contact surface with the positive pole and the second contact surface in a first polarity state with the negative pole, or to electrically connect the first contact surface with the negative pole and the second contact surface with the positive pole in a second polarity state. Hereto, the polarity switch detects which pole of the unmanned vehicle's power source is connected to the first contact surface and which pole is of the unmanned vehicle's power source is connected to the second contact surface. The polarity switch can detect the polarity electrically, or detect a signal provided by the unmanned vehicle, for example a mechanic signal, a magnetic signal or an electronic signal, or any other communication method that will allow the landing platform and deployment system to recognize the orientation of the charging contacts in order to match the polarity of the terminals appropriately.

The polarity switch may also comprise a third polarity state, wherein the contact surfaces and the battery poles are electrically disconnected in order to prevent damage of the unmanned vehicle and the unmanned vehicle's power source.

Therein, the first contact surface is positioned away to the second contact surface, such that a typical electrode cannot possibly short-circuit the first contact surface and the second contact surface. The distance of the first contact surface from the second contact surface must at least be larger than the widest expanse of any unmanned vehicle electrode in use. TO clarify this point further, for example if the unmanned vehicle has four legs, on-board charging contacts need to be placed on the legs that are farthest away from each other (in this case diagonally) in order to prevent the short-circuit.

In one embodiment of the invention, the landing platform comprises a second longitudinal adjustment beam, wherein the second longitudinal adjustment beam is connected to the transmission system. The second longitudinal adjustment beam is connected to the transmission system so the motor movement can be converted to, amongst others, linear movement of the second longitudinal adjustment beam. The longitudinal adjustment beams, which are located opposite of each other, are moved towards each other. This way, the longitudinal adjustment beam cannot move the unmanned vehicle away from the center of the landing pad.

Alternatively, the landing platform comprises a second lateral adjustment beam, wherein the second lateral adjustment beam is connected to the transmission system. The second lateral adjustment beam is connected to the transmission system so the motor movement can be converted to, amongst others, linear movement of the second lateral adjustment beam. This way, the lateral adjustment beam cannot move the unmanned vehicle away from the center of the landing pad.

In a preferable embodiment of the invention, the landing platform comprises a second longitudinal adjustment beam and a second lateral adjustment beam, wherein the second longitudinal adjustment beam and the second lateral adjustment beam are connected to the transmission system. The second longitudinal adjustment beam and the second lateral adjustment beam are connected to the transmission system so the motor movement can be converted to linear movement of the all four adjustment beams. This way, the unmanned vehicle is moved towards the center of the landing pad regardless of its initial position relative to the center of the landing pad.

In one embodiment, the longitudinal adjustment beams and/or the lateral adjustment beams are guided using guide rails. By using guide rails to guide the adjustment beams, the linear movement of the adjustment beams is more stable. Therefore, even in the case that the unmanned vehicle got stuck somewhere, the adjustment beams would not lose their alignment and hence their function.

The application also provides an improved landing platform and deployment system with a cover. This landing platform and deployment system include an unmanned vehicle, a self-aligning unmanned vehicle landing system, a unmanned vehicle protection storage device, and a cover. The landing platform and deployment system are also designed to facilitate landing of the unmanned vehicle, to gather data about the environment of the unmanned vehicle using sensors, to serve as a data communications hub, and to protect the unmanned vehicle from the environment.

The self-aligning unmanned vehicle landing system is attached to the unmanned vehicle and to the unmanned vehicle protection storage device for transferring electrical energy from the storage device to the unmanned vehicle. Electrical energy for charging the on-board energy storage and conversion device of the unmanned vehicle can also be provided from a fully separated power source or a station that has its own power source such as a weather station that is a separate unit from the landing platform and deployment system and has its own power source.

The unmanned vehicle protection storage device comprises a processing unit, a network unit, a power source, interfaces for extending its capability to accept power from multiple different sources, motors, switches, etc. needed to operate the landing platform and deployment system, and at least one sensor. Preferably, the unmanned vehicle protection storage device also houses the energy storage and conversion device and the polarity switch. The said one sensor can be at least be either one of an anemometer, a temperature sensor, a weather vane, or a camera, or any other relevant sensor depending on the overall design and mission requirement for the storage device. By measuring weather sensor data, the unmanned vehicle can be supported in flight, take-off, landing, and other relevant functions for the safe operation of the unmanned vehicle. The storage device power source can then electrically charge the electrical power source of the unmanned vehicle via the charging mechanisms existing within the landing platform and deployment system and on-board of the unmanned vehicle. In other words, the storage unit power source provides electrical energy to an electrical power source of the unmanned vehicle.

The network unit can comprise any network technology usable for transmitting and receiving data, for example GSM, UMTS, LTE, WLAN, 5G, directional radio, satellite radio, DSL, or fiberglass (and the content of this invention is not limited to the examples provided herein for explanation purposes). The network unit can also comprise a number of such technologies and manage their use as needed.

The unmanned vehicle can have full autonomous nature for its flight or be controlled remotely by a user (also known as human-piloted). Alternatively, the unmanned vehicle can be guided by a computer, which is provided as an onboard computer and attached to the main body of the unmanned vehicle. Or alternatively, the unmanned vehicle can be directed remotely by a processing unit, which is provided as a standalone computer inside the unmanned vehicle protection storage device. Preferably, a combination of those alternatives is employed, such that the unmanned vehicle can maintain a stable position and fulfil simple tasks autonomously, can be remote-controlled by the processing unit provided in the unmanned vehicle protection storage device when sensor data available to the unmanned vehicle protection storage is helpful, and can be remote-controlled by a person on demand (depending on the mission needs and unmanned vehicle needs).

In one embodiment, the at least one sensor of the unmanned vehicle protection storage device comprises a camera. The unmanned vehicle further comprises a beacon unit for emitting light to form a light pattern that can be captured by the camera. The processing unit of the unmanned vehicle protection storage device is configured to direct the unmanned vehicle to land remotely based on image data from the camera, which comprises light imagery of the beacon unit. In this case, remote control by the processing unit is, for example, useful in the landing process. Then the processing unit can recognize, for example using pattern recognition such as a QR code, barcode, etc. (though the content of this invention is not limited to these examples), light emitted by the beacon unit on the image data provided by a camera on the unmanned vehicle protection storage in order to smartly manage the landing of the unmanned vehicle or provide means for precision landing by using its sensor. In summary, having a moveable landing platform and a landing code attached to the predetermined landing region such as a QR code will allow the unmanned vehicle to visually notice the pattern recognition using its on-board sensing device such a camera for the vision system and hence land precisely directly onto the predetermined landing region.

In one embodiment, the power source comprises a solar power system. A solar power system can for example be a solar panel, also known as photovoltaic panel, a battery and a current converter. Alternatively, a solar power system can be based on a solar pond, a parabolic collector and/or a solar power tower. By using a solar power system, the unmanned vehicle landing platform and deployment system become more autonomous, hence a unmanned vehicle landing platform and deployment system in a remote location can be maintained without physical contact for a longer time period than using other power sources. The solar power is provided as an example and the content of this invention is not limited to this example for is operation. There exist several other power schemes and hardware which can be utilized for the powering of the landing platform and deployment system and all of the other associated hardware disclosed within this invention.

A short list of different power sources that can be utilized by landing platform and deployment system, unmanned vehicle, weather station and all other relevant modules that are needed to operate the unmanned vehicle as follows: batteries, hydrogen fuel cell cells, internal combustion engines, solar power, photovoltaic arrays, wind power, hydrothermal power, radioisotope or radioactive power systems, nuclear fission based power generators, thermal energy conversion devices, Stirling convertors, Brayton converters, Rankine converters, micro-miniature dynamic power converters that are integrated with radioisotope heater units, alpha/beta-voltaic energy conversion devices, bio-inspired power generation devices, etc. The content of this invention is not limited to the type of power used and with the appropriate design considerations and use of the right materials/hardware, different power sources can easily be utilized to obtain a landing platform and deployment system with improved charging properties to not only charge the unmanned vehicle's depleted power source, but the same landing platform and deployment system can also be used for landing, receiving, storing and numerous other processes that are relevant to the operation and charging of the unmanned vehicle.

The unmanned vehicle includes one or more propellers and an air vehicle electrical power source. The air vehicle electrical power source provides electrical energy to the propellers. The energized propellers then move the unmanned vehicle laterally and/or longitudinally.

The unmanned vehicle is often provided with one or more rotary wings, although it can also be provided with one or more fixed wings or with one or more hybrid wings. The hybrid wings comprise both rotary and fixed wings. The content of this invention also covers the following unmanned vehicles: aerial multi-rotor, single-rotor, vertical takeoff landing vehicle that is also known as VTOL, hybrid-VTOL, fixed wing, vertically-launched vehicle, horizontally-launched vehicle, catapult-launched vehicle, hand-launched vehicle, or any other similar platform that is collectively known as "unmanned aerial vehicle" or "unmanned vehicle", or "drone". Furthermore, the content of this invention can also be implemented for the other following unmanned vehicles: ground or underground robots, or underwater robots.

The unmanned vehicle landing platform and deployment system can include a movable cover, which can be opened for allowing the unmanned vehicle to ingress into the container and to egress from the container and be closed for protecting the unmanned vehicle. The movable cover can be adapted for rotating about a hinge in order to facilitate the cleaning of the cover for snow, sand, rain, or dust could collect over the cover and may hamper its operation. The movable cover allows these contaminations to be removed when the cover opens. The cover can also have other cleaning mechanisms such as moving or static brush with bristles, liquid cleaning solvent such as water, liquid cleaning solvent such as water with a wiping device, etc. in order to clean the contaminants from the cover. The cleaning process can be done automatically or it can also be serviced by a human operator.

In an alternative embodiment, the movable cover is provided in the form of a sliding door for easy implementation.

In one embodiment, the unmanned vehicle landing platform and deployment system further comprises a cover, and the transmission system is further connected to the cover for converting motor movement into movement for opening and closing the cover. When the unmanned vehicle is not in use, it can be placed under a cover for protecting the unmanned vehicle against the surrounding weather and against animals or unauthorized persons from accessing the unmanned vehicle. In an open state, the cover can facilitate the landing of the unmanned vehicle by shielding the unmanned vehicle against wind. By moving the cover using the motor already used for the movement of the adjustment beams, the unmanned vehicle landing platform and deployment system can be more reliable, cheaper, and more compact.

The alignment mechanism existing on the landing platform and deployment system can include at least a group of plurality of plates or beams or doors for pushing the unmanned vehicle to the landing area, at least two fixed inclined walls for guiding the unmanned vehicle to the landing area and at least two moveable inclined walls for guiding the unmanned vehicle to the pre-determined landing region. These two moveable inclined walls can be represented by the moveable cover from the landing platform and deployment system (which is also called Dronebox module's opening/closing doors or moveable cover). These alignment structures provide different means of auto- or self-aligning of the unmanned vehicle. The Dronebox provides a smart unmanned vehicle nesting (or smart drone nesting) solution that automates the unmanned vehicle operations in numerous applications. The power solution or power module of the Dronebox also provides a grid-independent charging system for the unmanned vehicle's power device that eventually eliminates the need for an operator to travel to the field or remote areas for charging of the on-board power device.

The unmanned vehicle storage device can also include communication and coordination unit for communicating with storage units of other unmanned vehicle modules and with other unmanned vehicles. The processing unit can comprise storage for storing data and programs, and interfaces for exchanging data and commands.

For example, the processing unit can be ground based (meaning stored inside the storing module or weather station, or any other ground based module) and can comprise means for controlling the unmanned vehicle, such as communications means, simulation means, a flight model, and a reaction model.

Since the processing unit is on the ground, it is less restricted by space, weight, cooling, and energy restrictions. Therefore, the processing unit can have significantly more resources than the unmanned vehicle, for example energy, sensor data, and processing capabilities. Such a ground based processing unit provides several advantages. The processing unit uses wind speed and wind direction data to prepare unmanned vehicle flight instructions depending on the weather estimates and/or hyper-local data estimates, which is important, especially in weather conditions that may not be suitable for the safe operation of the unmanned vehicle prior to mission, during the mission, or after the completion of the mission.

Alternatively or additionally, the unmanned vehicle can make more abstract instructions to the unmanned vehicle, which the unmanned vehicle can execute using an on-board computer. The computer can collect the IMU data given by the flight controller (whether this is command coming from the on-board computer or human pilot). For the autonomous case, this has the advantage of improved latency and less range dependency compared to an above-discussed remote control of the unmanned vehicle by the processing unit.

The processing unit allows reduction of unmanned vehicle payload, since the unmanned vehicle does not need to carry a camera for detecting the landing platform. Instead, the landing platform has a camera for detecting the unmanned vehicle, in order to provide flight instructions for the unmanned vehicle to land on the landing platform.

In another embodiment, the said sensor such as a camera located on the landing platform and deployment system or weather station, or any module that is on the ground can be utilized for the following function: camera sensing device can be used to have the capability of beyond-the-line-of-sight or virtual-line-of-sight (using its local camera pole) in order to safely operate the unmanned vehicle or meet the requirements of local regulations without having a pilot or operator in the vicinity of the unmanned vehicle by using a software or some other controls on the cameras installed on the storing/refueling station, in which the cameras visual observation capability is utilized fully to track the flight of the unmanned vehicle. This virtual-line-of-sight functionality can also be introduced to the computers located on-board or on the ground modules to further increase the autonomous nature of the unmanned vehicle for safety and other local regulation reasons.

Figure 2:
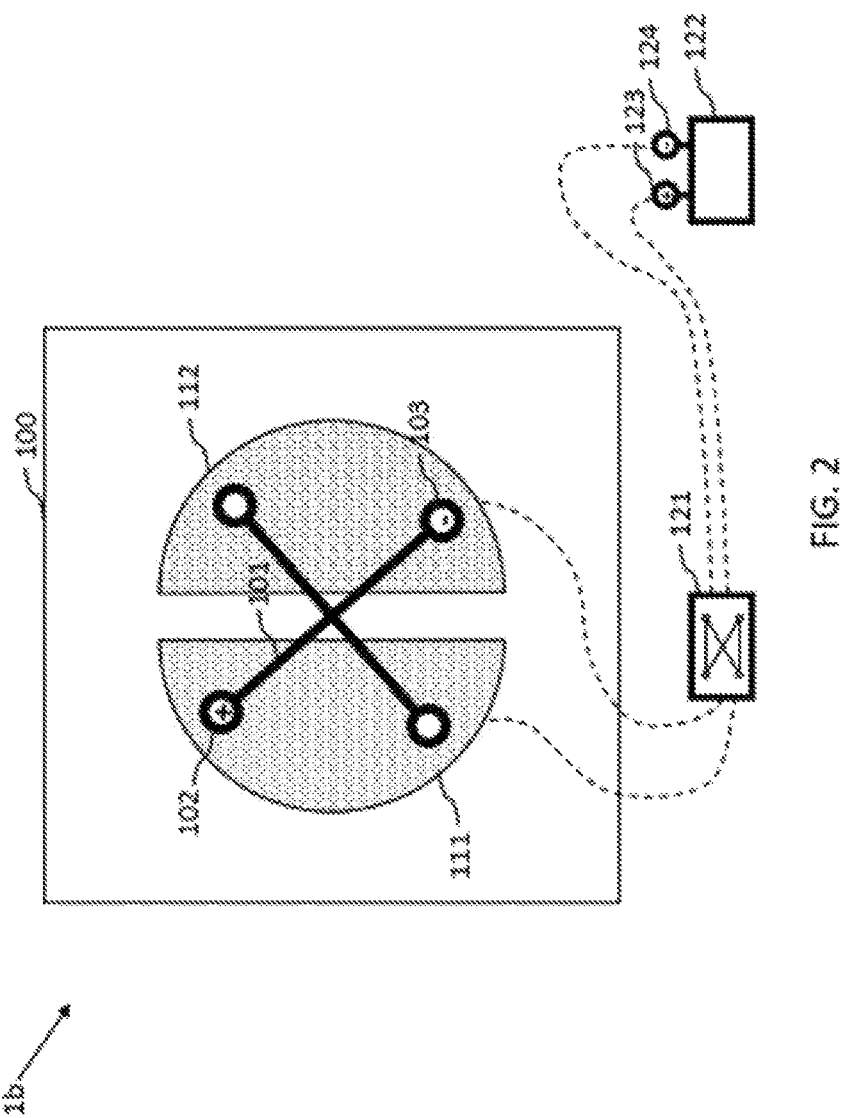
Figure 3:
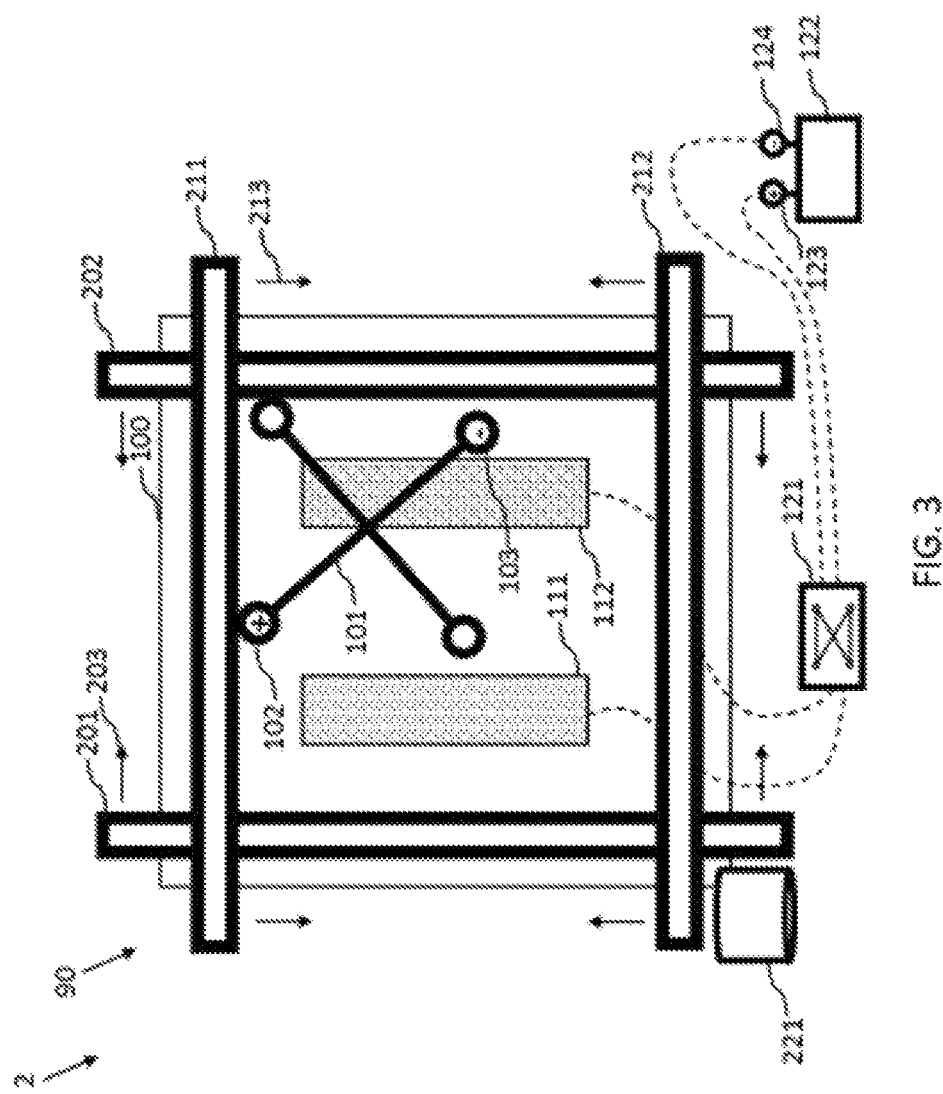
Figure 4:
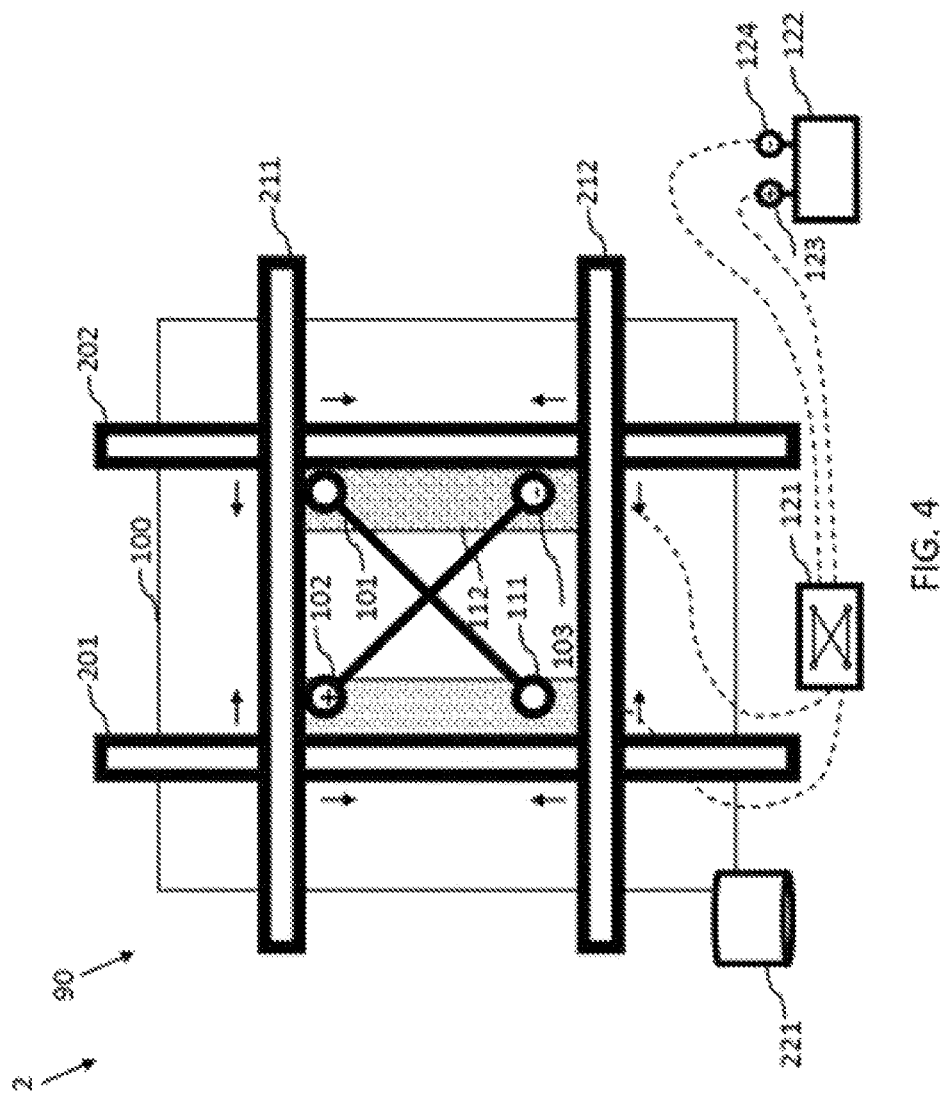
Figure 5:
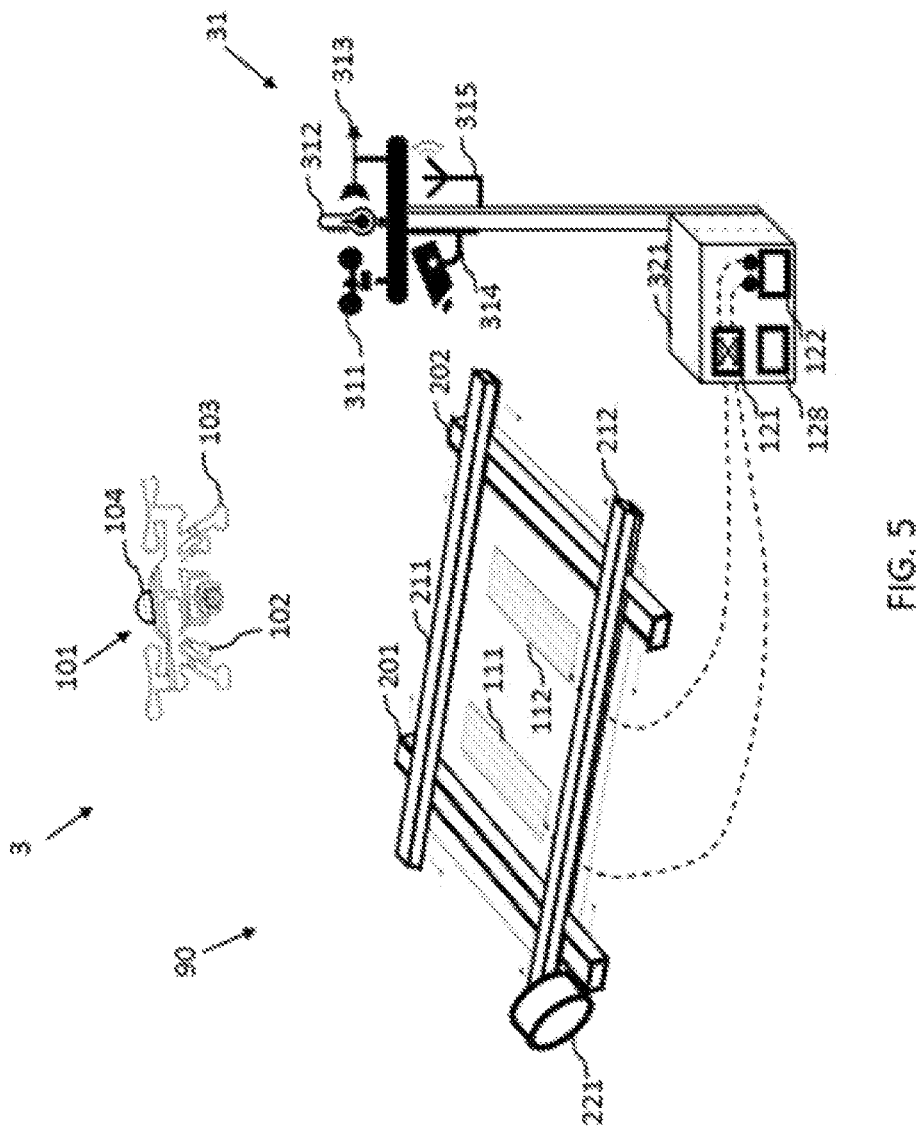
Figure 6:
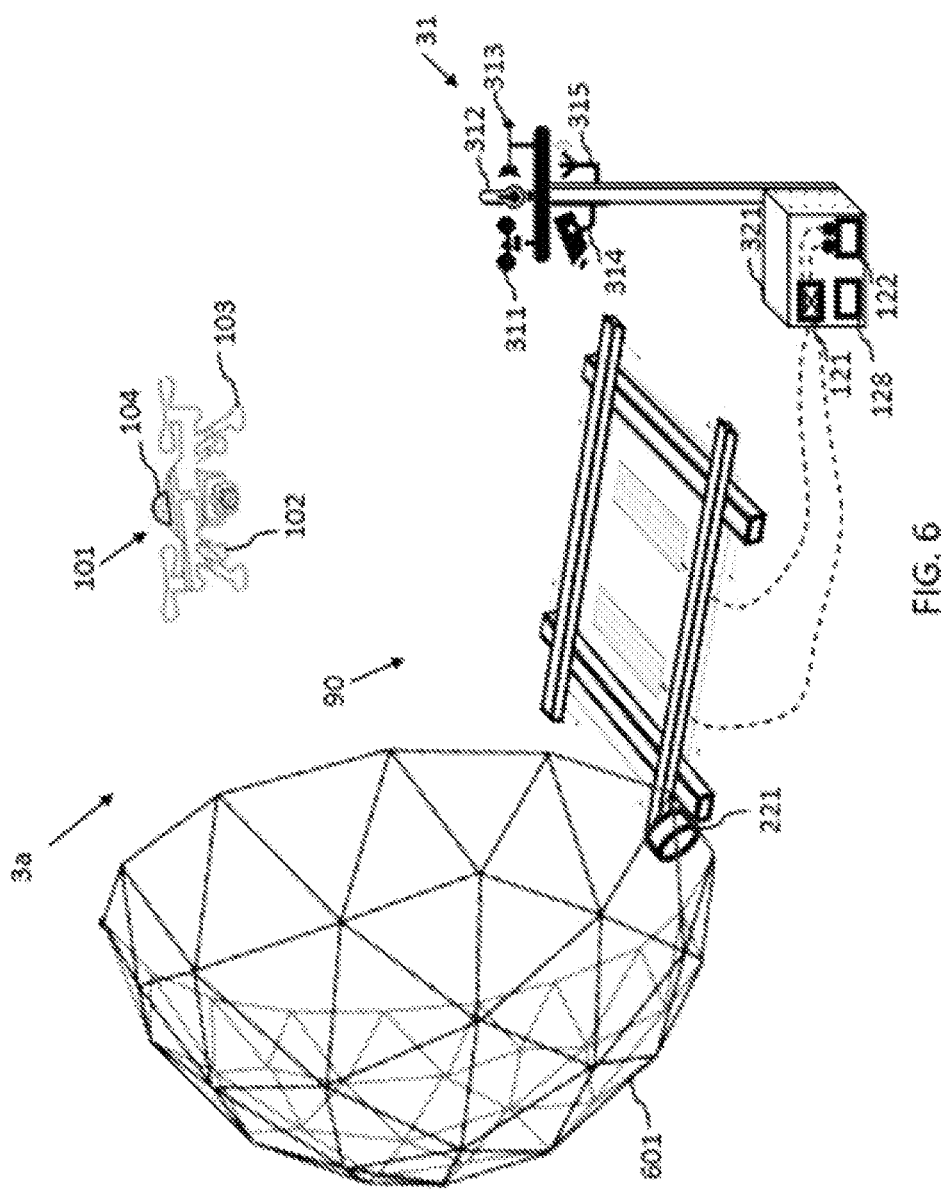
Figure 7:
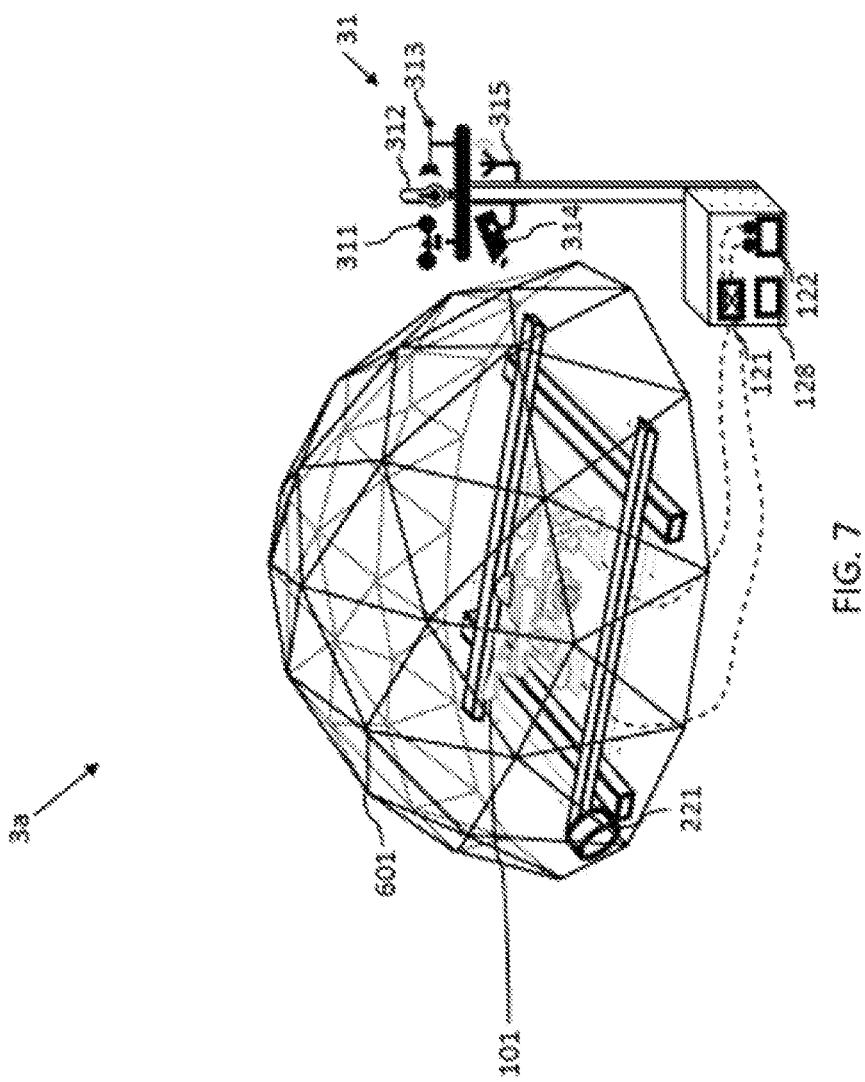
Figure 8:
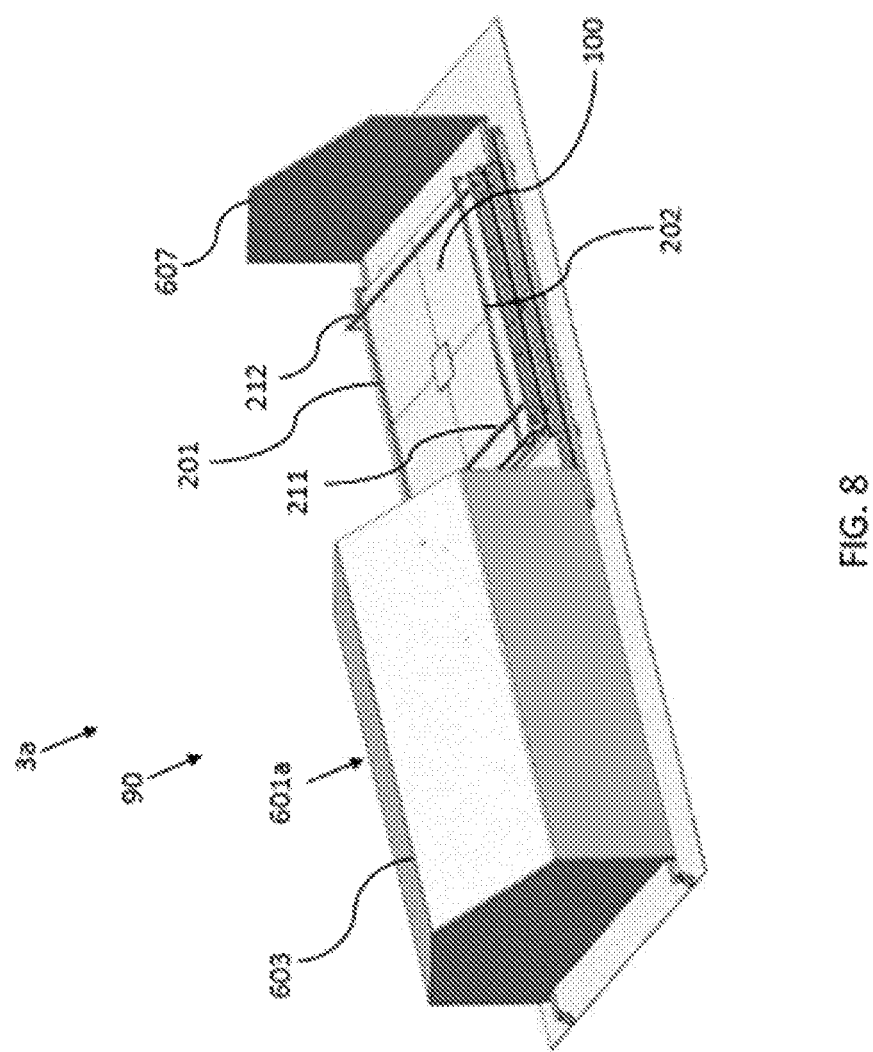
Figure 9:
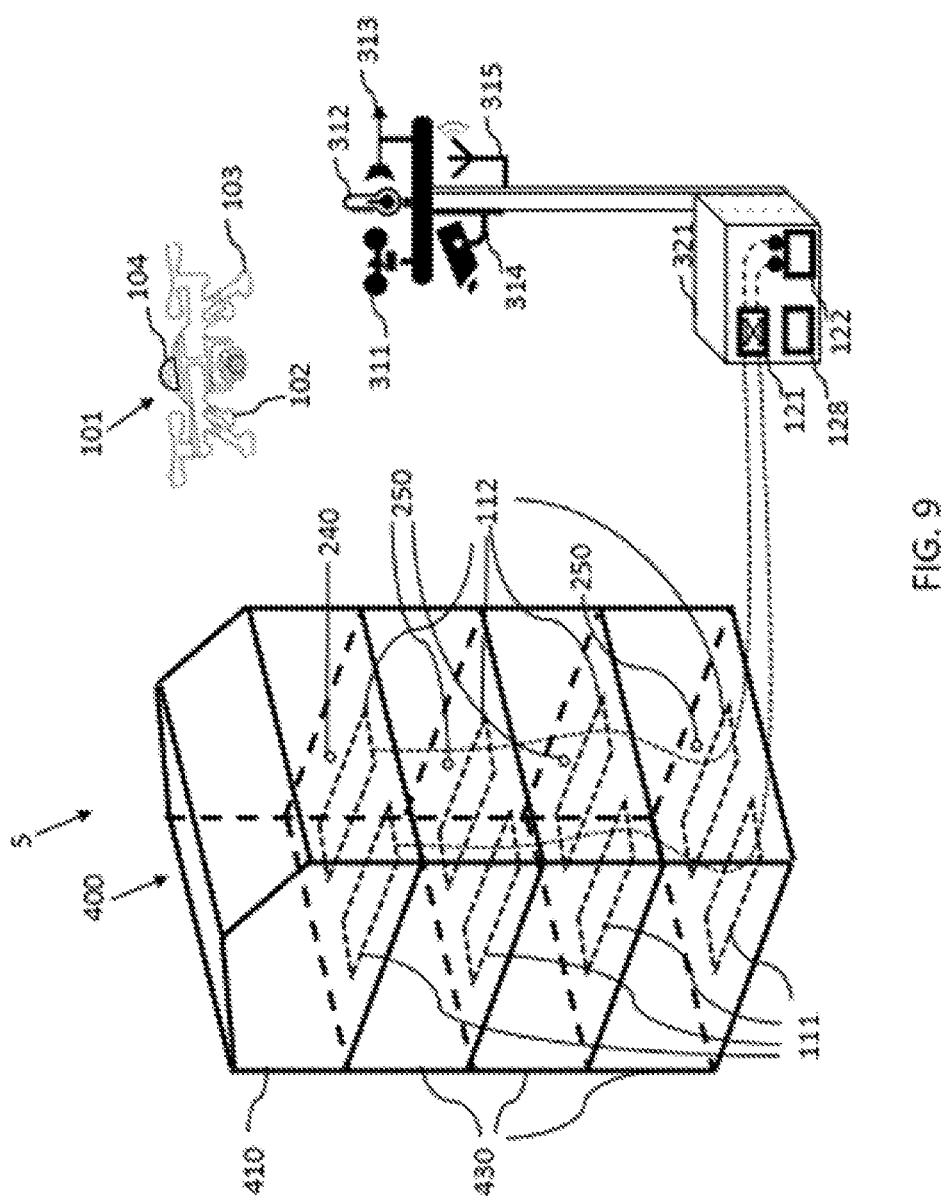
Figure 10:
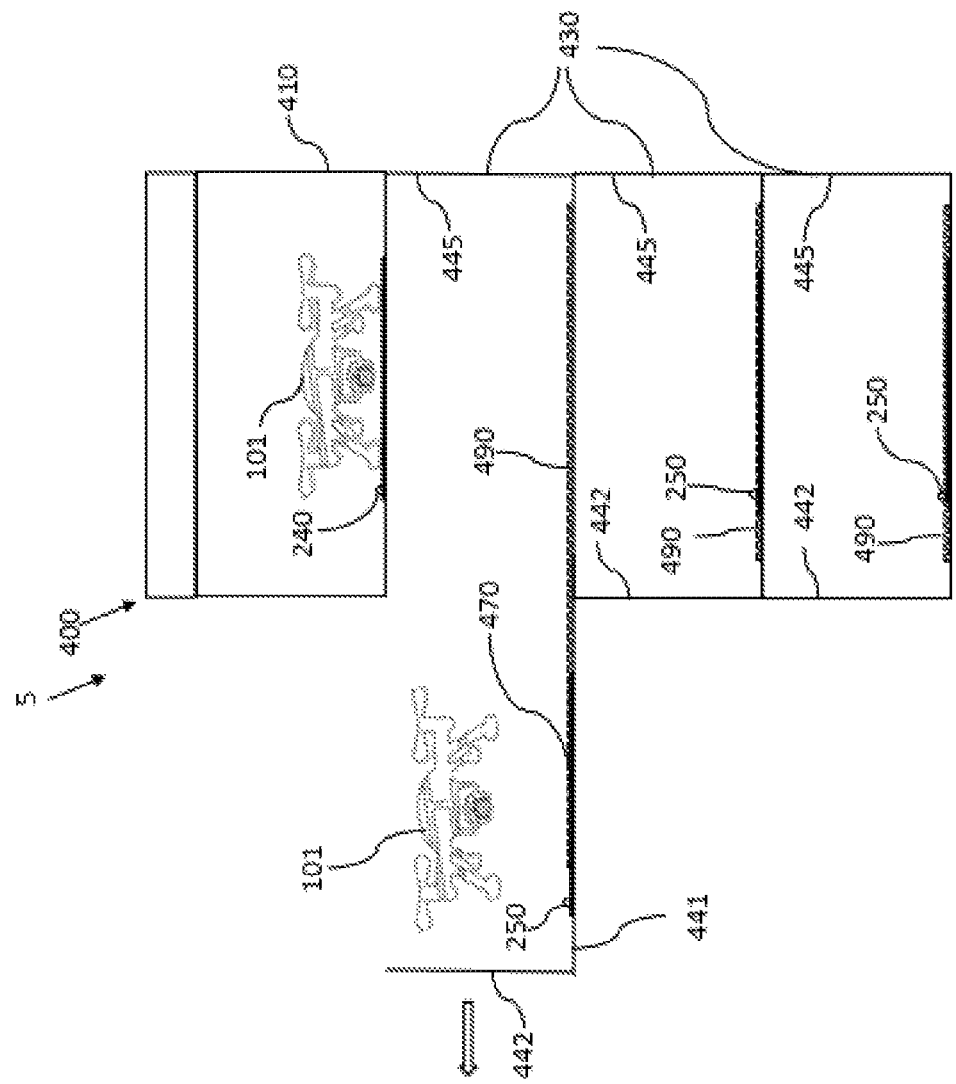
Figure 11:
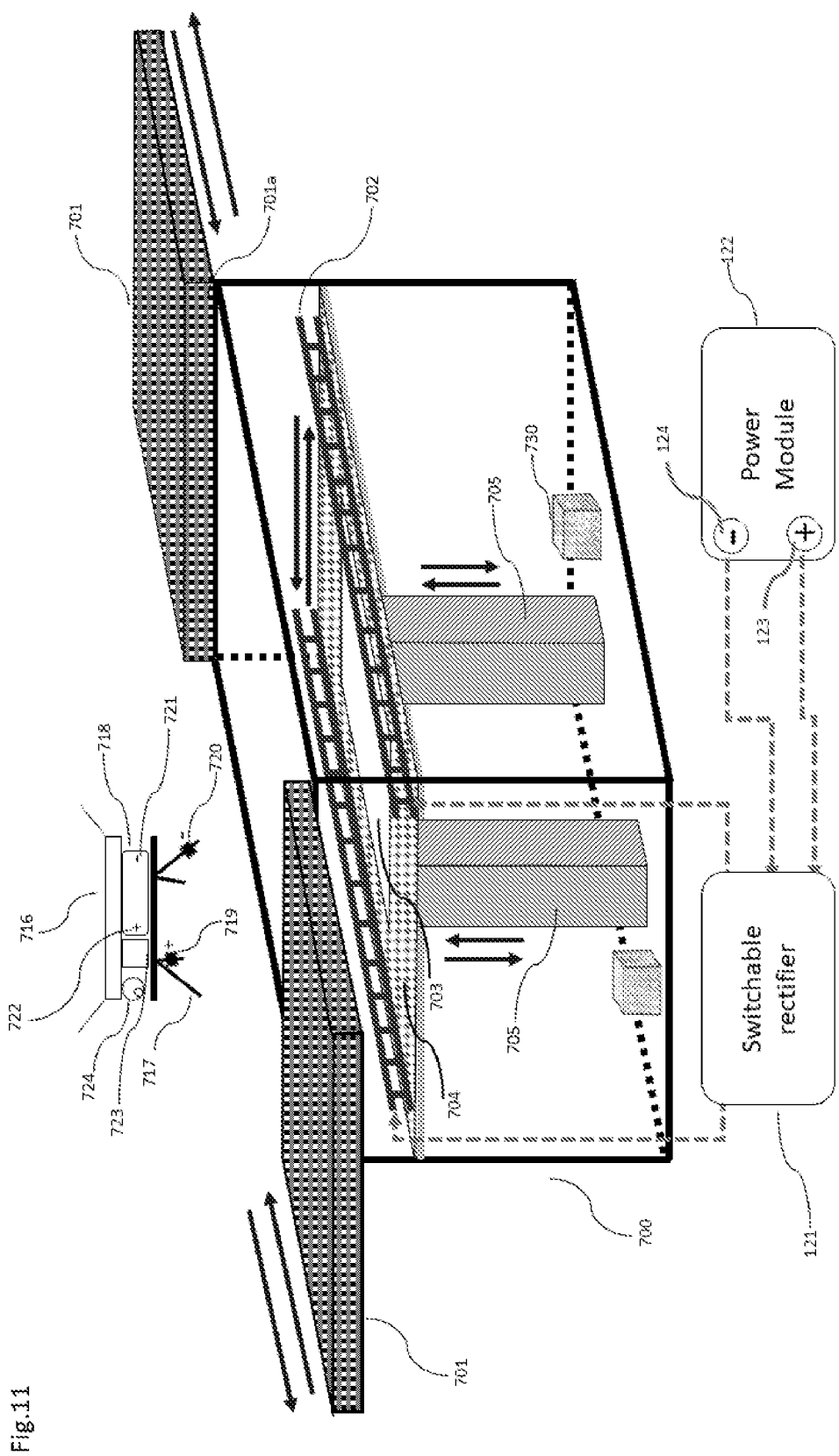
Figure 12:
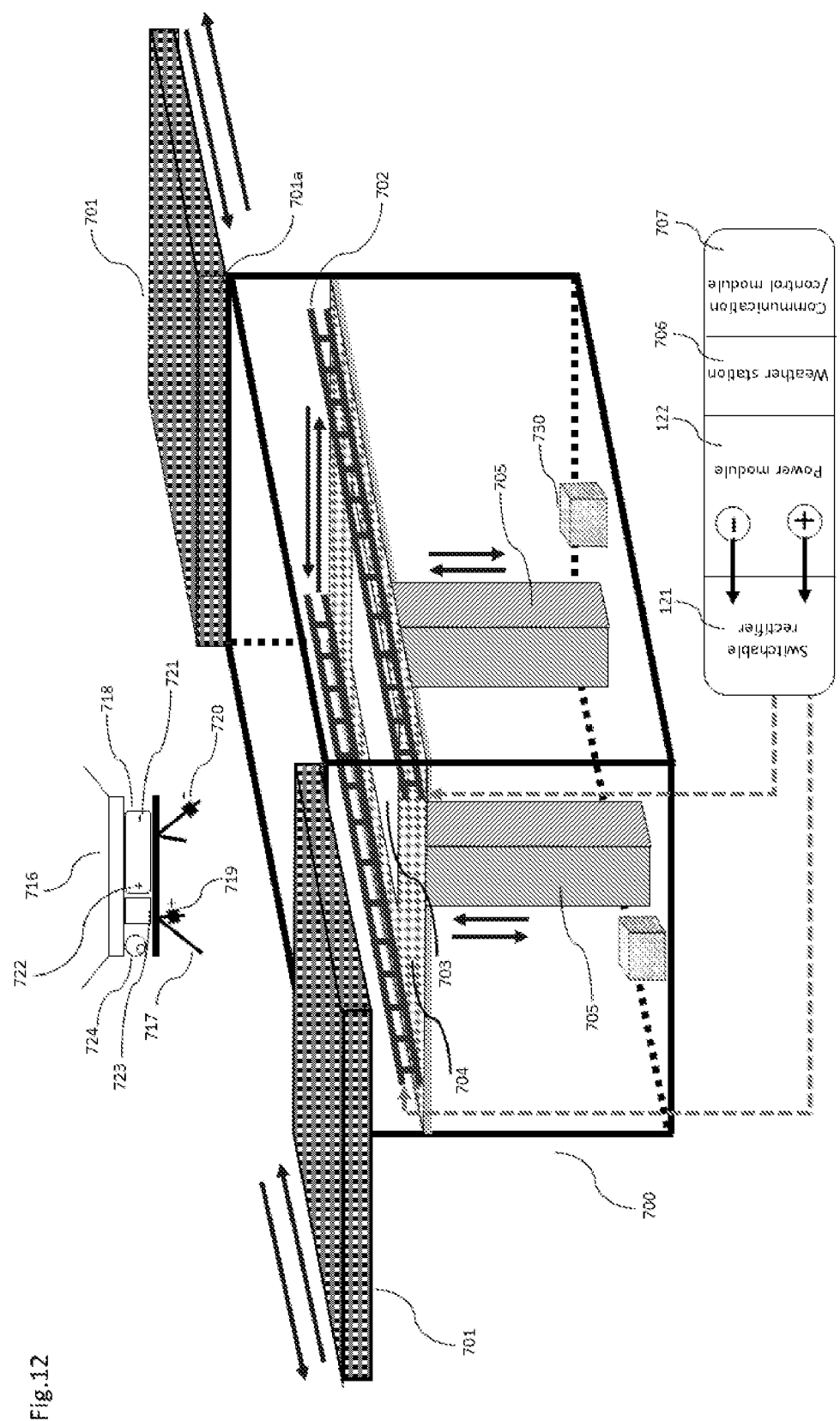
Figure 13:
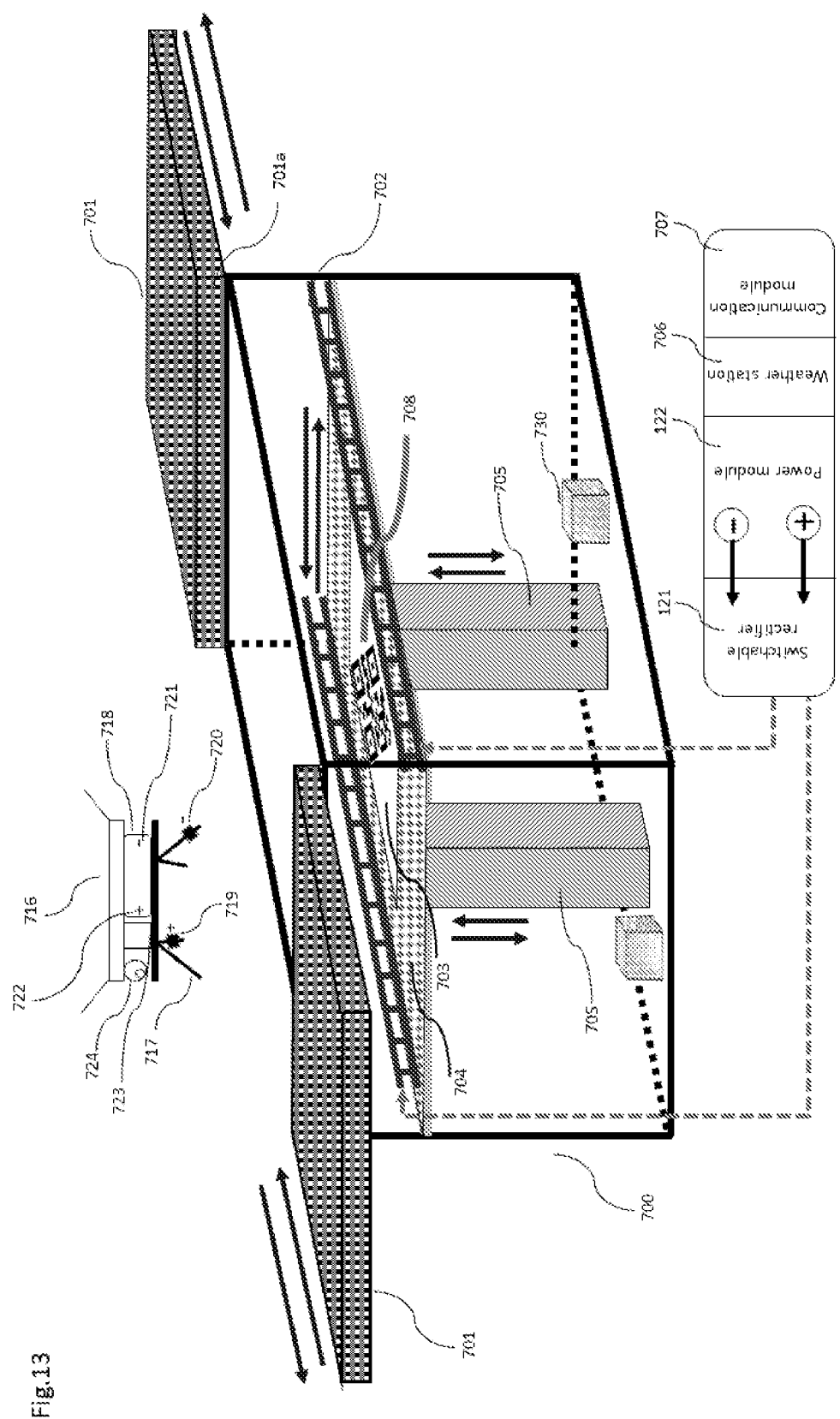
Figure 14:
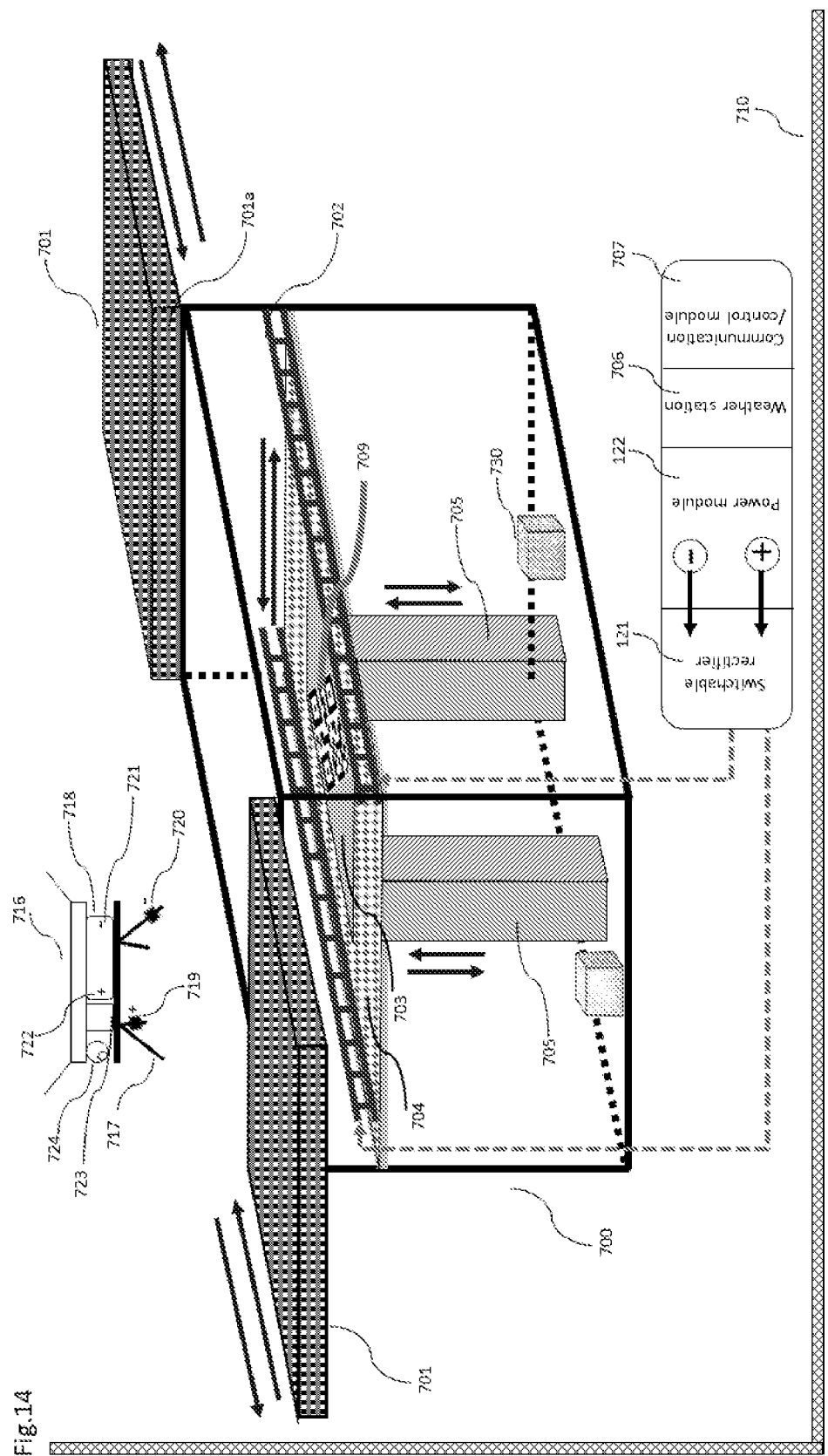
Figure 15:
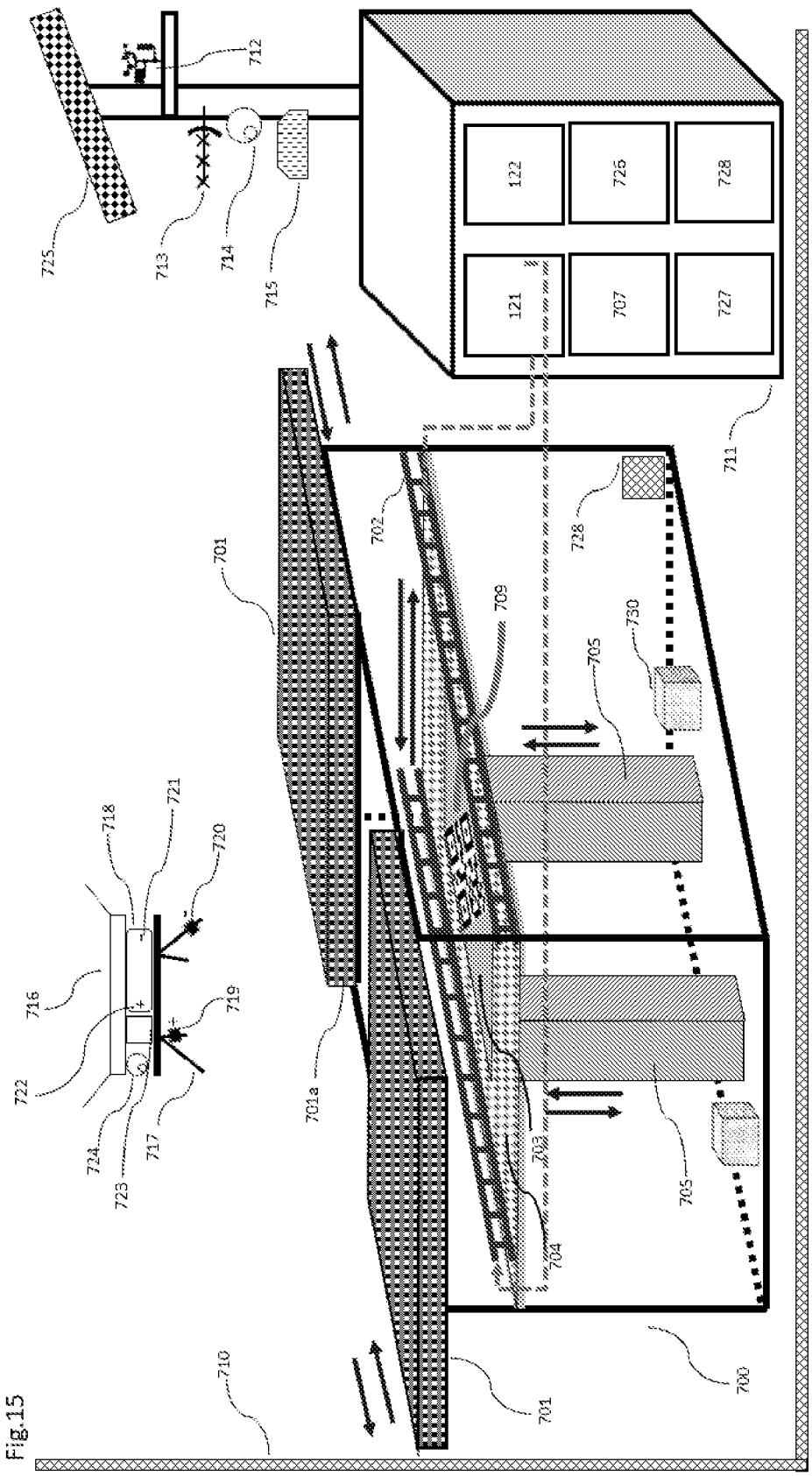
Figure 16:
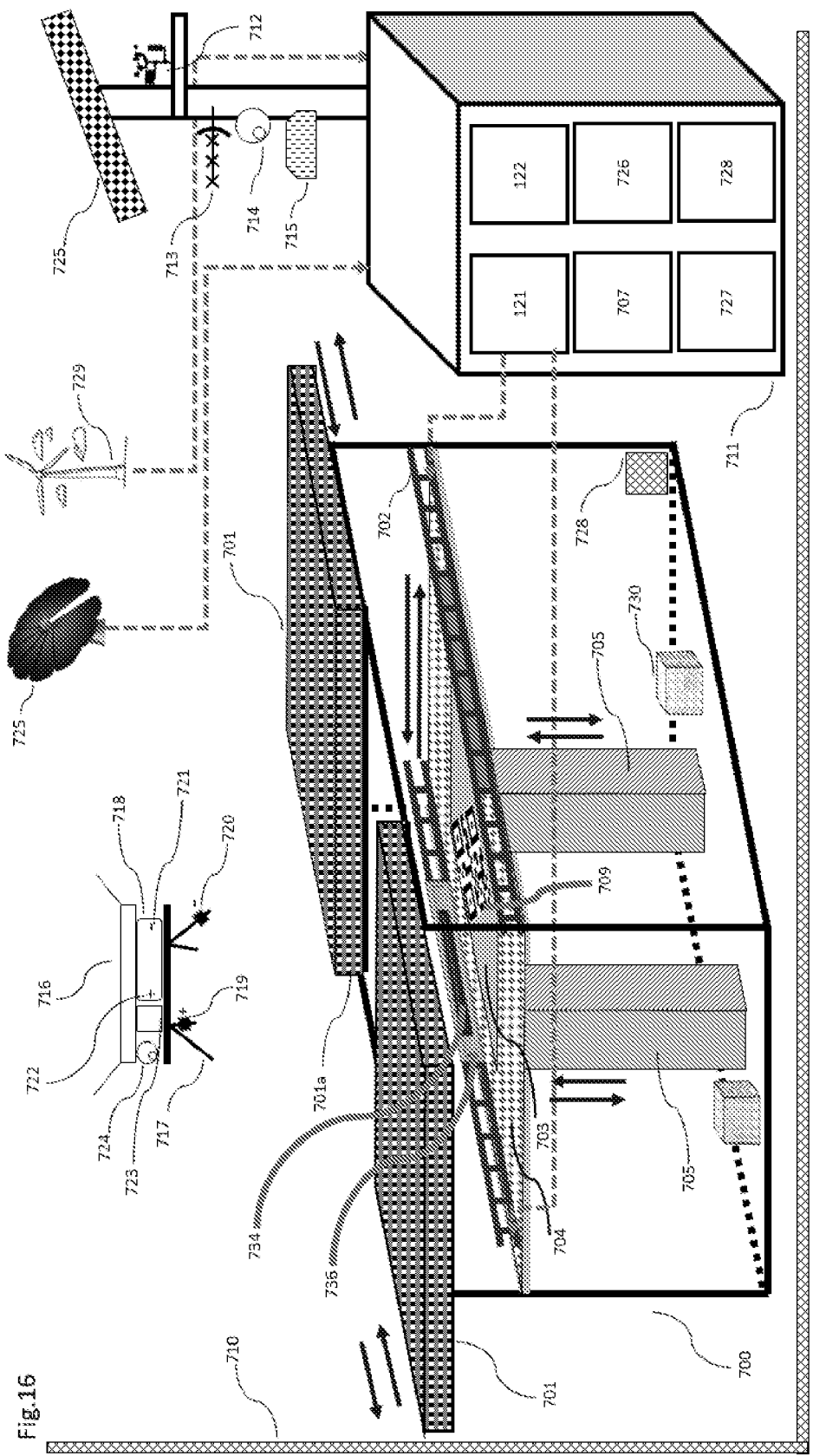
Figure 17:
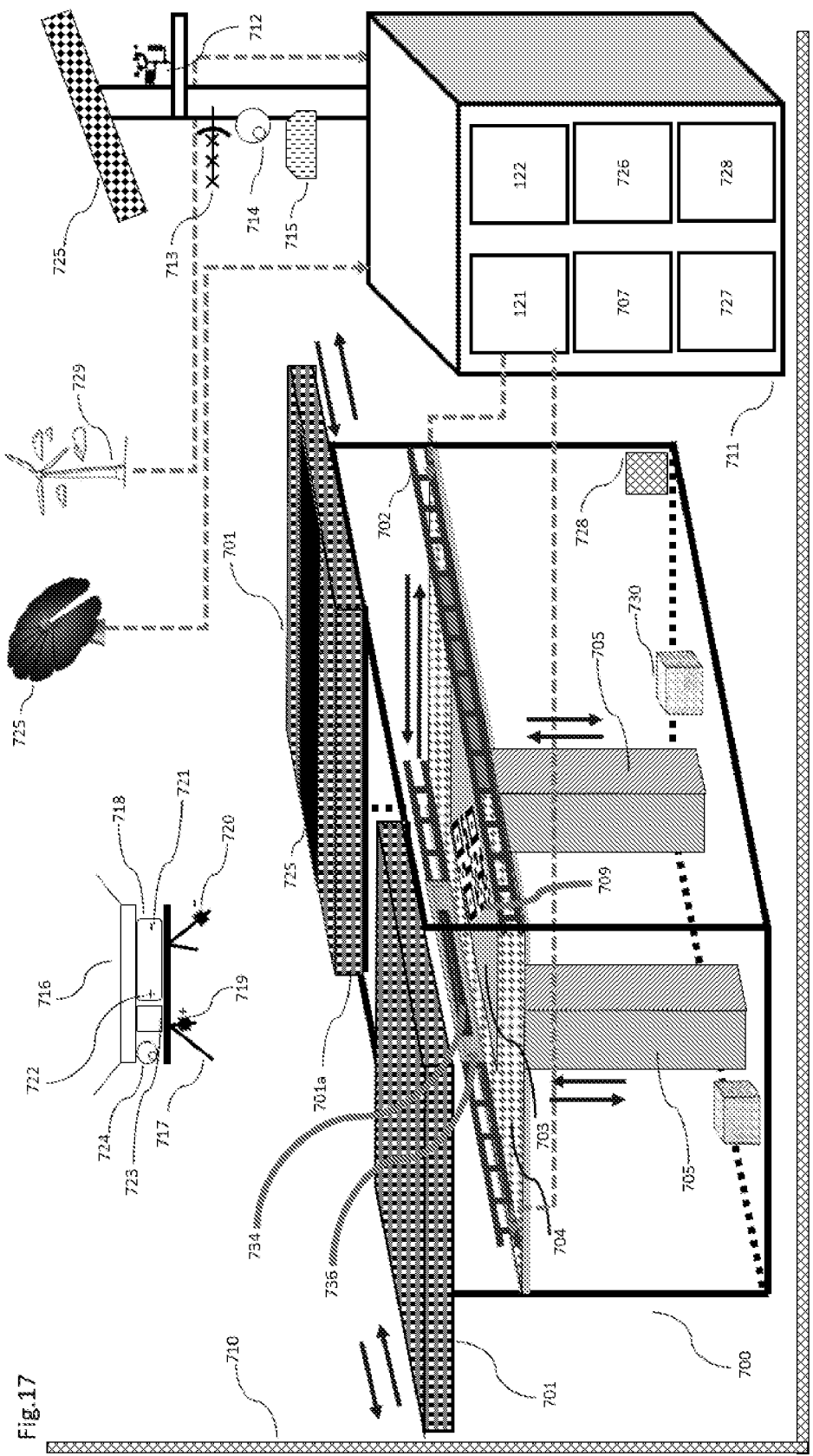
Figure 18:
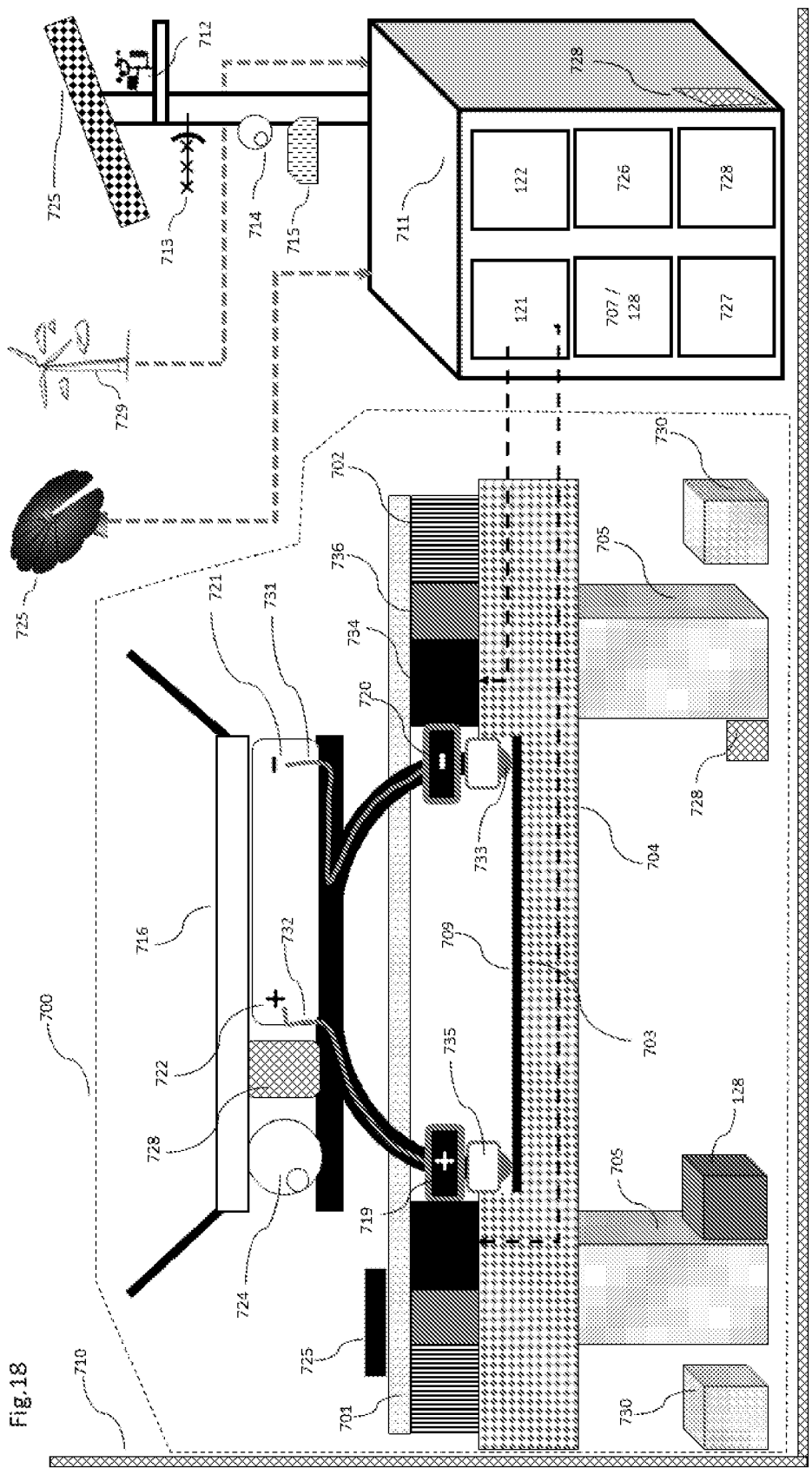
Figure 19:
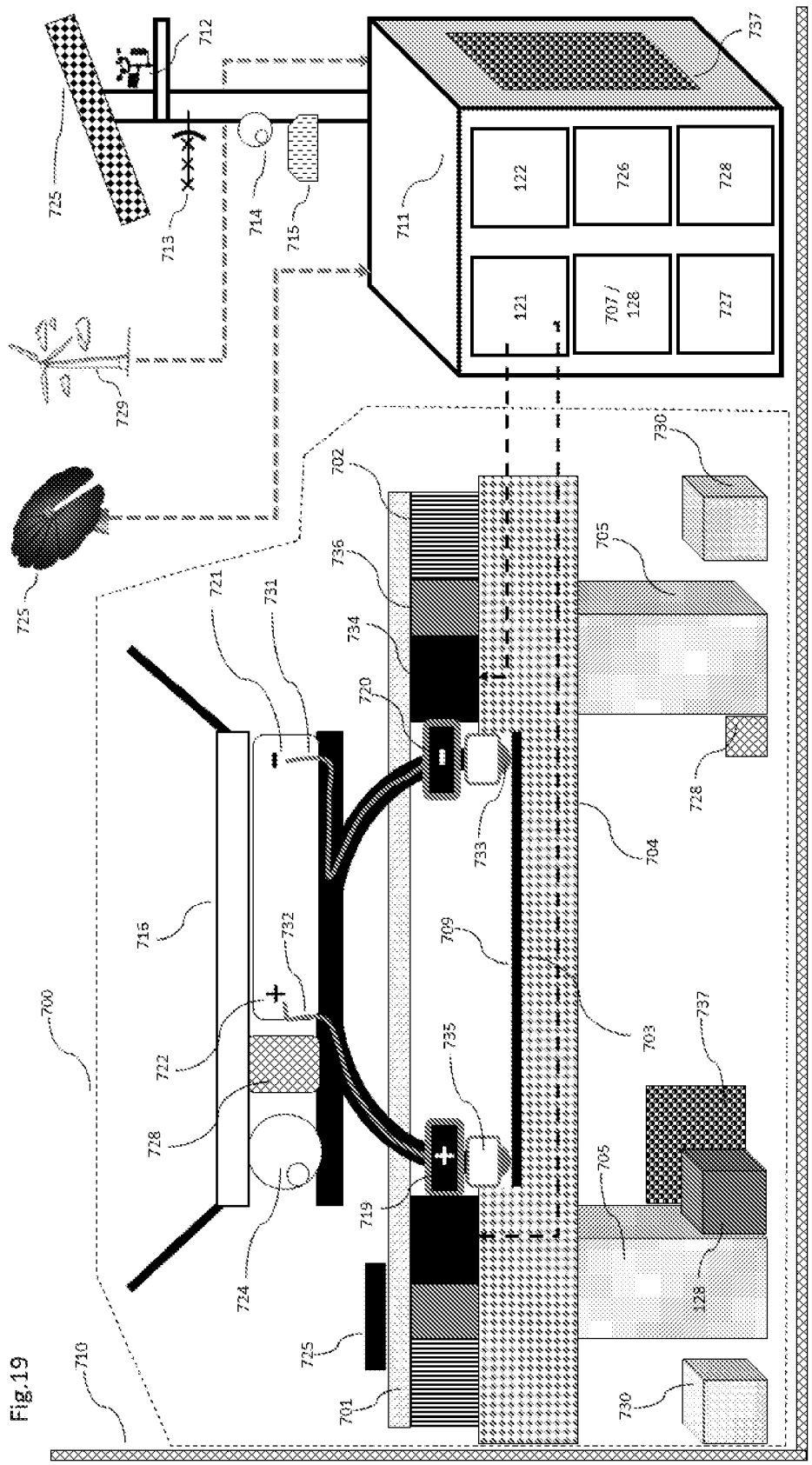
Figure 21:
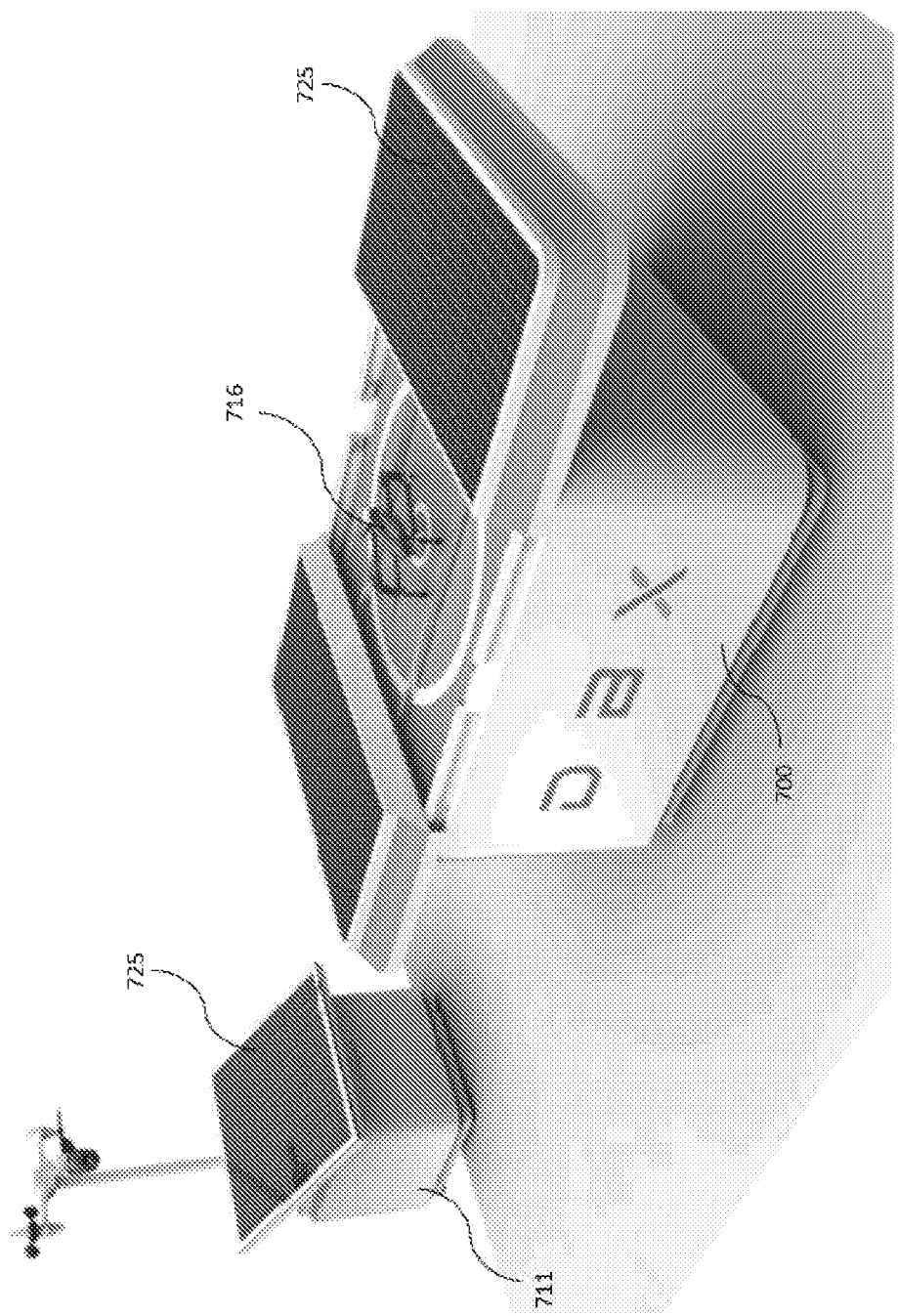
Figure 22:
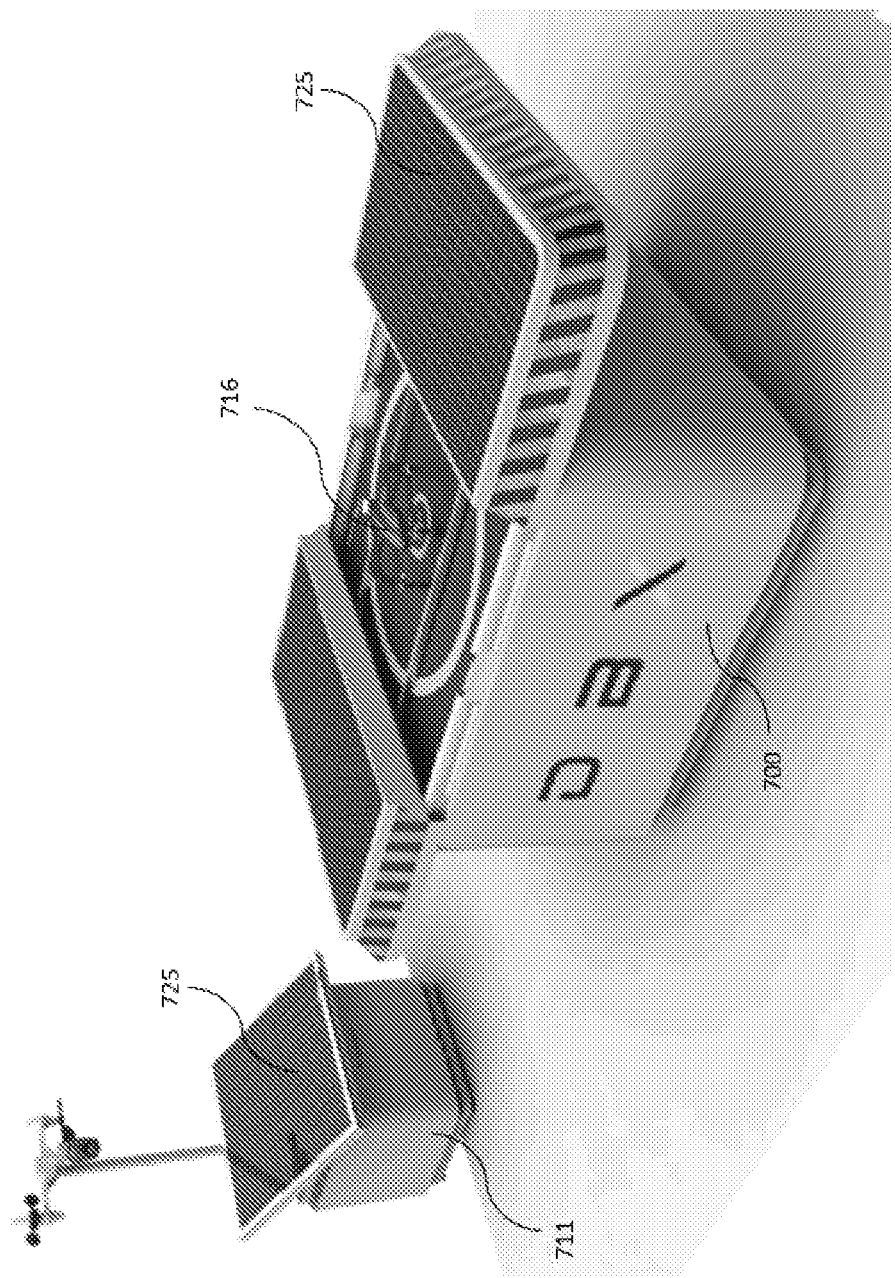
Figure 23:
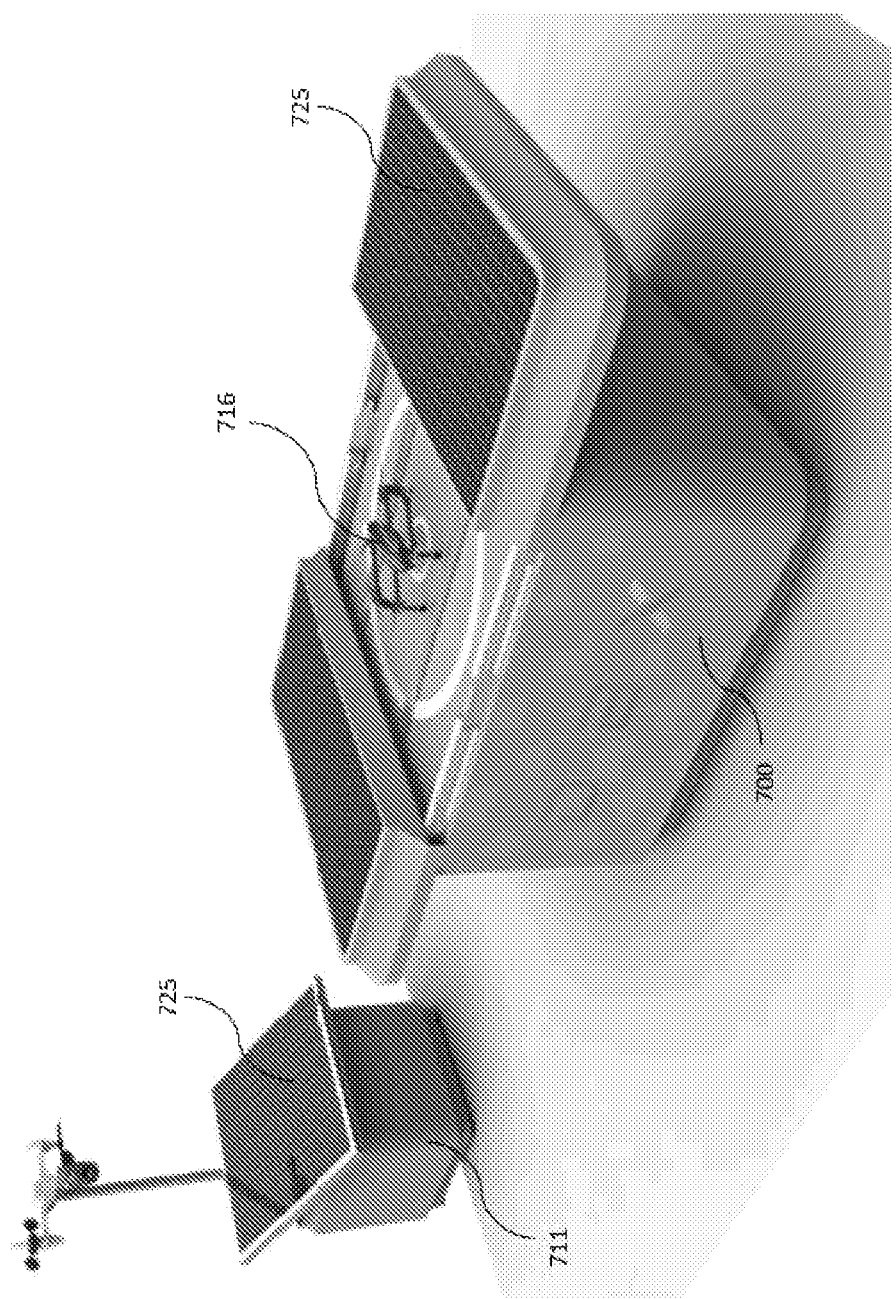

The subject matter of the application is described in greater detail in the accompanying figures, in which FIG. 1 illustrates a schematic top view of an unmanned vehicle charging system, FIG. 2 illustrates a schematic top view of an alternative unmanned vehicle charging system, FIG. 3 illustrates a schematic top view of a self-aligning unmanned vehicle landing system comprising the unmanned vehicle charging system of FIG. 1 in an unaligned state, FIG. 4 illustrates a schematic top view of the self-aligning unmanned vehicle landing system of FIG. 3 in an aligned state, FIG. 5 illustrates a schematic aerial view of an unmanned vehicle landing platform and deployment system comprising the self-adjusting unmanned vehicle landing system of FIG. 3, FIG. 6 illustrates a schematic aerial view of an unmanned vehicle landing platform and deployment system of FIG. 5 further comprising a cover that is placed in an open state, FIG. 7 illustrates a schematic aerial view of the unmanned vehicle deployment system of FIG. 6, wherein the cover is placed in a closed state, FIG. 8 illustrates a schematic view of another implementation of the cover of the unmanned vehicle deployment system of FIG. 6 where the cover slides over the landing platform and deployment system via guiding rails, FIG. 9 illustrates a schematic aerial view of an unmanned vehicle deployment system of FIG. 6, wherein the unmanned vehicle landing platform and deployment system comprises an unmanned vehicle storage box with multiple unmanned vehicle capability, FIG. 10 illustrates a schematic side view of the unmanned vehicle storage box of the unmanned vehicle deployment system of FIG. 9. where one of the unmanned vehicles is being deployed, FIG. 11 illustrates a schematic view of unmanned vehicle storage box with moveable landing platform and deployment system and an unmanned vehicle with charging contacts integrated to the landing gear, FIG. 12 illustrates a schematic view of an alternative unmanned vehicle storage box with moveable landing platform and deployment system that has a separate module containing the weather station, communication/control module, power module and switchable rectifier sub-systems and an unmanned vehicle with charging contacts integrated to the landing gear, FIG. 13 illustrates a schematic view of an unmanned vehicle storage box of FIG. 12 with a QR code marked landing region to improve the precision landing process, FIG. 14 illustrates a schematic view of an unmanned vehicle storage box of FIG. 13 with the landing platform having a recessed landing region to keep the unmanned vehicle within the predetermined landing region after its landing and alignment of its orientation and an unmanned vehicle with rolling elements integrated into the landing gear and a fence to deter animals or humans for breaching the safety of the unmanned vehicle storage box (it is also called Dronebox), FIG. 15 illustrates a schematic view of an unmanned vehicle storage box of FIG. 14 with the landing platform having a recessed landing region to keep the unmanned vehicle within the predetermined landing region after its landing and alignment of its orientation and an unmanned vehicle with rolling elements integrated into the landing gear, FIG. 16 illustrates a schematic view of an alternative unmanned vehicle storage box of FIG. 15 with a different charging mechanism on the landing platform and weather station having the capability of storing multiple different power solutions or receiving electrical energy from multiple different power schemes, FIG. 17 illustrates a schematic view of an alternative unmanned vehicle storage box of FIG. 16 with solar cells or photovoltaic cells integrated to the unmanned vehicle storage box to further improve the energy autonomous nature of the unmanned vehicle and storage box, and FIG. 18 illustrates a schematic view of an unmanned vehicle of FIG. 14 with its rolling elements integrated into the landing gears, its charging contacts integrated into the landing gear and its charging wires connected between its on-board power storage and conversion device and its on-board charging contacts, FIG. 19 illustrates a schematic view of an unmanned vehicle and its landing platform and deployment system that is provided in FIG. 18 with their standalone processing units, FIG. 20 illustrates an alternative embodiment of the unmanned vehicle and its landing platform and deployment system that is provided in FIG. 19 and with its exterior look to be designed to have a camouflaged texture for defense applications using the appropriate color/texture/markings such as green colored exterior or camo textured colored exterior, etc., FIG. 21 illustrates an alternative embodiment of the unmanned vehicle and its landing platform and deployment system that is provided in FIG. 19 and with its exterior look to be designed to have the theme of a smart city concept using the appropriate color/texture/markings such as white-to-gray background color with gray text color and blue partial-text coloring for Singapore, etc., FIG. 22 illustrates an alternative embodiment of the unmanned vehicle and its landing platform and deployment system that is provided in FIG. 19 and with its exterior look to be designed to have the theme relevant to a construction-site concept using the appropriate color/texture/markings such as orange or yellow background color with properly angled black and orange or yellow stripes, etc., FIG. 23 illustrates an alternative embodiment of the unmanned vehicle and its landing platform and deployment system that is provided in FIG. 19 and with its exterior look to be designed to have the theme relevant to a certain locality using the appropriate color/texture/markings such as having sand colored exterior for desert areas such as a locality in Africa or forestry colored exterior for particular city in the vicinity of jungles, etc., In the following description, details are provided to describe embodiments of the application. It shall be apparent to one skilled in the art, however, that the embodiments may be practiced without such details.

The embodiments have similar parts. The similar parts may have same names or similar part numbers. The description of one part applies by reference to another similar part, where appropriate, thereby reducing repetition of text without limiting the disclosure.

FIG. 1 shows a schematic view of an unmanned aerial vehicle (unmanned vehicle) charging system 1. The unmanned vehicle charging system 1 includes a landing pad 100, a power module or a battery 122, and a polarity switch 121. The polarity switch 121 is electrically connected to the a power module or a battery 122 and to the landing pad 100.

The landing pad 100 comprises a first contact surface 111 and a second contact surface 112. These contact surfaces 111 and 112 are electrically connected to the polarity switch 121. The contact surfaces 111 and 112 are rectangular surfaces made of essentially non-magnetic electrically conductive material, such as aluminum, copper, stainless steel, and other various metal or alloys that has sufficient electrical conductivity and acceptable corrosion resilience properties.

The rectangular contact surfaces 111 and 112 are positioned centrally on the landing pad 100 such that the contact surfaces 111 and 112 are parallel to each other and are spaced from a center of the landing pad 100 by a predetermined distance. The predetermined distance is selected such that an electrode of a landed unmanned vehicle does not cause a short-circuit between the first contact surface 111 and the second contact surface 112.

In one implementation, the rectangular contact surfaces 111 and 112 have a size of 300 millimeter (mm) by 100 mm. They are placed on the landing pad 100 such that they are parallel to each other and are separated from the center of the landing pad by 48 mm. In other words, the contact surfaces 111 and 112 are separated from each other by 96 mm. These length or distance figures are only provided for explaining the current matter in more detail and the coverage of this invention is not limited to the provided length or dimensions that are provided in the abovementioned section.

The other portions of the landing pad 100 are made of non-conductive and non-magnetic material.

The a power module or a battery 122 has a positive pole 123 and a negative pole 124. The positive pole 123 and the negative pole 124 are electrically connected to the polarity switch 121. The pole is also called a terminal.

In use, the polarity switch 121 is used for electrically connecting the positive pole 123 and the negative pole 124 to the contact surfaces 111 and 112. In detail, the polarity switch 121 can be configured to operate in a first polarity state, a second polarity state, and a third first polarity state. In the first polarity state, the polarity switch 121 is configured to electrically connect the first contact surface 111 with the positive pole 123 and to electrically connect the second contact surface 112 with the negative pole 124. In the second polarity state, the polarity switch 121 is configured to electrically connect the first contact surface 111 with the negative pole 124 and to electrically connect the second contact surface 112 with the positive pole 123. In the third polarity state, the polarity switch 121 is configured to electrically disconnect the contact surfaces 111 and 112 from the energy storage and conversion device or battery poles 123 and 124.

The landing pad 100 is intended for receiving a landing unmanned vehicle 101, which includes a positive electrode 102 and a negative electrode 103. These electrodes 102 and 103 are electrically connected to an electrical energy device, such as a rechargeable battery or the energy storage and conversion device, of the unmanned vehicle 101. The electrodes 102 and 103 are often located at protruding parts of the unmanned vehicle 101, for example, at its feet. For an unmanned vehicle 101 having an essentially square layout, the unmanned vehicle 101 often has four feet positioned on four equidistant bottom corners of the unmanned vehicle 101. The positive electrode 102 is located at one of its feet near a first bottom corner of the unmanned vehicle 101 and the negative electrode 103 is located at another foot that is near a second bottom corner, which is diagonally opposite to the first bottom corner of the unmanned vehicle 101.

When an unmanned vehicle 101 lands on the landing pad 100, its positive electrode 102 may contact the first contact surface 111 while, at the same time, its negative electrode 103 may contact the second contact surface 112. The polarity switch 121 is then placed in the first polarity state. This allows the positive electrode 102 of the unmanned vehicle 101 to be electrically connected to the positive pole 123 of the battery or power module 122 via the first contact surface 111 and allows the negative electrode 103 of the unmanned vehicle 101 to be electrically connected to the negative pole 124 of the battery or power module 122 via the second contact surface 112, thereby allowing the power module or battery 122 to electrically charge the battery (or electrical energy storage and conversion device) of the unmanned vehicle 101.

Alternately, the negative electrode 103 may contact the first contact surface 111 while, at the same time, the positive electrode 102 may contact the second contact surface 112. The polarity switch 121 is then placed in the second polarity state. This allows the negative electrode 103 of the unmanned vehicle 101 to be electrically connected to the negative pole 124 of the battery or power module 122 via the first contact surface 111 and allows the positive electrode 102 of the unmanned vehicle 101 to be electrically connected to the positive pole 123 of the battery or power module 122 via the second contact surface 112, thereby allowing the battery or power module 122 to charge the battery (or an electrical energy storage and conversion device) of the unmanned vehicle 101. The contact surface 111 or 112 is also called a charging contact or a charging plate or a charging element.

The polarity switch 121 can be placed in a selected polarity state automatically using a voltage sensor. The voltage sensor acts to determine or measure a voltage potential between the positive electrode 102 and the negative electrode 103. The polarity of the measured voltage is then used to select a polarity state of the polarity switch 121 accordingly. The polarity state can also be selected using a position sensor, such as a magnetic position sensor, a mechanic position sensor, an optical position sensor, or a capacitive position sensor. The position sensor can also be any sensor that can distinguish variants of two positions.

The contact surfaces 111 and 112 can be implemented in different manner.

In one implementation, as shown in FIG. 2, both the contact surfaces 111 and 112 have a shape of a semi-disk. The contact surfaces 111 and 112 are positioned centrally on the landing pad 100 such that the two contact surfaces 111 and 112 in the semi-disk shape are spaced apart from each other by a predetermined distance to form a shape of a disk with an elongated gap passing through its center from one part of a circumference edge to another part of the circumference edge.

The contact surfaces 111 and 112 can also have other shapes and can be placed at different positions on the landing pad 100. Each contact surface preferably covers at least a substantial portion of two corners of a rectangle that is sized to match a size of a bottom of an unmanned vehicle 101. For example, an unmanned vehicle 101 can have a bottom with a square shape having each side with a length of 2 meters (m) and each contact surface can be a half-circle with a diameter of 2.4 m. These length or distance figures are only provided for explaining the current matter in more detail and the coverage of this invention is not limited to the provided length or dimensions that are provided in the abovementioned section.

FIG. 3 shows a schematic view of a self-adjusting (also known as self-aligning) unmanned vehicle landing platform and deployment system 2. The unmanned vehicle landing platform and deployment system 2 comprises a power module or a battery 122, a polarity switch 121, and an improved landing platform 90. The polarity switch 121 is electrically connected to the power module or battery 122 and to the improved landing platform 90. An arrangement of the power module or battery 122 and the polarity switch 121 of the unmanned vehicle landing system 2 and the arrangement of the power module or battery 122 and the polarity switch 121 of the unmanned vehicle charging system 1 are similar.

The improved landing platform 90 includes a landing pad 100 and an unmanned vehicle positional alignment unit 198 which is comprised of multiple adjustment beams such as first longitudinal adjustment beam 201, second longitudinal adjustment beam 202, first lateral adjustment beam 211, and second lateral adjustment beam 212 which is provided on the landing pad 100.

The landing pad 100 includes a first contact surface 111 and a second contact surface 112. These contact surfaces 111 and 112 are electrically connected to the polarity switch 121. The contact surfaces 111 and 112 are placed on opposing sides of a center of the landing pad 100.

The unmanned vehicle positional alignment unit 198 not only includes a first longitudinal adjustment beam 201, a second longitudinal adjustment beam 202, a first lateral adjustment beam 211, a second lateral adjustment beam 212, but also a motor 221, position or limit switches, guiding rails, etc. in order to move the adjustment beams properly and safely to the desired destinations during the alignment process of the unmanned vehicle. The first longitudinal adjustment beam 201, the second longitudinal adjustment beam 202, the first lateral adjustment beam 211, and the second lateral adjustment beam 212 are connected to the motor 221 by a transmission mechanism, which is not shown in the figure. Examples of the transmission mechanism include a gear drive, a belt drive, and a linear actuator just to name a few and the disclosed invention is not limited to these examples.

The first longitudinal adjustment beam 201 and the second longitudinal adjustment beam 202 are positioned atop the landing pad 100 along two opposing edges of the landing pad 100 such that these longitudinal adjustment beams 201 and 202 are substantially parallel to each other and facing each other. They are respectively spaced from the center of the landing pad 100 by a substantially same predetermined distance such that they are substantially parallel to the rectangular contact surfaces 111 and 112. The longitudinal adjustment beams 201 and 202 are movable in lateral directions 203 that are essentially perpendicular to the longitudinal adjustment beams 201 and 202.

The first lateral adjustment beam 211 and the second lateral adjustment beam 212 are positioned atop the landing pad 100 along the other two opposing edges of the landing pad 100 such that these lateral adjustment beams 211 and 212 are substantially parallel to each other and facing each other. They are respectively spaced from the center of the landing pad 100 by a substantially same predetermined distance such that they are substantially perpendicular to the longitudinal adjustment beams 201 and 202. The lateral adjustment beams 211 and 212 are movable in longitudinal directions 213 that are essentially perpendicular to the lateral directions 203 or to the lateral adjustment beams 211 and 212.

The motor 221 with the transmission mechanism is positioned near an edge of the landing pad 100 so that the motor 221 with the transmission mechanism is far from the center of the landing pad 100. The motor 221 can be, for example, a DC motor or a stepper motor.

In use, the unmanned vehicle landing platform and deployment system 2 provides an unadjusted (also known as unaligned) state and an adjusted (also known as aligned) state.

In the unadjusted state, the first longitudinal adjustment beam 201 and the second longitudinal adjustment beam 202 are separated from each other by a first maximum distance while the first lateral adjustment beam 211 and the second lateral adjustment beam 212 are separated from each other by a second maximum distance. A landing area that is bounded by the adjustment beams 201, 202, 211, and 212 is also the maximum. In one implementation as an example, the maximum landing area is 2 meter (m) by 2 m. Depending on the size of the unmanned vehicle, this maximum landing area is defined by the size of unmanned vehicle used for the desired mission and it can be adjusted to the required length. The polarity switch 121 is also placed in a third polarity state, wherein none of the contact surfaces 111 and 112 is connected to the electric poles 123 and 124 of a power module or a battery 122.

The landing area is intended for receiving a landing unmanned vehicle 101. Depending on an initial landing position and alignment or orientation of the unmanned vehicle 101, different unmanned vehicle landing scenarios are possible. In a first unmanned vehicle landing scenario, one of the electrodes 102 and 103 initially contacts either the first contact surface 111 or the second contact surface 112 of the landing pad 100. In a second unmanned vehicle landing scenario, the positive electrode 102 and the negative electrode 103 initially contact the respective contact surfaces 111 and 112. In a third unmanned vehicle landing scenario, neither the positive electrode 102 nor the negative electrode 103 initially contacts any of the contact surfaces 111 or 112, as illustrated in FIG. 3.

When an unmanned vehicle 101 lands on a position of the landing area, the motor 221 is activated to drive the respective adjustment beams 201, 202, 211, and 212 to move towards the center of the landing pad 100. The longitudinal adjustment beams 201 and 202 move in opposing lateral directions 203 towards the center of the landing pad 100 while the lateral adjustment beams 211 and 212 move in opposing longitudinal directions 213 towards the center of the landing pad 100.

One of the moving longitudinal adjustment beams 201 and 202 later touches a part of the unmanned vehicle 101 and pushes the unmanned vehicle 101 towards the center of the landing pad in the lateral direction 203. Similarly, one of the moving lateral adjustment beams 211 and 212 then also touches a part of the unmanned vehicle 101 and pushes the unmanned vehicle 101 towards the center of the landing pad in the longitudinal direction 213. The moving adjustment beams 201, 202, 211, and 212 finally push the UAC 101 to the center of the landing pad 100, where the landing area bounded by the adjustment beams 201, 202, 211, and 212 is reduced to about the size of a bottom of the unmanned vehicle 101.

Within this landing area, the positive electrode 102 and the negative electrode 103 of the unmanned vehicle 101 contact the respective contact surfaces 111 and 112, as shown in FIG. 4. Depending on the initial landing position and orientation of the unmanned vehicle 101, there are two possible situations for the electrodes 102 and 103 to contact with the contact surfaces 111 and 112.

In a first situation, the positive electrode 102 contacts the first contact surface 111 while the negative electrode 103 contacts the second contact surface 112. The polarity switch 121 is then placed in the first polarity state, wherein the polarity switch 121 electrically connects the positive electrode 102 to the positive pole 123 of a power module or a battery 122 and electrically connects the negative electrode 103 to the negative pole 124 of a power module or a battery 122. This electrical connection allows the a power module or a battery 122 to charge the energy storage and conversion device or battery of the unmanned vehicle 101.

In a second situation, the positive electrode 102 contacts the second contact surface 112 while the negative electrode 103 contacts the first contact surface 111. The polarity switch 121 is later placed in the second polarity state, wherein the polarity switch 121 electrically connects the positive electrode 102 to the positive pole 123 and electrically connects the negative electrode 103 to the negative pole 124. This electrical connection allows a power module or a battery 122 to charge the energy storage and conversion device or battery of the unmanned vehicle 101.

Once the electrical connection between the energy storage and conversion device or battery of the unmanned vehicle 101 and a power module or a battery 122 is established (as seen in FIG. 4), the motor 221 stops moving the adjustment beams 201, 202, 211, and 212, thereby preventing the moving adjustment beams 201, 202, 211, and 212 from pressing further against the unmanned vehicle 101 and avoiding a damage to the unmanned vehicle 101. In this state, the unmanned vehicle landing platform and deployment system 2 is placed in the adjusted state. In this adjusted state, the motor 221 is far from the center of the landing pad 100, where the landed unmanned vehicle 101 is positioned. Influence of magnetic interference from the motor 221 on the electronic equipment of the unmanned vehicle 101 is greatly reduced or minimized.

In one implementation, the unmanned vehicle landing platform and deployment system 2 further include guide rails to guide the linear movement of the adjustment beams 201, 202, 211, and 212, thereby providing stability for the movement of the adjustment beams 201, 202, 211, and 212.

FIG. 5 shows a schematic aerial view of an unmanned vehicle landing platform and deployment system 3. The unmanned vehicle landing platform and deployment system 3 comprises a unmanned vehicle landing platform and deployment system 2 that is described above, an unmanned vehicle 101, and an unmanned vehicle's integrated weather station and power module 31. The unmanned vehicle's integrated weather station and power module 31 is electrically connected to the unmanned vehicle landing platform and deployment system 2 and is communicatively connected to the unmanned vehicle 101.

The unmanned vehicle 101 comprises an unmanned vehicle battery (or an energy storage and conversion device), a positive electrode 102 on-board of the unmanned vehicle 101, a negative electrode 103 on-board of the unmanned vehicle unit 101, and a beacon unit 104. The positive electrode 102 and the negative electrode 103 are electrically connected to the unmanned vehicle battery's respective terminals (meaning positive electrode 102 is connected to the positive terminal of the on-board powering device such as battery and negative electrode 103 is connected to the negative terminal of the on-board powering device such as battery), which is electrically connected to the beacon unit 104.

The beacon unit 104 includes an infrared (IR) light source with visible light sources and a cover plate. The infrared light source, the visible light sources, and the cover plate are mounted on a top surface of the unmanned vehicle 101. The cover plate includes a plurality of openings and it is placed above the infrared light source and the visible light sources.

The unmanned vehicle's integrated weather station and power module 31 comprises a processing unit 128 that is provided in an enclosure box 321, and a post carrying a sensor array. The enclosure box 321 also encloses a polarity switch 121 and a battery or a power module 122 of the unmanned vehicle landing platform and deployment system 2. The processing unit 128 is electrically connected to the polarity switch 121, to the battery or power module 122, and to the sensor array, which is also electrically connected to the battery or power module 122.

The sensor array includes an anemometer 311, a temperature sensor 312, a weather vane 313, a camera 314, and a network unit 315. The anemometer 311, the temperature sensor 312, the weather vane 313, the camera 314, and the network unit 315 are electrically connected to the processing unit 128. The network unit 315 includes a modem module and an antenna.

In use, the infrared (IR) light source of the beacon unit 104 of the unmanned vehicle 101 acts to emit infrared light rays, which pass through the openings of the cover plate to form an infrared light ray pattern.

The visible light sources of the beacon unit 104 serves to emit visible light rays, which pass through the openings of the cover plate to form a visible light ray pattern.

The infrared light and the visible light are used in different weather conditions. In an event of rainy weathers, water droplets and moisture present in the rain can block the infrared light rays and cause difficulty in detecting the infrared light rays. The visible light rays are used for detecting the position of the unmanned vehicle 101. In an event of strong sunshine, the sunshine can cause difficulty in detection of the visible light ray pattern, the infrared light rays are used for detecting the position of the unmanned vehicle 101.

The camera 314 comprises an infrared light ray image sensor and a visible light ray image sensor. The infrared light ray image sensor is intended for capturing images of the infrared light ray pattern and sending the captured image data to the processing unit 128. The visible light ray image sensor is used for capturing images of the visible light ray pattern and sending the captured image data to the processing unit 128.

The processing unit 128 then processes the captured image data to generate flight instructions or commands for transmitting to the modem module of the network unit 315. The modem module later converts the received flight commands from the processing unit 128 to radio signals for transmitting to the antenna of the network unit 315. The antenna then transmits the radio signals to the unmanned vehicle 101 for guiding the unmanned vehicle 101 to the landing platform. The antenna can also receive radio signals from the unmanned vehicle 101. The modem module then coverts the received radio signals from the antenna to digital data for transmitting to the processing unit 128.

The network unit 315 can further be configured to receive radio signals from other sources, such as Global Positioning System (GPS) and/or Global Navigation Satellite System (GNSS) or any other position indicating sources.

In a further embodiment, the unmanned vehicle landing platform and deployment system 3 include a laser device (not shown here) for emitting light rays. The laser light rays are emitted coherently, and they can be easily focused. The wavelength of the laser light rays can be adapted or selected such the laser light rays penetrate certain objects, such as haze or rain.

Referring to the sensor array, the anemometer 311, which is also called a wind gauge or a wind speed sensor, is intended for measuring speed of wind and for sending the measured speed of the wind to the processing unit 128. The weather vane 313, which is also called a wind direction sensor, acts to detect direction of the wind and to send the detected wind direction to the processing unit 128. The temperature sensor 312 is used for measuring environmental temperature around the unmanned vehicle deployment system 3 and for sending the measurements of the environmental temperature to the processing unit 128.

The sensor array can further include weather sensors (including a hyper-local weather forecasting sensors) and ambient light sensors. The weather sensors act to detect the presence of weather in the vicinity of the unmanned vehicle or its mission radius, have the capability of forecasting the local weather from 0-10, 10-20, 20-50, 50-100, 100-500, and 500-1000, and 1000-10000 meter altitude, detect rain, hail, or snow falling on the sensor itself by measuring the ambient precipitation and temperature of the precipitation, and all of the other relevant weather phenomenon that is needed for the safe operation of the unmanned vehicle. The ambient light sensors serve to measure the ambient light intensity. The respective sensor data provided by all of these sensors are also sent to the processing unit 128.

The processing unit 128 is adapted to aggregate the sensor data for detecting or determining the presence of rain, hail, snow, storm, etc. and other weather phenomena as well as conditions of rainfall or snowfall. This allows the processing unit 128 to autonomously manage the decision-making process in regard to determining whether the unmanned vehicle 101 may be permitted to take-off or land under varying degrees of severity of rainy or snowy or some other abnormal environmental or weather conditions.

The processing unit 128 can generate flight commands in response to this decision-making process and transmit, via the network unit 315, the generated flight commands to the unmanned vehicle 101. For example, the processing unit 128 can generate and transmit a command to the unmanned vehicle 101 for instructing the unmanned vehicle 101 to initiate landing in reaction to detecting upcoming heavy rainfall. In another example, the processing unit 128 can transmit another command to the unmanned vehicle 101 for instructing the unmanned vehicle 101 to postpone landing, or even to leave the area, in reaction to a detection of strong wind.

FIGS. 6 and 7 show a schematic aerial view of an unmanned vehicle landing platform and deployment system 3a, which is a variant of the unmanned vehicle landing platform and deployment system 3.

The unmanned vehicle landing platform and deployment system 3a includes parts that correspond to the parts of the unmanned vehicle landing platform and deployment system 3. An arrangement of the parts of the unmanned vehicle landing platform and deployment system 3a and the arrangement of the corresponding parts of the unmanned vehicle landing platform and deployment system 3 are similar.

The unmanned vehicle landing platform and deployment system 3a further comprises a movable hemispherical cover 601, which includes a hemispherical frame structure that is made of essentially non-magnetic and non-conductive material or any other material that does not interfere or hamper the operation of the unmanned vehicle 101, landing platform and deployment system 3a, unmanned vehicle's integrated weather station and power module, and all other components present. The hemispherical frame structure is covered with an essentially non-conductive and non-magnetic material that does not contain any metallic component or any other material that does not pose limitations to the operation of the unmanned vehicle 101, landing platform and deployment system 3a, unmanned vehicle's integrated weather station and power module, and all other components present. An example of such material is canvas and the content of this invention is not limited to this example. The essentially non-conductive and non-magnetic material (or any other appropriate material) allows GPS/GNSS signals and radio waves to pass through with low or minimal attenuation of these signals.

The non-magnetic hemispherical cover 601 is pivotally connected to a motor 221 with a transmission mechanism. The transmission mechanism is not illustrated in the figure. The transmission mechanism is configured for transmitting and converting a motor movement into a pivotal movement of the cover 601 for placing the cover 601 in an open state and in a closed state.

In the open state, the cover 601 is pivotally opened such that a clear airspace above the landing pad 100 is provided, as shown in FIG. 6. This facilitates drone landing while the open cover 601 acts to provide protection against wind for the unmanned vehicle 101.

In the closed state, the cover 601 is pivotally closed such that it covers the landing pad 100 and the landed unmanned vehicle 101 entirely, as shown in FIG. 7. The closed cover 601 provides a protection for the landed unmanned vehicle 101 and for the landing pad 100 against rain, snow, wind, ice, dust, dirt, volcanic ashes, human or animal threats or any other unexpected events. This provides a safe storage space for protecting the unmanned vehicle 101 against varying weather or environmental conditions, which can cause damage to the unmanned vehicle 101 or the modules that are needed to operate the unmanned vehicle.

The hemispherical shape of the cover 601 allows rain water, snow, ice, dust, or ashes that can be accumulated on surfaces of the cover 601 to wash away from the surfaces easily, especially when the cover 601 is placed in the open state.

This can prevent foreign objects from accumulating over the landing platform and deployment system.

In a further implementation, the cover 601 provides stealth protection for the unmanned vehicle 101, wherein the cover 601 is camouflaged and blend into its surrounding environment.

Different implementation of the movable cover 601 is possible such as providing storage and protection for not only for the landing platform and deployment system 3a, but also for the storage and protection of the other modules needed for the operation of the unmanned vehicle.

FIG. 8 shows a different cover 601a. The cover 601a includes a horizontally movable cover portion 603 and a fixed covered portion 607. The movable cover portion 603 is movably attached to the fixed covered portion 607.

The movable cover portion 603 includes a horizontally movable frame structure that is covered with canvas. The frame structure includes a body part and a roof part, which is attached to a top side of the body part. The roof part has a shape of, for example, a gable roof. The gable roof has two roof sections, which are connected to each other such that the roof sections slope in opposite directions. The frame structure is made of non-magnetic and non-conductive material or any other appropriate material that does not block the communication signals.

The fixed cover portion 607 includes a stationary vertical frame, which is covered with canvas. The vertical frame has a shape that corresponds to a shape of a vertical side of the movable frame structure of the movable cover portion 603. The vertical frame is made of non-magnetic and non-conductive material or any other appropriate material that does not block the communication signals.

The movable cover portion 603 can be moved linearly by a transmission mechanism, such as a belt drive, which is actuated by a motor. The transmission mechanism is configured for transmitting and converting movements of the motor into linear movements for moving the movable cover portion 603.

The cover 601a can be placed in an open state and in a closed state.

In the open state, the movable cover portion 603 is moved or shifted linearly away from the landing pad 100 such that a clear air space above the landing pad 100 is provided.

In the closed state, the movable cover portion 603 is moved or shifted linearly towards the landing pad 100 until the movable cover portion 603 is connected to the fixed cover portion 607 to form an enclosure for covering the landing pad 100 and the landed unmanned vehicle 101 entirely.

Different implementations of the unmanned vehicle landing platform and deployment system 3a are possible.

In one implementation, the unmanned vehicle deployment system 3a includes a plurality of motors to separately move the adjustment beams 201, 202, 211, and 212, and the movable cover 601 and 601a.

In a further implementation, the cover 601 and 601a is configured to cover not only the landing pad 100 and the landed unmanned vehicle 101, but also to cover the unmanned vehicle's integrated weather station and power module 31.

In a further implementation, the unmanned vehicle deployment system 3a further includes a battery-powered fan unit for providing air ventilation within a cover 601 and 601a when the cover 601 and 601a covers the landing pad 100 and/or the unmanned vehicle 101. The fan unit can be thermostatically controlled, either by a standalone thermostat or by the processing unit 128, which activates the fan unit when temperature inside the cover 601 and 601a is higher than a predetermined temperature and initiate the cooling of the module to prevent damages to the landing platform and deployment system and all the other peripherals integrated to it. In another implementation, a refrigeration type device is used to control the thermal management aspects of the landing platform and deployment system, unmanned vehicle while it is being stored inside the landing platform and deployment system, etc. instead of the fan where it is deemed necessary for reasons of having the fan cooling being not sufficient.

In another implementation, the cover 601 and 601a is adapted for transport of the landing pad 100 and the unmanned vehicle 101.

The unmanned vehicle landing platform and deployment system 3a can be powered by an electric power supply grid, or by batteries, which can be electrically charged using solar cells, wind generators, stand-alone petrol, diesel, natural gas, bio-mass fueled gen-sets, and/or fuel cells, or any other relevant power source including the grid supply. The electric power supply grid acts a channel to transmit electricity from an electric power plant. The following power sources can also be utilized by the system: internal combustion engines, solar power, photovoltaic arrays, hydrothermal power, radioisotope or radioactive power systems, nuclear fission based power generators, thermal energy conversion devices, Stirling convertors, Brayton converters, Rankine converters, micro-miniature dynamic power converters that are integrated with radioisotope heater units, alpha/beta-voltaic energy conversion devices, bio-inspired power generation devices, etc. The content of this invention is not limited to the type of power used and with the appropriate design considerations and use of the right materials/hardware, different power sources can easily be utilized to obtain a landing platform and deployment system with improved charging properties to not only charge the unmanned vehicle's depleted power source, but the same landing platform and deployment system can also be used for landing, receiving, storing and numerous other processes that are relevant to the operation and charging of the unmanned vehicle.

For example, the battery or energy storage and conversion device or power module 122 can be powered by a solar power system. The solar power system can, for example, include a solar panel and a current converter, wherein the solar panel can be installed on the post that carries the sensor array. Alternatively, the solar power system can include a solar pond, a parabolic collector and/or a solar power tower. In another embodiment, the solar cells or photovoltaic cells can be attached to the body of the landing platform and deployment system or it can be a stand-alone separate unit. In another embodiment, the power module 122 has the capability of receiving electricity from multiple sources such as solar module, wind module, hydrothermal module, electricity form the grid, or have its own electrochemical energy storage and conversion mechanisms and devices such as fuel cells, hydrogen fuel cells, backup batteries, UPS modules, etc.

FIG. 9 shows a schematic aerial view of an unmanned vehicle landing platform and deployment system 5 that has the capability of storing multiple unmanned vehicles and charging them either one at a time or simultaneously. The unmanned vehicle landing platform and deployment system 5 comprises an unmanned vehicle storage box 400, an unmanned vehicle 101, and a unmanned vehicle's integrated weather station and power module 31. The unmanned vehicle's integrated weather station and power module 31 is electrically connected to the unmanned vehicle storage box 400 and is communicatively connected to the unmanned vehicle 101.

The unmanned vehicle storage box 400 includes a roof landing platform 410 and a plurality of unmanned vehicle hangar modules 430 that are arranged in a vertical stack. The roof landing platform is placed on top of the unmanned vehicle hangar modules 430.

The roof landing platform 410 includes a landing pad 100 with a first contact surface 111 and with a second contact surface 112, a first longitudinal adjustment beam 201, a second longitudinal adjustment beam 202, a first lateral adjustment beam 211, a second lateral adjustment beam 212, a motor 221 with a transmission mechanism, and a non-magnetic (or another appropriate material based) movable cover 601a. These parts correspond to the parts of the unmanned vehicle deployment system 3a. An arrangement of these parts and the arrangement of the corresponding parts of the unmanned vehicle deployment system 3a are also similar.

The roof landing platform 410 further includes an unmanned vehicle presence sensor 240 for detecting the presence of an unmanned vehicle 101 that has landed on the landing pad 100.

As better seen in FIG. 10, each of the unmanned vehicle hangar modules 430 includes an unmanned vehicle container 440, a movable unmanned vehicle landing platform 470, and a unmanned vehicle landing platform extension mechanism 490. The unmanned vehicle container 440 is connected to the unmanned vehicle platform extension mechanism 490, which is connected to the unmanned vehicle landing platform 470.

The unmanned vehicle container 440 includes a horizontally movable unmanned vehicle landing deck 441 with one vertical side panel 442, and three fixed vertical side panels 445. The vertical side panel 442 is attached to an edge of the unmanned vehicle landing deck 441. The unmanned vehicle landing deck 441 is configured to be moved to a position such that the unmanned vehicle landing deck 441 is surrounded by the fixed vertical side panels 445 and the vertical side panel 442.

The unmanned vehicle landing deck 441 is made of non-magnetic material (or any other appropriate material that does not block the communication signals) while each of these side panels 442 and 445 includes a rectangular non-magnetic (or any other appropriate material that does not block the communication signals) frame structure that is covered with canvas. The unmanned vehicle landing deck 441 is connected to the unmanned vehicle landing platform 470 such that the unmanned vehicle landing platform 470 is placed on the unmanned vehicle landing deck 441.

The unmanned vehicle landing platform 470 includes parts that correspond to parts of the improved landing platform 90 of the unmanned vehicle deployment system 3a. An arrangement of these parts and the arrangement of the corresponding parts of the improved landing platform 90 are also similar.

The unmanned vehicle landing platform 470 further includes an unmanned vehicle presence sensor 250 for detecting a presence of an unmanned vehicle 101 that has landed on the landing pad 100.

The unmanned vehicle platform extension mechanism 490 is configured to move the unmanned vehicle landing-cum-storage tray, thereby moving unmanned vehicle landing platform 470 into and outside the unmanned vehicle container 440.

Each hangar module 430 is adapted such that it provides a storage state and a unmanned vehicle landing or takeoff state. In the storage state, the unmanned vehicle platform extension mechanism 490 and the unmanned vehicle landing platform 470 are positioned inside the unmanned vehicle container 440. In the landing state or the takeoff state, the unmanned vehicle platform extension mechanism 490 moves the unmanned vehicle landing platform 470 outside the unmanned vehicle container 440.

The unmanned vehicle hangar modules 430 further includes a battery-powered fan unit for providing air ventilation within the unmanned vehicle hangar modules 430 when the hangar module 430 is placed in the storage state.

The unmanned vehicle's integrated weather station and power module 31 includes an enclosure box 321 that encloses a processing unit 128, a plurality of polarity switches 121, and a battery or power module 122. The unmanned vehicle's integrated weather station and power module 31 also includes a post that carries a sensor array. The processing unit 128 is electrically connected to the polarity switches 121 and to the sensor arrays. Each of the polarity switches 121 is electrically connected to contact surfaces 111 and 112 of a landing pad 100 of the corresponding hangar module 430 and is electrically connected to electric poles 123 and 124 of the battery or power module 122.

These parts correspond to the parts of the unmanned vehicle's integrated weather station and power module 31 of the unmanned vehicle landing platform and deployment system 3a. An arrangement of these parts and the arrangement of the corresponding parts of the unmanned vehicle's integrated weather station and power module 31 of the unmanned vehicle landing platform and deployment system 3a are also similar.

In use, the processing unit 128 serves to manage or direct parts of the unmanned vehicle hanger modules 430 and of the roof landing platform 410.

Each unmanned vehicle hangar module 430 provides a platform for an UVA 101 to land. The unmanned vehicle hangar module 430 can then store and protect the unmanned vehicle 101 as well as electrically charge a battery (or the energy storage and conversion module) of the unmanned vehicle 101. The unmanned vehicle hangar module 430 also allows the unmanned vehicle 101 to take off.

The unmanned vehicle presence sensors 240 and 250 act to detect the presence of an unmanned vehicle 101 that has landed and/or stored at the roof landing platform and inside the unmanned vehicle hanger modules 430 and to transmit an unmanned vehicle detection signal to the processing unit 128.

When an unmanned vehicle 101 is requesting to land into the unmanned vehicle storage box 400, the processing unit 128 then selects one of the unoccupied unmanned vehicle hangar modules 430 and the roof landing platform 410 according to the unmanned vehicle detection signals received from the presence sensors 240 and 250 for placing the selected unmanned vehicle hangar modules 430 in an unmanned vehicle landing state.

The processing unit 128 later places the unmanned vehicle container 440 of the selected unmanned vehicle hangar module 430 in a container open state, wherein the unmanned vehicle landing deck 441 with the side panels 442 is placed apart from the fixed panels 445.

In detail, the processing unit 128 activates the unmanned vehicle platform extension mechanism 490 to move the unmanned vehicle landing deck 441 together with the side panel 442 away from the fixed vertical side panels 445, thereby placing the container 440 in the open state. The unmanned vehicle platform extension mechanism 490 also moves the unmanned vehicle landing platform 470 away from the unmanned vehicle container 440 to a landing position for receiving an unmanned vehicle 101. In other words, the unmanned vehicle landing platform 470 is exposed for receiving the unmanned vehicle 101.

After the unmanned vehicle 101 has landed on the landing pad 100 of the unmanned vehicle landing platform 470, the unmanned vehicle positional alignment unit 198 moves the unmanned vehicle 101 to a center of the landing pad 100. The processing unit 128 later activates the unmanned vehicle platform extension mechanism 490 to move the unmanned vehicle landing platform 470 together with the landed unmanned vehicle 101 inside the container 440.

The processing unit 128 afterward directs the battery or power module 122 to provide electricity to the contact surfaces 111 and 112 of the landing pad 100 for charging the battery (or powering device) of the unmanned vehicle 101.

In one embodiment, the unmanned vehicle deployment system 5 further includes brushes, which are provided in the proximity of the contact surfaces 111 and 112. The brushes are intended for sweeping away any foreign object which falls onto the contact surfaces 111 and 112 and may interfere with the charging process or any other operation. These foreign objects can be introduced when the containers 440 and/or the cover 601a are placed in the open state.

The unmanned vehicle deployment system 3, 3a and 5 provides several benefits.

The unmanned vehicle landing platform and deployment system 3, 3a and 5 can efficiently move an unmanned vehicle 101 to a charging position by the unmanned vehicle positional alignment unit 198 for charging of the unmanned vehicle 101 once the unmanned vehicle 101 has landed. Furthermore, parts of the unmanned vehicle landing platform and deployment system 3, 3a and 5 are substantially made of non-magnetic materials (or any other appropriate material), which essentially is a material with a composition that does not interfere electromagnetic waves or communication signals. This allows the unmanned vehicle 101 to receive and to transmit radio frequency signals even the unmanned vehicle 101 is placed inside the cover 601a or inside the unmanned vehicle container 440.

In summary, the application provides an unmanned vehicle landing platform and a deployment system with an improved charging system, comprising a landing pad, a polarity switch, and a battery (or a power module). Therein, the landing pad comprises a first contact surface electrically connected to the polarity switch and a second contact surface electrically connected to the polarity switch. The polarity switch is further electrically connected to a positive pole of the battery (or power module) and to a negative pole of the battery (or a power module). The polarity switch is configured to electrically connect the first contact surface with the positive pole and the second contact surface in a first polarity state with the negative pole, or to electrically connect the first contact surface with the negative pole and the second contact surface with the positive pole in a second polarity state. The polarity switch may also comprise a third polarity state, wherein the contact surfaces and the battery (or power module) poles are electrically disconnected in order to prevent damage. The contact surfaces are rectangular metal surfaces positioned centrally on the landing pad, opposite of each other. Therein, the first contact surface is positioned with a minimum distance to the second contact surface, such that a typical electrode cannot possibly short-circuit the first contact surface and the second contact surface.

The first contact surface is configured to electrically contacting a positive electrode of a unmanned vehicle, and the second contact surface is configured to electrically contacting a negative electrode of the unmanned vehicle, at the same time. Therein, if the unmanned vehicle is turned by 90 degrees counter-clockwise, the electrical contact between the electrodes and the contact surfaces is maintained. Therein, the polarity switch is in a first polarity state, such that the unmanned vehicle may be charged by the battery (or a power module).

If the unmanned vehicle is turned by 180 degrees, or by 90 degrees clockwise, the first contact surface electrically contacts a negative electrode, and the second contact surface electrically contacts a positive electrode, at the same time. Therein, the polarity switch is in a second polarity state, such that the unmanned vehicle may be charged by the battery (or power module). The polarity switch selects the polarity state automatically. For example, the polarity state can be selected based on a voltage sensor. Therein, the voltage sensor may determine a direction of a voltage between positive electrode and the negative electrode, and select a polarity state accordingly. In another example, the polarity state can be selected based on a position sensor, like a magnetic position sensor, a mechanic position sensor, an optical position sensor, or a capacitive position sensor. Therein, the position sensor can be a simple sensor, since it is merely necessary to distinguish two position variants.

In one embodiment, the first contact surface has the shape of a semi-disk, and the second contact surface has the shape of a semi-disk, wherein the two contact surfaces are positioned centrally on the landing pad, opposing one another. The contact surfaces can have any suitable different shape and position on the landing pad. Therein, each contact surface preferably covers at least a substantial portion of two corners of a rectangular sized to match the size of a typical unmanned vehicle. For example, a typical unmanned vehicle can be of square shape, 2 m wide, and 2 m long. Each contact surface can be a half-circle with 2.4 m diameter. The specific numbers provided here are only for explanation reasons and this application is not limited to these stated example figures.

The application also provides a self-adjusting (or self-aligning) unmanned vehicle landing system comprising the unmanned vehicle charging system. The unmanned vehicle landing system provides an unadjusted (unaligned) state and an adjusted (aligned) state.

In the unadjusted (unaligned) state, a first longitudinal adjustment beam and a second longitudinal adjustment beam sit atop the landing pad along two opposing edges of the landing pad. The longitudinal adjustment beams are movable against each other along a longitudinal direction. A first lateral adjustment beam and a second lateral adjustment beam sit atop the landing pad along two opposing edges of the landing pad. The lateral adjustment beams are movable against each other along a lateral direction. The adjustment beams are further connected to a motor by a gear drive, by a belt drive, or by a linear actuator. Therein, the adjustment beams can be guided using guide rails.

The landing pad is configured for a unmanned vehicle to land on the landing pad within an area bounded by the adjustment beams. Hereto, the adjustment beams are maximally divided when the self-adjusting unmanned vehicle landing system is in an unadjusted state. Once the unmanned vehicle has landed on the landing pad, the motor drives the adjustment beams to move towards a center of the landing pad. At one point in time, the first lateral adjustment beam touches a part of the unmanned vehicle and pushes the unmanned vehicle towards the center of the landing pad. Depending on the initial landing position of the unmanned vehicle, alternatively the second lateral adjustment beam could have touched a part of the unmanned vehicle and pushed the unmanned vehicle towards the center of the landing pad. Analogously, at one point in time, the second longitudinal adjustment beam touches a part of the unmanned vehicle and pushes the unmanned vehicle it towards the center of the landing pad. Depending on the initial landing position of the unmanned vehicle, alternatively the first longitudinal adjustment beam could have touched a part of the unmanned vehicle and pushed the unmanned vehicle towards the center of the landing pad.

Initially, the polarity switch is in a third polarity state, wherein none of the contact surfaces is connected to the battery. Depending on the landing position of the unmanned vehicle within the landing pad, one of the positive electrode and the negative electrode can be initially contacted to either the first contact surface or the second contact surface. Alternatively, both the positive electrode and the negative electrode can be initially contacted to one of the contact surfaces, respectively. Typically, initially neither the positive electrode nor the negative electrode is contacted to any of the first contact surface or the second contact surface.

In the adjusted state, the first longitudinal adjustment beam and the second longitudinal adjustment beam have been moved towards the center of the landing pad. Thereby, the unmanned vehicle has been pushed towards the center of the landing pad and thereby been adjusted, or aligned, along the second longitudinal adjustment beam. At the same time, the unmanned vehicle has likewise been pushed towards the center and at the same time adjusted, or aligned, along the first lateral adjustment beam.

Eventually, the positive electrode contacts the first contact surface and the negative electrode contacts the second contact surface. Alternatively, the positive electrode could have contacted the second contact surface and the negative electrode could have contacted the first contact surface, depending on the initial position and alignment of the unmanned vehicle.

Once both electrodes of the unmanned vehicle contact one of the contact surfaces of the landing pad, the polarity switch switches to a first polarity state or to a second polarity state, depending on which electrode is contacted to which contact surface. The polarity switch is configured to electrically connect the first contact surface with the positive pole and the second contact surface in a first polarity state with the negative pole, or to electrically connect the first contact surface with the negative pole and the second contact surface with the positive pole in a second polarity state. Since the first contact surface is electrically contacting the positive electrode, and the second contact surface is electrically contacting the negative electrode of the unmanned vehicle, the polarity switch is in a first polarity state, such that the unmanned vehicle may be charged by the battery. If the first contact surface was electrically contacting the negative electrode, and the second contact surface was electrically contacting the positive electrode, the polarity switch would be switched to a second polarity state, such that the unmanned vehicle would also be charged by the battery (or power module).

Once an electrical connection between the unmanned vehicle and the battery (or a power module) is established, the motor stops, since the goal of the automatic adjustment is achieved and the possibility of damage to the unmanned vehicle is to be avoided.

The application also provides an unmanned vehicle deploying system comprising the self-adjusting unmanned vehicle landing platform and deployment system. The unmanned vehicle landing platform and deploying system includes a landing pad with a first contact surface, a second contact surface, a first longitudinal adjustment beam, a second longitudinal adjustment beam, a first lateral adjustment beam, a second lateral adjustment beam, a motor, and a transmission mechanism for transmitting the motor movement into linear movement of the adjustment beams.

Further, the unmanned vehicle landing platform and deploying system includes an unmanned vehicle comprising a positive electrode and a negative electrode. The unmanned vehicle further comprises a beacon unit.

The beacon unit includes an infrared (IR) light source with visible light sources and a cover plate. The infrared light source, the visible light sources, and the cover plate are mounted on a top surface of the unmanned vehicle. The cover plate includes a plurality of openings and it is placed above the infrared light source and the visible light sources.

In use, the infrared (IR) light source emits light rays, which pass through the openings of the cover plate to form an infrared pattern. The camera senses the infrared pattern for guiding the unmanned vehicle towards the landing platform. Similarly, the visible light sources emit visible light rays, which pass through the openings of the cover plate to form the visible light ray pattern. The camera senses the visible light pattern for guiding the unmanned vehicle towards the landing platform.

The different types of light rays are used in different situations. In the event of rain, which can block the infrared light rays and cause difficulty in detecting the infrared light rays, the visible light rays are used for guiding the unmanned vehicle. In the event of strong sunshine, which causes difficulty in detection of the visible lights, the infrared light rays are used for guiding the unmanned vehicle.

In a further embodiment, the visible light rays are replaced by laser light rays. The laser light rays are emitted coherently, thereby allowing them to be easily focused. The wavelength of the laser light rays can be adapted or selected such the laser light rays can penetrate certain objects, such as haze or rain.

Further, the unmanned vehicle deploying system includes a unmanned vehicle's integrated weather station and power module with storing functionality, which comprises an enclosure box, and a post carrying a sensor array. The enclosure box comprises a polarity switch, a battery or a power module, and a processing unit. The battery (or power module) is electrically connected to the polarity switch as described above, and the polarity switch is further electrically connected to the contact surfaces of the landing pad as described above. The processing unit is connected to each of the sensors of the sensor array. Further, the processing unit is connected, preferably using a wireless connection via the network unit (though the content of this invention is not limited to wireless connection approach), to the unmanned vehicle. The processing unit receives sensor data from the unmanned vehicle and sends command data to the unmanned vehicle.

The sensor array includes at least an anemometer, also called a wind gauge, a temperature sensor, a weather vane, a camera, and a network unit. Other desired sensors such as a hyper-local weather sensor or device can also be included into the sensor array to further improve the safe operation of the unmanned vehicle. In another embodiment, the camera can be used not only to monitor the security, but also enable the virtual-line-of-sight feature in order to eliminate the need for a person to be physically there during the mission and meet the local regulations by using the camera as a smart device to have the virtual-line-of-sight feature. The said virtual-line-of-sight feature can easily be transferred to the operator that is monitoring the status of the mission or it can be transferred to the on-board computer of the unmanned vehicle or having this feature provided to the ground computer located within the landing platform and deployment system or within the weather station module in order to have their own virtual-line-of-sight for improved autonomous flight activities and meeting the local safety and flight regulations.

The anemometer, the temperature sensor, and the weather vane send their sensor data to the processing unit. The sensor array can hold further sensors, in particular weather sensors (such as hyper-local weather sensors to gain information for the local weather with high accuracy within the flight altitude of the unmanned vehicle) and ambience sensors, the respective sensor data of which is also sent to the processing unit. The processing unit aggregates the sensor data for detecting the presence of rain, snow, hail, storm, blizzard, etc. and further weather phenomena. The use of the processing unit and the sensor array to detect the presence of rainfall or snowfall conditions may facilitate the processing unit to autonomously manage the decision-making process in regard to determining whether the unmanned vehicle may be permitted to take-off or land under varying degrees of severity of rainy or snowy environmental conditions. The processing unit may transmit, via the network unit, a command to the unmanned vehicle in response to this decision-making process. For example, the processing unit might transmit a command to the unmanned vehicle instructing the unmanned vehicle to initiate landing in reaction to detecting upcoming heavy rainfall. In another example, the processing unit might transmit a command to the unmanned vehicle instructing the unmanned vehicle to postpone landing, or even to leave the area, in reaction to detecting strong wind.

The camera captures images of light signals of the beacon unit and sends the image data to the processing unit. The camera comprises a visible light ray camera and an infrared light ray camera. The visible light ray camera is intended for receiving the visible light ray. The received visible light ray is used for guiding the unmanned vehicle to the landing platform. Similarly, the infrared light ray camera is intended for receiving the infrared light ray. The received infrared light ray is used for guiding the unmanned vehicle to the landing platform.

The different types of light rays are used advantageously in different situations. In the event of rain, which can block the infrared light rays and cause difficulty in detection of the infrared light rays, the visible light rays are used for guiding the unmanned vehicle to the landing platform. In the event of strong sunshine, which causes difficulty in detection of the visible lights, the infrared light rays are used for guiding the unmanned vehicle to the landing platform.

In another embodiment, the camera on-board the unmanned vehicle detects the QR code that is integrated into the landing platform and facilitates the precision landing process.

The unmanned vehicle landing platform and deploying system can further comprises a cover (electric cover or other approaches) of a desired shape and geometry, which is configured to clear airspace in an opened state and to cover the landing pad entirely in a closed state. In the opened state, the cover is configured to facilitate drone landing by providing protection against wind while not getting in the way of the unmanned vehicle. The unmanned vehicle landing platform and deploying system further comprises a motor, and a transmission mechanism. The transmission mechanism is configured for transmitting the motor movement into linear movement of the adjustment beams and into pivot movement of the electric cover.

In an alternative embodiment, the transmission mechanism is configured for transmitting the motor movement into linear movement of the adjustment beams and into linear movement of an electric cover, wherein the electric cover is shifted from the landing pad and back onto the landing pad.

In yet another alternative embodiment, the unmanned vehicle deploying system might include a number of motors to drive the adjustment beams and the electric cover.

During rainfall or snowfall conditions, the sensor array sends sensor data to the processing unit to initiate certain measures. Once the processing unit has detected the rainfall or snowfall conditions, it may transmit the necessary command signal to close the cover.

In the closed state, the cover provides protection for the unmanned vehicle and for the landing pad against rain, snow, wind, and dirt. Further, the electric cover provides protection against stealth of the unmanned vehicle, wherein the electric cover may be camouflaged according to its environment.

In an alternative embodiment, the electric cover covers not only the landing pad and the unmanned vehicle, but also the storage device.

In an alternative embodiment, the electric cover is adapted for transport of the landing pad and the unmanned vehicle without causing any damages to the parts or components.

FIG. 11 describes the basic schematic of a landing platform and deployment system 700 that is comprised of an unmanned vehicle 716 and a moveable landing platform 704 that can ingress and egress depending on the need with closed and open states. The open state enables the deployment of the unmanned vehicle and the closed state enables the storing, self-alignment, and charging of the unmanned vehicle after the unmanned vehicle is received from a mission. In the open state, the unmanned vehicle 716 resting the on the landing platform with smart landing and alignment mechanisms 703 is raised to the surface by the movement of the lifting/descending mechanisms 705 after the main doors 701 are opened. Once the landing platform 703 has full airspace, the unmanned vehicle takes off for its designated mission, then landing platform 703 is retracted back and then the doors 701 are closed. After the completion of the mission, the unmanned vehicle returns to the landing platform and deployment system for its storing, self-alignment and charging activities (also known as closed stated for the landing platform and deployment state). As the unmanned vehicle 716 approaches the landing platform and deployment system 700, it sends a signal for landing and awaits for a confirmation from the processing unit of the landing platform and deployment system 700. If everything is OK for the landing in terms of environmental and weather conditions, a confirmation signal is sent to the unmanned vehicle to continue its approach for landing, then the doors 701 are opened, and then the landing platform 703 with smart landing mechanisms located on the base section 704 is raised with the movement of lifting/descending mechanisms that utilizes a motor and transmission system for its movement, then the unmanned vehicle completes the landing process, then doors 701 with first alignment beams/mechanism 701a moves towards each other in order to adjust the alignment of the unmanned vehicle 716 toward the predetermined charging region (which is also known as landing platform 703) until both doors 701 makes full contact with the unmanned vehicle and push the unmanned vehicle to the landing platform 703 and then a signal is sent or the doors are stopped with a switch in order to prevent crushing damages to the unmanned vehicle 716, then second alignment beams/mechanisms 702 starts to move towards each other (and also orthogonal to the first alignment beams/mechanisms 701a) and further align the orientation of the unmanned vehicle 716 in order to establish the electrical contact between the positive terminal charging contact #1 (which is labeled 719) attached to the landing mechanism of the unmanned vehicle 716 and second alignment beam/mechanism and electrical contact between the negative terminal charging contact #2 (which is labeled 720) attached to the landing mechanism of the unmanned vehicle 716 and the second alignment beam/mechanism for the charging of the on-board power module 718 by properly establishing the electrical connection between the power module 122 and the on-board power module 718 via using a switchable rectifier (also known as polarity switch) 121. For the proper charging it is essential that the positive pole 722 of the on-board power module 718 is connected to the positive terminal 123 of the power module 122 connected to the and negative pole 721 of the on-board power module 718 is connected to the negative terminal 124 of the power module 122 via electrical contact that is established by the secondary alignment beams/mechanisms 702. Once the electrical connection is established between the on-board powering device 718 and the power module 122, the improved charging mechanism detects the polarity of the onboard powering device 718, it initiates the right switches in order to initiate the charging process and then completes the charging process. All of the essential polarity states are provided in the abovementioned examples that are provided in the previous examples/embodiments can also be used for this embodiment.

FIG. 12 describes the basic schematic of a landing platform and deployment system 700 that is comprised of an unmanned vehicle 716 and a moveable landing platform 704 and also have an integrated power module, weather station, communication/control module, and the improved charging mechanism. The landing platform and deployment system 700 can have open state and closed states for its operations. The open state enables the deployment of the unmanned vehicle and the closed state enables the storing, self-alignment, and charging of the unmanned vehicle after the unmanned vehicle is received from a mission. In the open state, the unmanned vehicle 716 resting the on the landing platform with smart landing and alignment mechanisms 703 is raised to the surface by the movement of the lifting/descending mechanisms 705 after the main doors 701 are opened. Once the landing platform 703 has full airspace, the unmanned vehicle takes off for its designated mission, then landing platform 703 is retracted back and then the doors 701 are closed. After the completion of the mission, the unmanned vehicle returns to the landing platform and deployment system for its storing, self-alignment and charging activities (also known as closed stated for the landing platform and deployment state). As the unmanned vehicle 716 approaches the landing platform and deployment system 700, it sends a signal for landing and awaits for a confirmation from the processing unit of the landing platform and deployment system 700. The ground processing unit (which is existing either within the landing platform and deployment system 700 or within the integrated power module 122, weather station 706, communication/control module 707, and the improved charging mechanism 121) makes a decision based on the sensor data aggregated from the sensors on-board of the weather station 706 and then sends a "landing is OK" signal or "landing is refused" signal to the unmanned vehicle 716 by using the communication/control module 707. If the signal is sent is landing is OK, then the unmanned vehicle continues its approach for landing, then the doors 701 are opened, and then the landing platform 703 with smart landing mechanisms located on the base section 704 is raised with the movement of lifting/descending mechanisms that utilizes a motor and transmission system for its movement, then the unmanned vehicle completes the landing process, then doors 701 with first alignment beams/mechanism 701a moves towards each other in order to adjust the alignment of the unmanned vehicle 716 toward the predetermined charging region (which is also known as landing platform 703) until both doors 701 makes full contact with the unmanned vehicle and push the unmanned vehicle to the landing platform 703 and then a signal is sent or the doors are stopped with a switch in order to prevent crushing damages to the unmanned vehicle 716, then second alignment beams/mechanisms 702 starts to move towards each other (which are orthogonal to the first alignment beams/mechanisms 701a) and further align the orientation of the unmanned vehicle 716 in order to establish the electrical contact between the positive terminal charging contact #1 (which is labeled 719) attached to the landing mechanism of the unmanned vehicle 716 and second alignment beam/mechanism and electrical contact between the negative terminal charging contact #2 (which is labeled 720) attached to the landing mechanism of the unmanned vehicle 716 and the second alignment beam/mechanism for the charging of the on-board power module 718 by properly establishing the electrical connection between the power module 122 and the on-board power module 718 via using a switchable rectifier (also known as polarity switch) 121. For the proper charging it is essential that the positive pole 722 of the on-board power module 718 is connected to the positive terminal 123 of the power module 122 connected to the and negative pole 721 of the on-board power module 718 is connected to the negative terminal 124 of the power module 122 via electrical contact that is established by the secondary alignment beams/mechanisms 702. Once the electrical connection is established between the on-board powering device 718 and the power module 122, the improved charging mechanism detects the polarity of the onboard powering device 718, it initiates the right switches in order to initiate the charging process and then completes the charging process. All of the essential polarity states are provided in the abovementioned examples that are provided in the previous examples/embodiments can also be used for this embodiment.

FIG. 13 describes the basic schematic of a landing platform and deployment system 700 that is comprised of an unmanned vehicle 716 and a moveable landing platform with a QR code 708 and also have an integrated power module, weather station, communication/control module, and the improved charging mechanism. The landing platform and deployment system 700 can have open state and closed states for its operations. The open state enables the deployment of the unmanned vehicle and the closed state enables the storing, self-alignment, and charging of the unmanned vehicle after the unmanned vehicle is received from a mission. In the open state, the unmanned vehicle 716 resting the on the landing platform with smart landing and alignment mechanisms 703 is raised to the surface by the movement of the lifting/descending mechanisms 705 after the main doors 701 are opened. Once the landing platform 703 has full airspace, the unmanned vehicle takes off for its designated mission, then landing platform 703 is retracted back and then the doors 701 are closed. After the completion of the mission, the unmanned vehicle returns to the landing platform and deployment system for its storing, self-alignment and charging activities (also known as closed stated for the landing platform and deployment state). As the unmanned vehicle 716 approaches the landing platform and deployment system 700, it sends a signal for landing and awaits for a confirmation from the processing unit of the landing platform and deployment system 700. The ground processing unit (which is existing either within the landing platform and deployment system 700 or within the integrated power module 122, weather station 706, communication/control module 707, and the improved charging mechanism 121) makes a decision based on the sensor data aggregated from the sensors on-board of the weather station 706 and then sends a "landing is OK" signal or "landing is refused" signal to the unmanned vehicle 716 by using the communication/control module 707. If the signal is sent is landing is OK, then the unmanned vehicle continues its approach for landing, then the doors 701 are opened, and then the landing platform with a QR code 708 with smart landing mechanisms located on the base section 704 is raised with the movement of lifting/descending mechanisms that utilizes a motor and transmission system for its movement, then the unmanned vehicle that is equipped with a camera 724 detects the QR code that is located on the landing platform 708 and uses this QR code for the precision landing of the unmanned vehicle 716 onto the landing platform 703, after the completion of the landing process the doors 701 with first alignment beams/mechanism 701a moves towards each other in order to adjust the alignment of the unmanned vehicle 716 toward the predetermined charging region (which is also known as landing platform 703) until both doors 701 makes full contact with the unmanned vehicle and push the unmanned vehicle to the landing platform 703 and then a signal is sent or the doors are stopped with a switch in order to prevent crushing damages to the unmanned vehicle 716, then second alignment beams/mechanisms 702 start to move towards each other (which are orthogonal to the first alignment beams/mechanisms 701a) and further align the orientation of the unmanned vehicle 716 in order to establish the electrical contact between the positive terminal charging contact #1 (which is labeled 719) attached to the landing mechanism of the unmanned vehicle 716 and second alignment beam/mechanism and electrical contact between the negative terminal charging contact #2 (which is labeled 720) attached to the landing mechanism of the unmanned vehicle 716 and the second alignment beam/mechanism for the charging of the on-board power module 718 by properly establishing the electrical connection between the power module 122 and the on-board power module 718 via using a switchable rectifier (also known as polarity switch) 121. For the proper charging it is essential that the positive pole 722 of the on-board power module 718 is connected to the positive terminal 123 of the power module 122 connected to the and negative pole 721 of the on-board power module 718 is connected to the negative terminal 124 of the power module 122 via electrical contact that is established by the secondary alignment beams/mechanisms 702. Once the electrical connection is established between the on-board powering device 718 and the power module 122, the improved charging mechanism detects the polarity of the onboard powering device 718, it initiates the right switches in order to initiate the charging process and then completes the charging process. All of the essential polarity states are provided in the abovementioned examples that are provided in the previous examples/embodiments can also be used for this embodiment.

FIG. 14 describes an alternative embodiment that is provided in FIG. 13 for an improved landing platform and deployment system 700 that is comprised of an unmanned vehicle 716 and a moveable landing platform with a QR code and a recessed area 709, have an integrated power module, weather station, communication/control module, and the improved charging mechanism, and also a fence 710 with an active deterring mechanism. The landing platform and deployment system 700 can have open state and closed states for its operations. The open state enables the deployment of the unmanned vehicle and the closed state enables the storing, self-alignment, and charging of the unmanned vehicle after the unmanned vehicle is received from a mission. In the open state, the unmanned vehicle 716 resting the on the landing platform with smart landing and alignment mechanisms 703 is raised to the surface by the movement of the lifting/descending mechanisms 705 after the main doors 701 are opened. Once the landing platform 703 has full airspace, the unmanned vehicle takes off for its designated mission, then landing platform 703 is retracted back and then the doors 701 are closed. After the completion of the mission, the unmanned vehicle returns to the landing platform and deployment system for its storing, self-alignment and charging activities (also known as closed stated for the landing platform and deployment state). As the unmanned vehicle 716 approaches the landing platform and deployment system 700, it sends a signal for landing and awaits for a confirmation from the processing unit of the landing platform and deployment system 700. The ground processing unit (which is existing either within the landing platform and deployment system 700 or within the integrated power module 122, weather station 706, communication/control module 707, and the improved charging mechanism 121) makes a decision based on the sensor data aggregated from the sensors on-board of the weather station 706 and then sends a "landing is OK" signal or "landing is refused" signal to the unmanned vehicle 716 by using the communication/control module 707. If the signal is sent is landing is OK, then the unmanned vehicle continues its approach for landing, then the doors 701 are opened, and then the landing platform with a QR code and a recessed landing area 709 with smart landing mechanisms located on the base section 704 is raised with the movement of lifting/descending mechanisms that utilizes a motor and transmission system for its movement, then the unmanned vehicle that is equipped with a camera 724 detects the QR code 709 that is located on the landing platform 703 with a recessed area and uses this QR code for the precision landing of the unmanned vehicle 716 onto the landing platform 703, the unmanned vehicle utilizes its rolling elements that are attached to the landing gear for easy movement of the unmanned vehicle on the surface of the landing platform 703 and a recessed area is needed in order to prevent the skidding off the unmanned vehicle from the landing platform 703 during abnormal weather conditions, after the completion of the landing process the doors 701 with first alignment beams/mechanism 701a moves towards each other in order to adjust the alignment of the unmanned vehicle 716 toward the predetermined charging region (which is also known as landing platform 703) until both doors 701 makes full contact with the unmanned vehicle and push the unmanned vehicle to the landing platform 703 and then a signal is sent or the doors are stopped with a switch in order to prevent crushing damages to the unmanned vehicle 716, then second alignment beams/mechanisms 702 start to move towards each other (which are orthogonal to the first alignment beams/mechanisms 701a) and further align the orientation of the unmanned vehicle 716 in order to establish the electrical contact between the positive terminal charging contact #1 (which is labeled 719) attached to the landing mechanism of the unmanned vehicle 716 and second alignment beam/mechanism and electrical contact between the negative terminal charging contact #2 (which is labeled 720) attached to the landing mechanism of the unmanned vehicle 716 and the second alignment beam/mechanism for the charging of the on-board power module 718 by properly establishing the electrical connection between the power module 122 and the on-board power module 718 via using a switchable rectifier (also known as polarity switch) 121. For the proper charging it is essential that the positive pole 722 of the on-board power module 718 is connected to the positive terminal 123 of the power module 122 connected to the and negative pole 721 of the on-board power module 718 is connected to the negative terminal 124 of the power module 122 via electrical contact that is established by the secondary alignment beams/mechanisms 702. Once the electrical connection is established between the on-board powering device 718 and the power module 122, the improved charging mechanism detects the polarity of the onboard powering device 718, it initiates the right switches in order to initiate the charging process and then completes the charging process. All of the essential polarity states are provided in the abovementioned examples that are provided in the previous examples/embodiments can also be used for this embodiment. In order to maintain the security and safety of the landing platform and deployment system 700 (including all of the other peripherals associated with the operation of the unmanned vehicle), a fence 710 with an active deterring mechanism such as electrical shocking can be utilized to keep away animals and humans from tampering or harming the landing platform and deployment system 700 (including all of the other peripherals associated with the operation of the unmanned vehicle such as power module 122 that is needed to charge the unmanned vehicle's on-board powering device 718, weather station and its sensors 706, communication/control module 707, an improved charging mechanism 121, etc.)

FIG. 15 describes an alternative embodiment that is provided in FIG. 14 for an improved landing platform and deployment system 700 that is comprised of an unmanned vehicle 716 and a moveable landing platform with a QR code and a recessed area 709, have an integrated advanced power module (that is comprised of fuel cell systems 726, battery or other power sources 727, security device 728), switchable rectifier setup 121, an advanced weather station 712, communication/control module 707, a weed-killer and insecticide/pesticide killer 715, a camera 714, a communication device 713, a source of renewable power such as solar cell module 725 (which is collectively called Remobox station 711), and also a fence 710 with an active deterring mechanism. The landing platform and deployment system 700 can have open state and closed states for its operations. The open state enables the deployment of the unmanned vehicle and the closed state enables the storing, self-alignment, and charging of the unmanned vehicle after the unmanned vehicle is received from a mission. In the open state, the unmanned vehicle 716 resting the on the landing platform with smart landing and alignment mechanisms 703 is raised to the surface by the movement of the lifting/descending mechanisms 705 after the main doors 701 are opened. Once the landing platform 703 has full airspace, the unmanned vehicle takes off for its designated mission, then landing platform 703 is retracted back and then the doors 701 are closed. After the completion of the mission, the unmanned vehicle returns to the landing platform and deployment system for its storing, self-alignment and charging activities (also known as closed stated for the landing platform and deployment state). As the unmanned vehicle 716 approaches the landing platform and deployment system 700, it sends a signal for landing and awaits for a confirmation from the processing unit of the landing platform and deployment system 700. The ground processing unit (which is existing either within the landing platform and deployment system 700 or within the integrated power module 122, weather station 706, communication/control module 707, and the improved charging mechanism 121) makes a decision based on the sensor data aggregated from the sensors on-board of the weather station 706 and then sends a "landing is OK" signal or "landing is refused" signal to the unmanned vehicle 716 by using the communication/control module 707 or 713. If the signal is sent is landing is OK, then the unmanned vehicle continues its approach for landing, then the doors 701 are opened, and then the landing platform with a QR code and a recessed landing area 709 with smart landing mechanisms located on the base section 704 is raised with the movement of lifting/descending mechanisms that utilizes a motor and transmission system for its movement, then the unmanned vehicle that is equipped with a camera 724 detects the QR code 709 that is located on the landing platform 703 with a recessed area and uses this QR code for the precision landing of the unmanned vehicle 716 onto the landing platform 703, the unmanned vehicle utilizes its rolling elements that are attached to the landing gear for easy movement of the unmanned vehicle on the surface of the landing platform 703 and a recessed area is needed in order to prevent the skidding off the unmanned vehicle from the landing platform 703 during abnormal weather conditions, after the completion of the landing process the doors 701 with first alignment beams/mechanism 701a moves towards each other in order to adjust the alignment of the unmanned vehicle 716 toward the predetermined charging region (which is also known as landing platform 703) until both doors 701 makes full contact with the unmanned vehicle and push the unmanned vehicle to the landing platform 703 and then a signal is sent or the doors are stopped with a switch in order to prevent crushing damages to the unmanned vehicle 716, then second alignment beams/mechanisms 702 start to move towards each other (which are orthogonal to the first alignment beams/mechanisms 701a) and further align the orientation of the unmanned vehicle 716 in order to establish the electrical contact between the positive terminal charging contact #1 (which is labeled 719) attached to the landing mechanism of the unmanned vehicle 716 and second alignment beam/mechanism and electrical contact between the negative terminal charging contact #2 (which is labeled 720) attached to the landing mechanism of the unmanned vehicle 716 and the second alignment beam/mechanism for the charging of the on-board power module 718 by properly establishing the electrical connection between the power module 122 and the on-board power module 718 via using a switchable rectifier (also known as polarity switch) 121. For the proper charging it is essential that the positive pole 722 of the on-board power module 718 is connected to the positive terminal 123 of the power module 122 and negative pole 721 of the on-board power module 718 is connected to the negative terminal 124 of the power module 122 via electrical contact that is established by the secondary alignment beams/mechanisms 702. Once the electrical connection is established between the on-board powering device 718 and the power module 122, the improved charging mechanism detects the polarity of the onboard powering device 718, it initiates the right switches in order to initiate the charging process and then completes the charging process. All of the essential polarity states are provided in the abovementioned examples that are provided in the previous examples/embodiments can also be used for this embodiment. The said Remobox station provides a complete power and sensing solution to further enhance the autonomous nature of the unmanned vehicle and its charging mechanism, in which a smart charging mechanism 121, a ground based electrical energy storage and conversion device such as a battery 122, a communication/control module 707, a fuel cell power system with its own dedicated fuel storage 726, additional battery based backup powering devices or any other relevant powering devices 727, a security device such as anti-theft or anti-tamper notification sensor 728, a security camera 714 with dual functionality of monitoring the surroundings and also provide an additional tool to obtain virtual-line-of-sight feature, an advanced weather station with multiple sensors (including a hyper-local sensing device) 712, a weed/plant killer and insecticide/pesticide killer device 715 to keep the surroundings clear from weed/plant or insecticide/pesticide infestation, a communication device 713 to send/receive signals, and a renewable energy generating device such as solar cells module or photovoltaics cells module to convert ambient/solar light into additional electricity are all integrated into a single box, and makes it ideal for off-grid applications. In order to maintain the security and safety of the landing platform and deployment system 700 (including all of the other peripherals associated with the operation of the unmanned vehicle), a fence 710 with an active deterring mechanism such as electrical shocking can be utilized to keep away animals and humans from tampering or harming the landing platform and deployment system 700 (including all of the other peripherals associated with the operation of the unmanned vehicle).

FIG. 16 describes an alternative embodiment that is provided in FIG. 15 for an improved landing platform and deployment system 700 that is comprised of an unmanned vehicle 716, a moveable landing platform with a QR code and a recessed area 709, a further improved Remobox station 711 with additional interfaces to receive electricity from multiple different sources, a further improved charging mechanism 734 located on the base section of the landing platform 704 and also a fence 710 with an active deterring mechanism. The landing platform and deployment system 700 can have open state and closed states for its operations. The open state enables the deployment of the unmanned vehicle and the closed state enables the storing, self-alignment, and charging of the unmanned vehicle after the unmanned vehicle is received from a mission. In the open state, the unmanned vehicle 716 resting the on the landing platform with smart landing and alignment mechanisms 703 is raised to the surface by the movement of the lifting/descending mechanisms 705 after the main doors 701 are opened. Once the landing platform 703 with a QR code 709 and a recessed area for landing 709 has full airspace, the unmanned vehicle 716 takes off for its designated mission, then landing platform 703 is retracted back into the landing platform and deployment system 700 and then the doors 701 are closed. After the completion of the mission, the unmanned vehicle returns to the landing platform and deployment system 700 for its storing, self-alignment, and charging activities (also known as closed stated for the landing platform and deployment state 700). As the unmanned vehicle 716 approaches the landing platform and deployment system 700, it sends a signal to the ground computer or processing unit for landing and awaits for a confirmation from the processing unit of the landing platform and deployment system 700 (this processing unit can also be located inside the Remobox power and sensing station 711). The ground processing unit (which is existing either within the landing platform and deployment system 700 or within the Remobox station 711) makes a decision based on the sensor data aggregated from the sensors on-board of the weather station 706 and then sends a "landing is OK" signal or "landing is refused" signal to the unmanned vehicle 716 by using the communication/control module 707 or 713. If the signal is sent is landing is OK, then the unmanned vehicle continues its approach for landing, then the doors 701 are opened, and then the landing platform with a QR code and a recessed landing area 709 with smart landing mechanisms located on the base section 704 is raised with the movement of lifting/descending mechanisms that utilizes a motor and transmission system for its movement, then the unmanned vehicle that is equipped with a camera 724 detects the QR code 709 that is located on the landing platform 703 with a recessed area and uses this QR code for the precision landing of the unmanned vehicle 716 onto the landing platform 703, the unmanned vehicle utilizes its rolling elements that are attached to the landing gear for easy movement of the unmanned vehicle on the surface of the landing platform 703 and a recessed area is needed in order to prevent the skidding off the unmanned vehicle from the landing platform 703 during abnormal weather conditions, after the completion of the landing process the doors 701 with first alignment beams/mechanism 701a moves towards each other in order to adjust the alignment of the unmanned vehicle 716 toward the predetermined charging region (which is also known as landing platform 703) until both doors 701 makes full contact with the unmanned vehicle and push the unmanned vehicle to the landing platform 703 and then a signal is sent or the doors are stopped with a switch in order to prevent crushing damages to the unmanned vehicle 716, then second alignment beams/mechanisms 702 start to move towards each other (which are orthogonal to the first alignment beams/mechanisms 701a) and further align the orientation of the unmanned vehicle 716 in order to establish the electrical contact between the positive terminal charging contact #1 (which is labeled 719) attached to the landing mechanism of the unmanned vehicle 716 and second alignment beam/mechanism and electrical contact between the negative terminal charging contact #2 (which is labeled 720) attached to the landing mechanism of the unmanned vehicle 716 and the metallic charging plates 734 that are attached to an insulator 736 that is adhered to the second alignment beams/mechanisms 702 for the charging of the on-board power module 718 by properly establishing the electrical connection between the power module 122 and the on-board power module 718 via using a switchable rectifier (also known as polarity switch) 121. For the proper charging it is essential that the positive pole 722 of the on-board power module 718 is connected to the positive terminal 123 of the power module 122 and negative pole 721 of the on-board power module 718 is connected to the negative terminal 124 of the power module 122 via electrical contact that is established by the metallic charging plates 734 that are attached to an insulator 736 that is adhered to the second alignment beams/ mechanisms 702. Once the electrical connection is established between the on-board powering device 718 and the power module 122, the improved charging mechanism detects the polarity of the onboard powering device 718, it initiates the right switches in order to initiate the charging process and then completes the charging process. The said landing platform and deployment system 700 also have a security device 728 such as an anti-theft or anti-tamper notification sensor that alerts the authorized personnel in case its safety is being affected by an unauthorized entity. All of the essential polarity states are provided in the above-mentioned examples that are provided in the previous examples/embodiments can also be used for this embodiment. The said further improved Remobox station provides a complete power and sensing solution to further enhance the autonomous nature of the unmanned vehicle and its charging mechanism, in which a smart charging mechanism 121, a ground based electrical energy storage and conversion device such as a battery 122, a communication/control module 707, a fuel cell power system with its own dedicated fuel storage 726, additional battery based backup powering devices or any other relevant powering devices 727, has the interface to accept electrical energy from other sources existing nearby such as a solar farm or a wind farm, or any other renewable or non-renewable power producing devices or power plants, a security device such as anti-theft or anti-tamper notification sensor 728, a security camera 714 with dual functionality of monitoring the surroundings and also provide an additional tool to obtain virtual-line-of-sight feature, an advanced weather station with multiple sensors (including a hyper-local sensing device) 712, a weed/plant killer and insecticide/pesticide killer device 715 to keep the surroundings clear from weed/plant or insecticide/pesticide infestation, a communication device 713 to send/receive signals, and a renewable energy generating device such as solar cells module or photovoltaics cells module to convert ambient/solar light into additional electricity are all integrated into a single box, and makes it ideal for off-grid applications. In order to maintain the security and safety of the landing platform and deployment system 700 (including all of the other peripherals associated with the operation of the unmanned vehicle), a fence 710 with an active deterring mechanism such as electrical shocking can be utilized to keep away animals and humans from tampering or harming the landing platform and deployment system 700 (including all of the other peripherals associated with the operation of the unmanned vehicle).

FIG. 17 describes an alternative embodiment that is provided in FIG. 16 for an improved landing platform and deployment system 700 that is comprised of a solar cells module 725 integrated into the body of the landing platform and deployment system 700, an unmanned vehicle 716 with on-board charging mechanism attached to its body, a moveable landing platform with a QR code and a recessed area 709, a further improved Remobox station 711 with additional interfaces to receive electricity from multiple different sources, a further improved charging mechanism 734 located on the base section of the landing platform 704 and also a fence 710 with an active deterring mechanism. The landing platform and deployment system 700 can have open state and closed states for its operations. The open state enables the deployment of the unmanned vehicle and the closed state enables the storing, self-alignment, and charging of the unmanned vehicle after the unmanned vehicle is received from a mission. In the open state, the unmanned vehicle 716 resting the on the landing platform with smart landing and alignment mechanisms 703 is raised to the surface by the movement of the lifting/descending mechanisms 705 after the main doors 701 are opened. Once the landing platform 703 with a QR code 709 and a recessed area for landing 709 has full airspace, the unmanned vehicle 716 takes off for its designated mission, then landing platform 703 is retracted back into the landing platform and deployment system 700 and then the doors 701 are closed. After the completion of the mission, the unmanned vehicle returns to the landing platform and deployment system 700 for its storing, self-alignment, and charging activities (also known as closed stated for the landing platform and deployment state 700). As the unmanned vehicle 716 approaches the landing platform and deployment system 700, it sends a signal to the ground computer or processing unit for landing and awaits for a confirmation from the processing unit of the landing platform and deployment system 700 (this processing unit can also be located inside the Remobox power and sensing station 711). The ground processing unit (which is existing either within the landing platform and deployment system 700 or within the Remobox station 711) makes a decision based on the sensor data aggregated from the sensors on-board of the weather station 706 and then sends a "landing is OK" signal or "landing is refused" signal to the unmanned vehicle 716 by using the communication/control module 707 or 713. If the signal is sent is landing is OK, then the unmanned vehicle continues its approach for landing, then the doors 701 are opened, and then the landing platform with a QR code and a recessed landing area 709 with smart landing mechanisms located on the base section 704 is raised with the movement of lifting/descending mechanisms that utilizes a motor and transmission system for its movement, then the unmanned vehicle that is equipped with a camera 724 detects the QR code 709 that is located on the landing platform 703 with a recessed area and uses this QR code for the precision landing of the unmanned vehicle 716 onto the landing platform 703, the unmanned vehicle utilizes its rolling elements that are attached to the landing gear for easy movement of the unmanned vehicle on the surface of the landing platform 703 and a recessed area is needed in order to prevent the skidding off the unmanned vehicle from the landing platform 703 during abnormal weather conditions, after the completion of the landing process the doors 701 with first alignment beams/mechanism 701a moves towards each other in order to adjust the alignment of the unmanned vehicle 716 toward the predetermined charging region (which is also known as landing platform 703) until both doors 701 makes full contact with the unmanned vehicle and push the unmanned vehicle to the landing platform 703 and then a signal is sent or the doors are stopped with a switch in order to prevent crushing damages to the unmanned vehicle 716, then second alignment beams/mechanisms 702 start to move towards each other (which are orthogonal to the first alignment beams/mechanisms 701a) and further align the orientation of the unmanned vehicle 716 in order to establish the electrical contact between the positive terminal charging contact #1 (which is labeled 719) attached to the landing mechanism of the unmanned vehicle 716 and metallic charging plate 734 that are attached to an insulator 736 that is adhered to the second alignment beams/mechanisms 702 and electrical contact between the negative terminal charging contact #2 (which is labeled 720) attached to the landing mechanism of the unmanned vehicle 716 and the metallic charging plates 734 that are attached to an insulator 736 that is adhered to the second alignment beams/mechanisms 702 for the charging of the on-board power module 718 by properly establishing the electrical connection between the power module 122 and the on-board power module 718 via using a switchable rectifier (also known as polarity switch) 121. For the proper charging it is essential that the positive pole 722 of the on-board power module 718 is connected to the positive terminal 123 of the power module 122 and negative pole 721 of the on-board power module 718 is connected to the negative terminal 124 of the power module 122 via electrical contact that is established by the metallic charging plates 734 that are attached to an insulator 736 that is adhered to the second alignment beams/mechanisms 702. Once the electrical connection is established between the on-board powering device 718 and the power module 122, the improved charging mechanism detects the polarity of the onboard powering device 718, it initiates the right switches in order to initiate the charging process and then completes the charging process. The said landing platform and deployment system 700 also have a security device 728 such as an anti-theft or anti-tamper notification sensor that alerts the authorized personnel in case its safety is being affected by an unauthorized entity. All of the essential polarity states are provided in the abovementioned examples that are provided in the previous examples/embodiments can also be used for this embodiment. The said further improved Remobox station provides a complete power and sensing solution to further enhance the autonomous nature of the unmanned vehicle and its charging mechanism, in which a smart charging mechanism 121, a ground based electrical energy storage and conversion device such as a battery 122, a communication/control module 707, a fuel cell power system with its own dedicated fuel storage 726, additional battery based backup powering devices or any other relevant powering devices 727, has the interface to accept electrical energy from other sources existing nearby such as a solar farm or a wind farm, or any other renewable or non-renewable power producing devices or power plants, a security device such as anti-theft or anti-tamper notification sensor 728, a security camera 714 with dual functionality of monitoring the surroundings and also provide an additional tool to obtain virtual-line-of-sight feature, an advanced weather station with multiple sensors (including a hyper-local sensing device) 712, a weed/plant killer and insecticide/pesticide killer device 715 to keep the surroundings clear from weed/plant or insecticide/pesticide infestation, a communication device 713 to send/receive signals, and a renewable energy generating device such as solar cells module or photovoltaics cells module to convert ambient/solar light into additional electricity are all integrated into a single box, and makes it ideal for off-grid applications. In order to maintain the security and safety of the landing platform and deployment system 700 (including all of the other peripherals associated with the operation of the unmanned vehicle), a fence 710 with an active deterring mechanism such as electrical shocking can be utilized to keep away animals and humans from tampering or harming the landing platform and deployment system 700 (including all of the other peripherals associated with the operation of the unmanned vehicle).

FIG. 18 shows the basic schematic of an unmanned vehicle and the landing platform described in FIG. 17 in its aligned state for charging the on-board energy storage and conversion device via using its on-board charging wirings 731 and 732, its charging contacts 719 and 720 and the charging mechanisms 734 integrated into the base section 704 of the landing platform 703, where the improved landing platform and deployment system 700 is comprised of a solar cells module 725 integrated into the body of the landing platform and deployment system 700, an unmanned vehicle 716 with on-board charging mechanism (which is comprised of the followings: a charging element such as wire that connects the on-board powering device's positive terminal 732 to the charging contact 719 and a second charging element such as a wire that connects the on-board powering device's negative terminal 731 to the charging contact 720, and having the charging contacts 719 and 720 integrated to the body of the unmanned vehicle for enabling the automatic charging) attached to its body and having rolling elements connected to its landing gear for its easy movement during the self-aligning process, a moveable landing platform with a QR code and a recessed area 709, a processing unit 128, a further improved Remobox station 711 (including its weather station sensors, communication devices, a security device such as a camera, a processing unit, a weed/plant killer integrated with an insecticide/ pesticide killer, etc. and other relevant devices needed for the safe operation of the unmanned vehicle and its charging) with additional interfaces to receive electricity from multiple different sources, and a fence 710 with an active deterring mechanism. The landing platform and deployment system 700 can have open state and closed states for its operations. The open state enables the deployment of the unmanned vehicle and the closed state enables the storing, self-alignment, and charging of the unmanned vehicle after the unmanned vehicle is received from a mission. In the open state, the unmanned vehicle 716 resting the on the landing platform with smart landing and alignment mechanisms 703 which has a QR code attached to a recessed landing area 709 is raised to the surface by the movement of the lifting/ descending mechanisms 705 after the main doors 701 are opened. Once the landing platform 703 with a QR code and a recessed area for landing 709 has full airspace for safe deployment of unmanned vehicle 716, the unmanned vehicle 716 takes off for its designated mission, then landing platform 703 is retracted back into the landing platform and deployment system 700 and rests on seats for base section 730 in its fully retracted state and then the doors 701 are closed. After the completion of the mission, the unmanned vehicle returns to the landing platform and deployment system 700 for its receiving, self-alignment, charging, and storing activities (also known as closed stated for the landing platform and deployment state 700). As the unmanned vehicle 716 approaches the landing platform and deployment system 700, it sends a signal to the ground computer or processing unit for landing and awaits for a confirmation from the processing unit of the landing platform and deployment system 700 (or this processing unit can also be located inside the Remobox power and sensing station 711). The ground processing unit 128 (which is existing either within the landing platform and deployment system 700 or within the Remobox station 711) makes a decision based on the sensor data aggregated from the sensors on-board of the weather station 712 and then sends a "landing is okay" signal or "landing is refused" signal to the unmanned vehicle 716 by using the communication/control module 707 or 713. If the signal is sent is landing is OK, then the unmanned vehicle continues its approach for landing, then the doors 701 are opened, and then the landing platform with a QR code and a recessed landing area 709 with smart landing mechanisms located on the base section 704 is raised with the movement of lifting/descending mechanisms that utilizes a motor and transmission system for its movement, then the unmanned vehicle that is equipped with a camera 724 detects the QR code 709 that is located on the landing platform 703 with a recessed area and uses this QR code for the precision landing of the unmanned vehicle 716 onto the landing platform 703, the unmanned vehicle utilizes its rolling elements that are attached to the landing gear for easy movement of the unmanned vehicle on the surface of the landing platform 703 and a recessed area is needed in order to prevent the skidding off the unmanned vehicle from the landing platform 703 during abnormal weather conditions, after the completion of the landing process the doors 701 with first alignment beams/mechanism 701a moves towards each other in order to adjust the alignment of the unmanned vehicle 716 toward the predetermined charging region (which is also known as landing platform 703) with the aid of the rolling elements 733 that are attached to the landing gear of the unmanned vehicle 716 until both doors 701 makes full contact with the unmanned vehicle and push the unmanned vehicle towards the central region the landing platform 703 and then a signal is sent or the doors are stopped with a switch in order to prevent crushing damages to the unmanned vehicle 716, then second alignment beams/ mechanisms 702 start to move towards each other (which are orthogonal to the first alignment beams/mechanisms 701a) and further align the orientation of the unmanned vehicle 716 in order to establish the electrical contact between the positive terminal charging contact #1 (which is labeled 719) attached to the landing mechanism of the unmanned vehicle 716 and metallic charging plate 734 that are attached to an insulator 736 that is adhered to the second alignment beams/mechanisms 702 and electrical contact between the negative terminal charging contact #2 (which is labeled 720) attached to the landing mechanism of the unmanned vehicle 716 and the metallic charging plates 734 that are attached to an insulator 736 that is adhered to the second alignment beams/mechanisms 702 for the charging of the on-board power module 718 by properly establishing the electrical connection between the power module 122 and the on-board power module 718 via using a switchable rectifier (also known as polarity switch) 121. For the proper charging it is essential that the positive pole 722 of the on-board power module 718 is connected to the positive terminal 123 of the power module 122 and negative pole 721 of the on-board power module 718 is connected to the negative terminal 124 of the power module 122 via electrical contact that is established by the metallic charging plates 734 that are attached to an insulator 736 that is adhered to the second alignment beams/mechanisms 702. Once the electrical connection is established between the on-board powering device 718 and the power module 122, the improved charging mechanism detects the polarity of the onboard powering device 718, it initiates the right switches in order to initiate the charging process and then completes the charging process. All of the essential polarity states are provided in the abovementioned examples that are provided in the previous examples/embodiments can also be used for this embodiment. The said landing platform and deployment system 700 also have a security device 728 such as an anti-theft or anti-tamper notification sensor that alerts the authorized personnel in case its safety is being affected by an unauthorized entity. The said landing platform has a processing unit 128 such a computer to handle the autonomous operations of the unmanned vehicle and also provide a means for an external user to connect to the landing platform and deployment system 700 either physically or remotely. The said landing platform and deployment system 700 has a thermal management device 737 that is either passive or active in order to main the safe operation of the system in different climates of different environmental or weather conditions. The said further improved Remobox station provides a complete power, sensing, and processing solution to further enhance the autonomous nature of the unmanned vehicle and its charging mechanism, in which a smart charging mechanism 121, a ground based electrical energy storage and conversion device such as a battery 122, a communication/control module 707, a processing unit such as a computer 128, a fuel cell power system with its own dedicated fuel storage 726, additional battery based backup powering devices or any other relevant powering devices 727, has the interface to accept electrical energy from other sources existing nearby such as a solar farm or a wind farm, or any other renewable or non-renewable power producing devices or power plants, a security device such as anti-theft or anti-tamper notification sensor 728, a security camera 714 with dual functionality of monitoring the surroundings and also provides an additional tool to obtain virtual-line-of-sight feature, an advanced weather station with multiple sensors (including a hyper-local sensing device) 712, a weed/plant killer with an integrated insecticide/pesticide killer device 715 to keep the surroundings clear from weed/plant or insecticide/pesticide infestation, a communication device 713 to send/receive signals, and a renewable energy generating device such as solar cells module or photovoltaics cells module to convert ambient/solar light into additional electricity are all integrated into a single box, and makes it ideal for off-grid applications. The said Remobox station also has a thermal management device 737 that is either passive or active in order to make sure the Remobox station is operable under different climate or environmental conditions. In order to maintain the security and safety of the landing platform and deployment system 700 (including all of the other peripherals associated with the operation of the unmanned vehicle), a fence 710 with an active deterring mechanism such as electrical shocking can be utilized to keep away animals and humans from tampering or harming the landing platform and deployment system 700 (including all of the other peripherals associated with the operation of the unmanned vehicle).

FIG. 19 shows the basic schematic of an unmanned vehicle and it's landing platform and deployment system that is described in FIG. 18 with their individual processing units (in order to further improve the autonomous nature of these systems) in its aligned state for charging the on-board energy storage and conversion device via using its on-board charging wirings 731 and 732, its charging contacts 719 and 720 and the charging mechanisms 734 integrated into the base section 704 of the landing platform 703, where the improved landing platform and deployment system 700 is comprised of a solar cells module 725 integrated into the body of the landing platform and deployment system 700, an unmanned vehicle 716 with on-board charging mechanism (which is comprised of the followings: a charging element such as wire that connects the on-board powering device's positive terminal 732 to the charging contact 719 and a second charging element such as a wire that connects the on-board powering device's negative terminal 731 to the charging contact 720, and having the charging contacts 719 and 720 integrated to the body of the unmanned vehicle for enabling the automatic charging) attached to its body and having rolling elements connected to its landing gear for its easy movement during the self-aligning process, a moveable landing platform with a QR code and a recessed area 709, a processing unit 128, a further improved Remobox station 711 (including its weather station sensors, communication devices, a security device such as a camera, a processing unit, a weed/plant killer integrated with an insecticide/pesticide killer, etc. and other relevant devices needed for the safe operation of the unmanned vehicle and its charging) with additional interfaces to receive electricity from multiple different sources, and a fence 710 with an active deterring mechanism. The landing platform and deployment system 700 can have open state and closed states for its operations. The open state enables the deployment of the unmanned vehicle and the closed state enables the storing, self-alignment, and charging of the unmanned vehicle after the unmanned vehicle is received from a mission. In the open state, the unmanned vehicle 716 resting the on the landing platform with smart landing and alignment mechanisms 703 which has a QR code attached to a recessed landing area 709 is raised to the surface by the movement of the lifting/descending mechanisms 705 after the main doors 701 are opened. Once the landing platform 703 with a QR code and a recessed area for landing 709 has full airspace for safe deployment of unmanned vehicle 716, the unmanned vehicle 716 takes off for its designated mission, then landing platform 703 is retracted back into the landing platform and deployment system 700 and rests on seats for base section 730 in its fully retracted state and then the doors 701 are closed. After the completion of the mission, the unmanned vehicle returns to the landing platform and deployment system 700 for its receiving, self-alignment, charging, and storing activities (also known as closed stated for the landing platform and deployment state 700). As the unmanned vehicle 716 approaches the landing platform and deployment system 700, it sends a signal to the ground computer or processing unit for landing and awaits for a confirmation from the processing unit of the landing platform and deployment system 700 (or this processing unit can also be located inside the Remobox power and sensing station 711). The ground processing unit 128 (which is existing either within the landing platform and deployment system 700 or within the Remobox station 711) makes a decision based on the sensor data aggregated from the sensors on-board of the weather station 712 and then sends a "landing is okay" signal or "landing is refused" signal to the unmanned vehicle 716 by using the communication/control module 707 or 713. If the signal is sent is landing is OK, then the unmanned vehicle continues its approach for landing, then the doors 701 are opened, and then the landing platform with a QR code and a recessed landing area 709 with smart landing mechanisms located on the base section 704 is raised with the movement of lifting/descending mechanisms that utilizes a motor and transmission system for its movement, then the unmanned vehicle that is equipped with a camera 724 detects the QR code 709 that is located on the landing platform 703 with a recessed area and uses this QR code for the precision landing of the unmanned vehicle 716 onto the landing platform 703, the unmanned vehicle utilizes its rolling elements that are attached to the landing gear for easy movement of the unmanned vehicle on the surface of the landing platform 703 and a recessed area is needed in order to prevent the skidding off the unmanned vehicle from the landing platform 703 during abnormal weather conditions, after the completion of the landing process the doors 701 with first alignment beams/mechanism 701*a* moves towards each other in order to adjust the alignment of the unmanned vehicle 716 toward the predetermined charging region (which is also known as landing platform 703) with the aid of the rolling elements 733 that are attached to the landing gear of the unmanned vehicle 716 until both doors 701 makes full contact with the unmanned vehicle and push the unmanned vehicle towards the central region the landing platform 703 and then a signal is sent or the doors are stopped with a switch in order to prevent crushing damages to the unmanned vehicle 716, then second alignment beams/ mechanisms 702 start to move towards each other (which are orthogonal to the first alignment beams/mechanisms 701*a*) and further align the orientation of the unmanned vehicle 716 in order to establish the electrical contact between the positive terminal charging contact #1 (which is labeled 719) attached to the landing mechanism of the unmanned vehicle 716 and metallic charging plate 734 that are attached to an insulator 736 that is adhered to the second alignment beams/mechanisms 702 and electrical contact between the negative terminal charging contact #2 (which is labeled 720) attached to the landing mechanism of the unmanned vehicle 716 and the metallic charging plates 734 that are attached to an insulator 736 that is adhered to the second alignment beams/mechanisms 702 for the charging of the on-board power module 718 by properly establishing the electrical connection between the power module 122 and the on-board power module 718 via using a switchable rectifier (also known as polarity switch) 121. For the proper charging it is essential that the positive pole 722 of the on-board power module 718 is connected to the positive terminal 123 of the power module 122 and negative pole 721 of the on-board power module 718 is connected to the negative terminal 124 of the power module 122 via electrical contact that is established by the metallic charging plates 734 that are attached to an insulator 736 that is adhered to the second alignment beams/mechanisms 702. Once the electrical connection is established between the on-board powering device 718 and the power module 122, the improved charging mechanism detects the polarity of the onboard powering device 718, it initiates the right switches in order to initiate the charging process and then completes the charging process. All of the essential polarity states are provided in the abovementioned examples that are provided in the previous examples/embodiments can also be used for this embodiment. The said landing platform and deployment system 700 also have a security device 728 such as an anti-theft or anti-tamper notification sensor that alerts the authorized personnel in case its safety is being affected by an unauthorized entity. The said landing platform has a processing unit 128 such a computer to handle the autonomous operations of the unmanned vehicle and also provide a means for an external user to connect to the landing platform and deployment system 700 either physically or remotely. The said landing platform and deployment system 700 has a thermal management device 737 that is either passive or active in order to main the safe operation of the system in different climates of different environmental or weather conditions. The said further improved Remobox station provides a complete power, sensing, and processing solution to further enhance the autonomous nature of the unmanned vehicle and its charging mechanism, in which a smart charging mechanism 121, a ground based electrical energy storage and conversion device such as a battery 122, a communication/control module 707, a processing unit such as a computer 128, a fuel cell power system with its own dedicated fuel storage 726, additional battery based backup powering devices or any other relevant powering devices 727, has the interface to accept electrical energy from other sources existing nearby such as a solar farm or a wind farm, or any other renewable or non-renewable power producing devices or power plants, a security device such as anti-theft or anti-tamper notification sensor 728, a security camera 714 with dual functionality of monitoring the surroundings and also provides an additional tool to obtain virtual-line-of-sight feature, an advanced weather station with multiple sensors (including a hyper-local sensing device) 712, a weed/plant killer with an integrated insecticide/pesticide killer device 715 to keep the surroundings clear from weed/plant or insecticide/pesticide infestation, a communication device 713 to send/receive signals, and a renewable energy generating device such as solar cells module or photovoltaics cells module to convert ambient/solar light into additional electricity are all integrated into a single box, and makes it ideal for off-grid applications. The said Remobox station also has a thermal management device 737 that is either passive or active in order to make sure the Remobox station is operable under different climate or environmental conditions. In order to maintain the security and safety of the landing platform and deployment system 700 (including all of the other peripherals associated with the operation of the unmanned vehicle), a fence 710 with an active deterring mechanism such as electrical shocking can be utilized to keep away animals and humans from tampering or harming the landing platform and deployment system 700 (including all of the other peripherals associated with the operation of the unmanned vehicle).

FIG. 20 shows an alternative embodiment of an unmanned vehicle and it's landing platform and deployment system that is described in FIG. 19 with their individual processing units (in order to further improve the autonomous nature of these systems) in its aligned state for charging the on-board energy storage and conversion device via using its on-board charging wirings 731 and 732, its charging contacts 719 and 720 and the charging mechanisms 734 integrated into the base section 704 of the landing platform 703, where the improved landing platform and deployment system 700 is comprised of a solar cells module 725 integrated into the body of the landing platform and deployment system 700, an unmanned vehicle 716 with on-board charging mechanism (which is comprised of the followings: a charging element such as wire that connects the on-board powering device's positive terminal 732 to the charging contact 719 and a second charging element such as a wire that connects the on-board powering device's negative terminal 731 to the charging contact 720, and having the charging contacts 719 and 720 integrated to the body of the unmanned vehicle for enabling the automatic charging) attached to its body and having rolling elements connected to its landing gear for its easy movement during the self-aligning process, a moveable landing platform with a QR code and a recessed area 709, a processing unit 128, a further improved Remobox station 711 (including its weather station sensors, communication devices, a security device such as a camera, a processing unit, a weed/plant killer integrated with an insecticide/pesticide killer, etc. and other relevant devices needed for the safe operation of the unmanned vehicle and its charging) with additional interfaces to receive electricity from multiple different sources, and a fence 710 with an active deterring mechanism. The landing platform and deployment system 700 can have open state and closed states for its operations. The open state enables the deployment of the unmanned vehicle and the closed state enables the storing, self-alignment, and charging of the unmanned vehicle after the unmanned vehicle is received from a mission. In the open state, the unmanned vehicle 716 resting the on the landing platform with smart landing and alignment mechanisms 703 which has a QR code attached to a recessed landing area 709 is raised to the surface by the movement of the lifting/descending mechanisms 705 after the main doors 701 are opened. Once the landing platform 703 with a QR code and a recessed area for landing 709 has full airspace for safe deployment of unmanned vehicle 716, the unmanned vehicle 716 takes off for its designated mission, then landing platform 703 is retracted back into the landing platform and deployment system 700 and rests on seats for base section 730 in its fully retracted state and then the doors 701 are closed. After the completion of the mission, the unmanned vehicle returns to the landing platform and deployment system 700 for its receiving, self-alignment, charging, and storing activities (also known as closed stated for the landing platform and deployment state 700). As the unmanned vehicle 716 approaches the landing platform and deployment system 700, it sends a signal to the ground computer or processing unit for landing and awaits for a confirmation from the processing unit of the landing platform and deployment system 700 (or this processing unit can also be located inside the Remobox power and sensing station 711). The ground processing unit 128 (which is existing either within the landing platform and deployment system 700 or within the Remobox station 711) makes a decision based on the sensor data aggregated from the sensors on-board of the weather station 712 and then sends a "landing is okay" signal or "landing is refused" signal to the unmanned vehicle 716 by using the communication/control module 707 or 713. If the signal is sent is landing is OK, then the unmanned vehicle continues its approach for landing, then the doors 701 are opened, and then the landing platform with a QR code and a recessed landing area 709 with smart landing mechanisms located on the base section 704 is raised with the movement of lifting/descending mechanisms that utilizes a motor and transmission system for its movement, then the unmanned vehicle that is equipped with a camera 724 detects the QR code 709 that is located on the landing platform 703 with a recessed area and uses this QR code for the precision landing of the unmanned vehicle 716 onto the landing platform 703, the unmanned vehicle utilizes its rolling elements that are attached to the landing gear for easy movement of the unmanned vehicle on the surface of the landing platform 703 and a recessed area is needed in order to prevent the skidding off the unmanned vehicle from the landing platform 703 during abnormal weather conditions, after the completion of the landing process the doors 701 with first alignment beams/mechanism 701a moves towards each other in order to adjust the alignment of the unmanned vehicle 716 toward the predetermined charging region (which is also known as landing platform 703) with the aid of the rolling elements 733 that are attached to the landing gear of the unmanned vehicle 716 until both doors 701 makes full contact with the unmanned vehicle and push the unmanned vehicle towards the central region the landing platform 703 and then a signal is sent or the doors are stopped with a switch in order to prevent crushing damages to the unmanned vehicle 716, then second alignment beams/mechanisms 702 start to move towards each other (which are orthogonal to the first alignment beams/mechanisms 701a) and further align the orientation of the unmanned vehicle 716 in order to establish the electrical contact between the positive terminal charging contact #1 (which is labeled 719) attached to the landing mechanism of the unmanned vehicle 716 and metallic charging plate 734 that are attached to an insulator 736 that is adhered to the second alignment beams/mechanisms 702 and electrical contact between the negative terminal charging contact #2 (which is labeled 720) attached to the landing mechanism of the unmanned vehicle 716 and the metallic charging plates 734 that are attached to an insulator 736 that is adhered to the second alignment beams/mechanisms 702 for the charging of the on-board power module 718 by properly establishing the electrical connection between the power module 122 and the on-board power module 718 via using a switchable rectifier (also known as polarity switch) 121. For the proper charging it is essential that the positive pole 722 of the on-board power module 718 is connected to the positive terminal 123 of the power module 122 and negative pole 721 of the on-board power module 718 is connected to the negative terminal 124 of the power module 122 via electrical contact that is established by the metallic charging plates 734 that are attached to an insulator 736 that is adhered to the second alignment beams/mechanisms 702. Once the electrical connection is established between the on-board powering device 718 and the power module 122, the improved charging mechanism detects the polarity of the onboard powering device 718, it initiates the right switches in order to initiate the charging process and then completes the charging process. All of the essential polarity states are provided in the abovementioned examples that are provided in the previous examples/embodiments can also be used for this embodiment. The said landing platform and deployment system 700 also have a security device 728 such as an anti-theft or anti-tamper notification sensor that alerts the authorized personnel in case its safety is being affected by an unauthorized entity. The said landing platform has a processing unit 128 such a computer to handle the autonomous operations of the unmanned vehicle and also provide a means for an external user to connect to the landing platform and deployment system 700 either physically or remotely. The said landing platform and deployment system 700 has a thermal management device 737 that is either passive or active in order to main the safe operation of the system in different climates of different environmental or weather conditions. The said further improved Remobox station provides a complete power, sensing, and processing solution to further enhance the autonomous nature of the unmanned vehicle and its charging mechanism, in which a smart charging mechanism 121, a ground based electrical energy storage and conversion device such as a battery 122, a communication/control module 707, a processing unit such as a computer 128, a fuel cell power system with its own dedicated fuel storage 726, additional battery based backup powering devices or any other relevant powering devices 727, has the interface to accept electrical energy from other sources existing nearby such as a solar farm or a wind farm, or any other renewable or non-renewable power producing devices or power plants, a security device such as anti-theft or anti-tamper notification sensor 728, a security camera 714 with dual functionality of monitoring the surroundings and also provides an additional tool to obtain virtual-line-of-sight feature, an advanced weather station with multiple sensors (including a hyper-local sensing device) 712, a weed/plant killer with an integrated insecticide/pesticide killer device 715 to keep the surroundings clear from weed/plant or insecticide/pesticide infestation, a communication device 713 to send/receive signals, and a renewable energy generating device such as solar cells module or photovoltaics cells module to convert ambient/solar light into additional electricity are all integrated into a single box, and makes it ideal for off-grid applications. The said Remobox station also has a thermal management device 737 that is either passive or active in order to make sure the Remobox station is operable under different climate or environmental conditions. In order to maintain the security and safety of the landing platform and deployment system 700 (including all of the other peripherals associated with the operation of the unmanned vehicle), a fence 710 with an active deterring mechanism such as electrical shocking can be utilized to keep away animals and humans from tampering or harming the landing platform and deployment system 700 (including all of the other peripherals associated with the operation of the unmanned vehicle). In this embodiment, the solar cell module(s) have the capability of staying planar or moving along certain axis in order to keep the surface the solar cells clean, orient the solar cells in a direction to further improve the solar energy conversion efficiency, etc. Furthermore, the exterior look of the landing and deployment system, unmanned vehicle, and Remobox is designed to have a camouflaged texture for defense applications using the appropriate color/texture/markings that have been specified by authorities of that particular agency such as green colored exterior or camo textured colored exterior, etc.

FIG. 21 shows an alternative embodiment of an unmanned vehicle and it's landing platform and deployment system that is described in FIG. 19 with their individual processing units (in order to further improve the autonomous nature of these systems) in its aligned state for charging the on-board energy storage and conversion device via using its on-board charging wirings 731 and 732, its charging contacts 719 and 720 and the charging mechanisms 734 integrated into the base section 704 of the landing platform 703, where the improved landing platform and deployment system 700 is comprised of a solar cells module 725 integrated into the body of the landing platform and deployment system 700, an unmanned vehicle 716 with on-board charging mechanism (which is comprised of the followings: a charging element such as wire that connects the on-board powering device's positive terminal 732 to the charging contact 719 and a second charging element such as a wire that connects the on-board powering device's negative terminal 731 to the charging contact 720, and having the charging contacts 719 and 720 integrated to the body of the unmanned vehicle for enabling the automatic charging) attached to its body and having rolling elements connected to its landing gear for its easy movement during the self-aligning process, a moveable landing platform with a QR code and a recessed area 709, a processing unit 128, a further improved Remobox station 711 (including its weather station sensors, communication devices, a security device such as a camera, a processing unit, a weed/plant killer integrated with an insecticide/pesticide killer, etc. and other relevant devices needed for the safe operation of the unmanned vehicle and its charging) with additional interfaces to receive electricity from multiple different sources, and a fence 710 with an active deterring mechanism. The landing platform and deployment system 700 can have open state and closed states for its operations. The open state enables the deployment of the unmanned vehicle and the closed state enables the storing, self-alignment, and charging of the unmanned vehicle after the unmanned vehicle is received from a mission. In the open state, the unmanned vehicle 716 resting the on the landing platform with smart landing and alignment mechanisms 703 which has a QR code attached to a recessed landing area 709 is raised to the surface by the movement of the lifting/descending mechanisms 705 after the main doors 701 are opened. Once the landing platform 703 with a QR code and a recessed area for landing 709 has full airspace for safe deployment of unmanned vehicle 716, the unmanned vehicle 716 takes off for its designated mission, then landing platform 703 is retracted back into the landing platform and deployment system 700 and rests on seats for base section 730 in its fully retracted state and then the doors 701 are closed. After the completion of the mission, the unmanned vehicle returns to the landing platform and deployment system 700 for its receiving, self-alignment, charging, and storing activities (also known as closed stated for the landing platform and deployment state 700). As the unmanned vehicle 716 approaches the landing platform and deployment system 700, it sends a signal to the ground computer or processing unit for landing and awaits for a confirmation from the processing unit of the landing platform and deployment system 700 (or this processing unit can also be located inside the Remobox power and sensing station 711). The ground processing unit 128 (which is existing either within the landing platform and deployment system 700 or within the Remobox station 711) makes a decision based on the sensor data aggregated from the sensors on-board of the weather station 712 and then sends a "landing is okay" signal or "landing is refused" signal to the unmanned vehicle 716 by using the communication/control module 707 or 713. If the signal is sent is landing is OK, then the unmanned vehicle continues its approach for landing, then the doors 701 are opened, and then the landing platform with a QR code and a recessed landing area 709 with smart landing mechanisms located on the base section 704 is raised with the movement of lifting/descending mechanisms that utilizes a motor and transmission system for its movement, then the unmanned vehicle that is equipped with a camera 724 detects the QR code 709 that is located on the landing platform 703 with a recessed area and uses this QR code for the precision landing of the unmanned vehicle 716 onto the landing platform 703, the unmanned vehicle utilizes its rolling elements that are attached to the landing gear for easy movement of the unmanned vehicle on the surface of the landing platform 703 and a recessed area is needed in order to prevent the skidding off the unmanned vehicle from the landing platform 703 during abnormal weather conditions, after the completion of the landing process the doors 701 with first alignment beams/mechanism 701a moves towards each other in order to adjust the alignment of the unmanned vehicle 716 toward the predetermined charging region (which is also known as landing platform 703) with the aid of the rolling elements 733 that are attached to the landing gear of the unmanned vehicle 716 until both doors 701 makes full contact with the unmanned vehicle and push the unmanned vehicle towards the central region the landing platform 703 and then a signal is sent or the doors are stopped with a switch in order to prevent crushing damages to the unmanned vehicle 716, then second alignment beams/mechanisms 702 start to move towards each other (which are orthogonal to the first alignment beams/mechanisms 701a) and further align the orientation of the unmanned vehicle 716 in order to establish the electrical contact between the positive terminal charging contact #1 (which is labeled 719) attached to the landing mechanism of the unmanned vehicle 716 and metallic charging plate 734 that are attached to an insulator 736 that is adhered to the second alignment beams/mechanisms 702 and electrical contact between the negative terminal charging contact #2 (which is labeled 720) attached to the landing mechanism of the unmanned vehicle 716 and the metallic charging plates 734 that are attached to an insulator 736 that is adhered to the second alignment beams/mechanisms 702 for the charging of the on-board power module 718 by properly establishing the electrical connection between the power module 122 and the on-board power module 718 via using a switchable rectifier (also known as polarity switch) 121. For the proper charging it is essential that the positive pole 722 of the on-board power module 718 is connected to the positive terminal 123 of the power module 122 and negative pole 721 of the on-board power module 718 is connected to the negative terminal 124 of the power module 122 via electrical contact that is established by the metallic charging plates 734 that are attached to an insulator 736 that is adhered to the second alignment beams/mechanisms 702. Once the electrical connection is established between the on-board powering device 718 and the power module 122, the improved charging mechanism detects the polarity of the onboard powering device 718, it initiates the right switches in order to initiate the charging process and then completes the charging process. All of the essential polarity states are provided in the abovementioned examples that are provided in the previous examples/embodiments can also be used for this embodiment. The said landing platform and deployment system 700 also have a security device 728 such as an anti-theft or anti-tamper notification sensor that alerts the authorized personnel in case its safety is being affected by an unauthorized entity. The said landing platform has a processing unit 128 such a computer to handle the autonomous operations of the unmanned vehicle and also provide a means for an external user to connect to the landing platform and deployment system 700 either physically or remotely. The said landing platform and deployment system 700 has a thermal management device 737 that is either passive or active in order to main the safe operation of the system in different climates of different environmental or weather conditions. The said further improved Remobox station provides a complete power, sensing, and processing solution to further enhance the autonomous nature of the unmanned vehicle and its charging mechanism, in which a smart charging mechanism 121, a ground based electrical energy storage and conversion device such as a battery 122, a communication/control module 707, a processing unit such as a computer 128, a fuel cell power system with its own dedicated fuel storage 726, additional battery based backup powering devices or any other relevant powering devices 727, has the interface to accept electrical energy from other sources existing nearby such as a solar farm or a wind farm, or any other renewable or non-renewable power producing devices or power plants, a security device such as anti-theft or anti-tamper notification sensor 728, a security camera 714 with dual functionality of monitoring the surroundings and also provides an additional tool to obtain virtual-line-of-sight feature, an advanced weather station with multiple sensors (including a hyper-local sensing device) 712, a weed/plant killer with an integrated insecticide/pesticide killer device 715 to keep the surroundings clear from weed/plant or insecticide/pesticide infestation, a communication device 713 to send/receive signals, and a renewable energy generating device such as solar cells module or photovoltaics cells module to convert ambient/solar light into additional electricity are all integrated into a single box, and makes it ideal for off-grid applications. The said Remobox station also has a thermal management device 737 that is either passive or active in order to make sure the Remobox station is operable under different climate or environmental conditions. In order to maintain the security and safety of the landing platform and deployment system 700 (including all of the other peripherals associated with the operation of the unmanned vehicle), a fence 710 with an active deterring mechanism such as electrical shocking can be utilized to keep away animals and humans from tampering or harming the landing platform and deployment system 700 (including all of the other peripherals associated with the operation of the unmanned vehicle). In this embodiment, the solar cell module(s) have the capability of staying planar or moving along certain axis in order to keep the surface the solar cells clean, orient the solar cells in a direction to further improve the solar energy conversion efficiency, etc. Furthermore, the exterior look of the landing and deployment system, unmanned vehicle, and Remobox is designed to have the theme of a smart city concept using the appropriate color/texture/markings selected by that particular city authorities/community members such as white-to-gray background color with gray text color and blue partial-text coloring for Singapore, etc., FIG. 22 shows an alternative embodiment of an unmanned vehicle and it's landing platform and deployment system that is described in FIG. 19 with their individual processing units (in order to further improve the autonomous nature of these systems) in its aligned state for charging the on-board energy storage and conversion device via using its on-board charging wirings 731 and 732, its charging contacts 719 and 720 and the charging mechanisms 734 integrated into the base section 704 of the landing platform 703, where the improved landing platform and deployment system 700 is comprised of a solar cells module 725 integrated into the body of the landing platform and deployment system 700, an unmanned vehicle 716 with on-board charging mechanism (which is comprised of the followings: a charging element such as wire that connects the on-board powering device's positive terminal 732 to the charging contact 719 and a second charging element such as a wire that connects the on-board powering device's negative terminal 731 to the charging contact 720, and having the charging contacts 719 and 720 integrated to the body of the unmanned vehicle for enabling the automatic charging) attached to its body and having rolling elements connected to its landing gear for its easy movement during the self-aligning process, a moveable landing platform with a QR code and a recessed area 709, a processing unit 128, a further improved Remobox station 711 (including its weather station sensors, communication devices, a security device such as a camera, a processing unit, a weed/plant killer integrated with an insecticide/pesticide killer, etc. and other relevant devices needed for the safe operation of the unmanned vehicle and its charging) with additional interfaces to receive electricity from multiple different sources, and a fence 710 with an active deterring mechanism. The landing platform and deployment system 700 can have open state and closed states for its operations. The open state enables the deployment of the unmanned vehicle and the closed state enables the storing, self-alignment, and charging of the unmanned vehicle after the unmanned vehicle is received from a mission. In the open state, the unmanned vehicle 716 resting the on the landing platform with smart landing and alignment mechanisms 703 which has a QR code attached to a recessed landing area 709 is raised to the surface by the movement of the lifting/descending mechanisms 705 after the main doors 701 are opened. Once the landing platform 703 with a QR code and a recessed area for landing 709 has full airspace for safe deployment of unmanned vehicle 716, the unmanned vehicle 716 takes off for its designated mission, then landing platform 703 is retracted back into the landing platform and deployment system 700 and rests on seats for base section 730 in its fully retracted state and then the doors 701 are closed. After the completion of the mission, the unmanned vehicle returns to the landing platform and deployment system 700 for its receiving, self-alignment, charging, and storing activities (also known as closed stated for the landing platform and deployment state 700). As the unmanned vehicle 716 approaches the landing platform and deployment system 700, it sends a signal to the ground computer or processing unit for landing and awaits for a confirmation from the processing unit of the landing platform and deployment system 700 (or this processing unit can also be located inside the Remobox power and sensing station 711). The ground processing unit 128 (which is existing either within the landing platform and deployment system 700 or within the Remobox station 711) makes a decision based on the sensor data aggregated from the sensors on-board of the weather station 712 and then sends a "landing is okay" signal or "landing is refused" signal to the unmanned vehicle 716 by using the communication/control module 707 or 713. If the signal is sent is landing is OK, then the unmanned vehicle continues its approach for landing, then the doors 701 are opened, and then the landing platform with a QR code and a recessed landing area 709 with smart landing mechanisms located on the base section 704 is raised with the movement of lifting/descending mechanisms that utilizes a motor and transmission system for its movement, then the unmanned vehicle that is equipped with a camera 724 detects the QR code 709 that is located on the landing platform 703 with a recessed area and uses this QR code for the precision landing of the unmanned vehicle 716 onto the landing platform 703, the unmanned vehicle utilizes its rolling elements that are attached to the landing gear for easy movement of the unmanned vehicle on the surface of the landing platform 703 and a recessed area is needed in order to prevent the skidding off the unmanned vehicle from the landing platform 703 during abnormal weather conditions, after the completion of the landing process the doors 701 with first alignment beams/mechanism 701*a* moves towards each other in order to adjust the alignment of the unmanned vehicle 716 toward the predetermined charging region (which is also known as landing platform 703) with the aid of the rolling elements 733 that are attached to the landing gear of the unmanned vehicle 716 until both doors 701 makes full contact with the unmanned vehicle and push the unmanned vehicle towards the central region the landing platform 703 and then a signal is sent or the doors are stopped with a switch in order to prevent crushing damages to the unmanned vehicle 716, then second alignment beams/mechanisms 702 start to move towards each other (which are orthogonal to the first alignment beams/mechanisms 701*a*) and further align the orientation of the unmanned vehicle 716 in order to establish the electrical contact between the positive terminal charging contact #1 (which is labeled 719) attached to the landing mechanism of the unmanned vehicle 716 and metallic charging plate 734 that are attached to an insulator 736 that is adhered to the second alignment beams/mechanisms 702 and electrical contact between the negative terminal charging contact #2 (which is labeled 720) attached to the landing mechanism of the unmanned vehicle 716 and the metallic charging plates 734 that are attached to an insulator 736 that is adhered to the second alignment beams/mechanisms 702 for the charging of the on-board power module 718 by properly establishing the electrical connection between the power module 122 and the on-board power module 718 via using a switchable rectifier (also known as polarity switch) 121. For the proper charging it is essential that the positive pole 722 of the on-board power module 718 is connected to the positive terminal 123 of the power module 122 and negative pole 721 of the on-board power module 718 is connected to the negative terminal 124 of the power module 122 via electrical contact that is established by the metallic charging plates 734 that are attached to an insulator 736 that is adhered to the second alignment beams/mechanisms 702. Once the electrical connection is established between the on-board powering device 718 and the power module 122, the improved charging mechanism detects the polarity of the onboard powering device 718, it initiates the right switches in order to initiate the charging process and then completes the charging process. All of the essential polarity states are provided in the abovementioned examples that are provided in the previous examples/embodiments can also be used for this embodiment. The said landing platform and deployment system 700 also have a security device 728 such as an anti-theft or anti-tamper notification sensor that alerts the authorized personnel in case its safety is being affected by an unauthorized entity. The said landing platform has a processing unit 128 such a computer to handle the autonomous operations of the unmanned vehicle and also provide a means for an external user to connect to the landing platform and deployment system 700 either physically or remotely. The said landing platform and deployment system 700 has a thermal management device 737 that is either passive or active in order to main the safe operation of the system in different climates of different environmental or weather conditions. The said further improved Remobox station provides a complete power, sensing, and processing solution to further enhance the autonomous nature of the unmanned vehicle and its charging mechanism, in which a smart charging mechanism 121, a ground based electrical energy storage and conversion device such as a battery 122, a communication/control module 707, a processing unit such as a computer 128, a fuel cell power system with its own dedicated fuel storage 726, additional battery based backup powering devices or any other relevant powering devices 727, has the interface to accept electrical energy from other sources existing nearby such as a solar farm or a wind farm, or any other renewable or non-renewable power producing devices or power plants, a security device such as anti-theft or anti-tamper notification sensor 728, a security camera 714 with dual functionality of monitoring the surroundings and also provides an additional tool to obtain virtual-line-of-sight feature, an advanced weather station with multiple sensors (including a hyper-local sensing device) 712, a weed/plant killer with an integrated insecticide/pesticide killer device 715 to keep the surroundings clear from weed/plant or insecticide/pesticide infestation, a communication device 713 to send/receive signals, and a renewable energy generating device such as solar cells module or photovoltaics cells module to convert ambient/solar light into additional electricity are all integrated into a single box, and makes it ideal for off-grid applications. The said Remobox station also has a thermal management device 737 that is either passive or active in order to make sure the Remobox station is operable under different climate or environmental conditions. In order to maintain the security and safety of the landing platform and deployment system 700 (including all of the other peripherals associated with the operation of the unmanned vehicle), a fence 710 with an active deterring mechanism such as electrical shocking can be utilized to keep away animals and humans from tampering or harming the landing platform and deployment system 700 (including all of the other peripherals associated with the operation of the unmanned vehicle). In this embodiment, the solar cell module(s) have the capability of staying planar or moving along certain axis in order to keep the surface the solar cells clean, orient the solar cells in a direction to further improve the solar energy conversion efficiency, etc. Furthermore, the exterior look of the landing and deployment system, unmanned vehicle, and Remobox is designed to have the theme relevant to a construction-site concept (that has been selected by the representing authorities of that particular agency or entity) using the appropriate color/texture/markings such as orange or yellow background color with properly angled black and orange or yellow stripes, etc.

FIG. 23 shows an alternative embodiment of an unmanned vehicle and it's landing platform and deployment system that is described in FIG. 19 with their individual processing units (in order to further improve the autonomous nature of these systems) in its aligned state for charging the on-board energy storage and conversion device via using its on-board charging wirings 731 and 732, its charging contacts 719 and 720 and the charging mechanisms 734 integrated into the base section 704 of the landing platform 703, where the improved landing platform and deployment system 700 is comprised of a solar cells module 725 integrated into the body of the landing platform and deployment system 700, an unmanned vehicle 716 with on-board charging mechanism (which is comprised of the followings: a charging element such as wire that connects the on-board powering device's positive terminal 732 to the charging contact 719 and a second charging element such as a wire that connects the on-board powering device's negative terminal 731 to the charging contact 720, and having the charging contacts 719 and 720 integrated to the body of the unmanned vehicle for enabling the automatic charging) attached to its body and having rolling elements connected to its landing gear for its easy movement during the self-aligning process, a moveable landing platform with a QR code and a recessed area 709, a processing unit 128, a further improved Remobox station 711 (including its weather station sensors, communication devices, a security device such as a camera, a processing unit, a weed/plant killer integrated with an insecticide/pesticide killer, etc. and other relevant devices needed for the safe operation of the unmanned vehicle and its charging) with additional interfaces to receive electricity from multiple different sources, and a fence 710 with an active deterring mechanism. The landing platform and deployment system 700 can have open state and closed states for its operations. The open state enables the deployment of the unmanned vehicle and the closed state enables the storing, self-alignment, and charging of the unmanned vehicle after the unmanned vehicle is received from a mission. In the open state, the unmanned vehicle 716 resting the on the landing platform with smart landing and alignment mechanisms 703 which has a QR code attached to a recessed landing area 709 is raised to the surface by the movement of the lifting/descending mechanisms 705 after the main doors 701 are opened. Once the landing platform 703 with a QR code and a recessed area for landing 709 has full airspace for safe deployment of unmanned vehicle 716, the unmanned vehicle 716 takes off for its designated mission, then landing platform 703 is retracted back into the landing platform and deployment system 700 and rests on seats for base section 730 in its fully retracted state and then the doors 701 are closed. After the completion of the mission, the unmanned vehicle returns to the landing platform and deployment system 700 for its receiving, self-alignment, charging, and storing activities (also known as closed stated for the landing platform and deployment state 700). As the unmanned vehicle 716 approaches the landing platform and deployment system 700, it sends a signal to the ground computer or processing unit for landing and awaits for a confirmation from the processing unit of the landing platform and deployment system 700 (or this processing unit can also be located inside the Remobox power and sensing station 711). The ground processing unit 128 (which is existing either within the landing platform and deployment system 700 or within the Remobox station 711) makes a decision based on the sensor data aggregated from the sensors on-board of the weather station 712 and then sends a "landing is okay" signal or "landing is refused" signal to the unmanned vehicle 716 by using the communication/control module 707 or 713. If the signal is sent is landing is OK, then the unmanned vehicle continues its approach for landing, then the doors 701 are opened, and then the landing platform with a QR code and a recessed landing area 709 with smart landing mechanisms located on the base section 704 is raised with the movement of lifting/descending mechanisms that utilizes a motor and transmission system for its movement, then the unmanned vehicle that is equipped with a camera 724 detects the QR code 709 that is located on the landing platform 703 with a recessed area and uses this QR code for the precision landing of the unmanned vehicle 716 onto the landing platform 703, the unmanned vehicle utilizes its rolling elements that are attached to the landing gear for easy movement of the unmanned vehicle on the surface of the landing platform 703 and a recessed area is needed in order to prevent the skidding off the unmanned vehicle from the landing platform 703 during abnormal weather conditions, after the completion of the landing process the doors 701 with first alignment beams/mechanism 701a moves towards each other in order to adjust the alignment of the unmanned vehicle 716 toward the predetermined charging region (which is also known as landing platform 703) with the aid of the rolling elements 733 that are attached to the landing gear of the unmanned vehicle 716 until both doors 701 makes full contact with the unmanned vehicle and push the unmanned vehicle towards the central region the landing platform 703 and then a signal is sent or the doors are stopped with a switch in order to prevent crushing damages to the unmanned vehicle 716, then second alignment beams/mechanisms 702 start to move towards each other (which are orthogonal to the first alignment beams/mechanisms 701a) and further align the orientation of the unmanned vehicle 716 in order to establish the electrical contact between the positive terminal charging contact #1 (which is labeled 719) attached to the landing mechanism of the unmanned vehicle 716 and metallic charging plate 734 that are attached to an insulator 736 that is adhered to the second alignment beams/mechanisms 702 and electrical contact between the negative terminal charging contact #2 (which is labeled 720) attached to the landing mechanism of the unmanned vehicle 716 and the metallic charging plates 734 that are attached to an insulator 736 that is adhered to the second alignment beams/mechanisms 702 for the charging of the on-board power module 718 by properly establishing the electrical connection between the power module 122 and the on-board power module 718 via using a switchable rectifier (also known as polarity switch) 121. For the proper charging it is essential that the positive pole 722 of the on-board power module 718 is connected to the positive terminal 123 of the power module 122 and negative pole 721 of the on-board power module 718 is connected to the negative terminal 124 of the power module 122 via electrical contact that is established by the metallic charging plates 734 that are attached to an insulator 736 that is adhered to the second alignment beams/mechanisms 702. Once the electrical connection is established between the on-board powering device 718 and the power module 122, the improved charging mechanism detects the polarity of the onboard powering device 718, it initiates the right switches in order to initiate the charging process and then completes the charging process. All of the essential polarity states are provided in the abovementioned examples that are provided in the previous examples/embodiments can also be used for this embodiment. The said landing platform and deployment system 700 also have a security device 728 such as an anti-theft or anti-tamper notification sensor that alerts the authorized personnel in case its safety is being affected by an unauthorized entity. The said landing platform has a processing unit 128 such a computer to handle the autonomous operations of the unmanned vehicle and also provide a means for an external user to connect to the landing platform and deployment system 700 either physically or remotely. The said landing platform and deployment system 700 has a thermal management device 737 that is either passive or active in order to main the safe operation of the system in different climates of different environmental or weather conditions. The said further improved Remobox station provides a complete power, sensing, and processing solution to further enhance the autonomous nature of the unmanned vehicle and its charging mechanism, in which a smart charging mechanism 121, a ground based electrical energy storage and conversion device such as a battery 122, a communication/control module 707, a processing unit such as a computer 128, a fuel cell power system with its own dedicated fuel storage 726, additional battery based backup powering devices or any other relevant powering devices 727, has the interface to accept electrical energy from other sources existing nearby such as a solar farm or a wind farm, or any other renewable or non-renewable power producing devices or power plants, a security device such as anti-theft or anti-tamper notification sensor 728, a security camera 714 with dual functionality of monitoring the surroundings and also provides an additional tool to obtain virtual-line-of-sight feature, an advanced weather station with multiple sensors (including a hyper-local sensing device) 712, a weed/plant killer with an integrated insecticide/pesticide killer device 715 to keep the surroundings clear from weed/plant or insecticide/pesticide infestation, a communication device 713 to send/receive signals, and a renewable energy generating device such as solar cells module or photovoltaics cells module to convert ambient/solar light into additional electricity are all integrated into a single box, and makes it ideal for off-grid applications. The said Remobox station also has a thermal management device 737 that is either passive or active in order to make sure the Remobox station is operable under different climate or environmental conditions. In order to maintain the security and safety of the landing platform and deployment system 700 (including all of the other peripherals associated with the operation of the unmanned vehicle), a fence 710 with an active deterring mechanism such as electrical shocking can be utilized to keep away animals and humans from tampering or harming the landing platform and deployment system 700 (including all of the other peripherals associated with the operation of the unmanned vehicle). In this embodiment, the solar cell module(s) have the capability of staying planar or moving along certain axis in order to keep the surface the solar cells clean, orient the solar cells in a direction to further improve the solar energy conversion efficiency, etc. Furthermore, the exterior look of the landing and deployment system, unmanned vehicle, and Remobox is designed to have the theme relevant to a certain locality (that has been selected by the representing authorities of that particular locality) using the appropriate color/texture/markings such as having sand colored exterior for desert areas such as a locality in Africa or forestry colored exterior for particular city in the vicinity of jungles, etc.

Although the above description contains much specificity, this should not be construed as limiting the scope of the embodiments but merely providing illustration of the foreseeable embodiments. The above-stated advantages of the embodiments should not be construed especially as limiting the scope of the embodiments but merely to explain possible achievements if the described embodiments are put into practice. Thus, the scope of the embodiments should be determined by the claims and their equivalents, rather than by the examples given.

REFERENCE NUMBERS 1 unmanned vehicle charging system
1b unmanned vehicle charging system
2 unmanned vehicle landing platform and deployment system
3 unmanned vehicle landing platform and deployment system
3a unmanned vehicle landing platform and deployment system
5 unmanned vehicle landing platform and deployment system
31 unmanned vehicle's integrated weather station and power module
90 landing platform
100 landing pad
101 unmanned vehicle
102 positive electrode
103 negative electrode
104 beacon unit
111 charging contact surface or charging plate or charging element
112 charging contact surface or charging plate or charging element
121 polarity switch (also known as switchable rectifier)
122 power module or an energy storage and conversion device or battery
123 positive pole
124 negative pole
128 processing unit
198 unmanned vehicle positional alignment unit
201 first longitudinal adjustment beam
202 second longitudinal adjustment beam
203 lateral directions
211 first lateral adjustment beam
212 second lateral adjustment beam
213 longitudinal directions
221 motor
240 presence sensor
250 presence sensor
311 anemometer
312 temperature sensor
313 weather vane
314 camera
315 network unit
321 enclosure box
400 unmanned vehicle storage box
410 landing platform
430 unmanned vehicle hangar module
440 unmanned vehicle container
441 landing deck
442 side panel
445 side panel
450 unmanned vehicle landing-cum-storage tray
470 unmanned vehicle landing platform
490 unmanned vehicle landing platform extension mechanism
601 cover
601a cover
603 movable cover portion 607 fixed cover portion
700 Unmanned vehicle deployment, landing, storage, and charging base
701 Opening doors for the unmanned vehicle deployment, landing, storage, and charging base
701a First alignment beams/mechanism to align the unmanned vehicle after its landing onto the landing pad
702 Second alignment beams/mechanism to align the unmanned vehicle after its landing onto the landing pad and also the charging connections
703 Landing platform with smart landing and alignment mechanisms for the unmanned vehicle
704 Base section of the landing with smart landing and alignment mechanisms for the unmanned vehicle
705 Lifting/descending mechanism to move up or down the base section of the landing with smart landing and alignment mechanisms for the unmanned vehicle and the landing platform with smart landing and alignment mechanisms for the unmanned vehicle
706 Weather station with weather sensors
707 Communication/control module
708 QR code marked landing platform with smart landing and alignment mechanisms for the unmanned vehicle
709 QR code marked landing platform that has a recess with smart landing and alignment mechanisms for the unmanned vehicle
710 Fence with an active deterrent mechanism such as electric fence
711 Remobox station containing the power module, switchable rectifier, communication/control module, and weather station module
712 An advanced weather station module that is comprised of single or multiple sensors (such as wind direction, wind speed, hyper-local weather sensors, temperature, rain, pressure, etc.)
713 Communication device such as antenna, Bluetooth, GSM, wireless router, etc.
714 Security device such as a camera (optical, thermal, LIDAR, etc.)
715 Weed-killer spray, plant-killer, pesticide/insecticide, etc. control device
716 Unmanned vehicle with charging mechanism integrated into the body of the unmanned vehicle
717 Landing mechanism for the unmanned vehicle
718 Energy storage and power generation module for the unmanned vehicle
719 Positive terminal charging contact #1 attached to the landing mechanism of the unmanned vehicle
720 Negative terminal charging contact #2 attached to the landing mechanism of the unmanned vehicle
721 Negative terminal of the energy storage and power generation module for the unmanned vehicle
722 Positive terminal of the energy storage and power generation module for the unmanned vehicle
723 Payload for the unmanned vehicle such as a sensing device or any other general payload devices required for the mission
724 Payload for the unmanned vehicle such as a sensing device such as a camera (optical, thermal, LIDAR, etc.)
725 Renewable energy source based power such as solar power module or photovoltaics power module
726 Fuel cell based power module with its fuel storage medium
727 Battery or other relevant power sources
728 Security device such as anti-theft, anti-tamper, etc. to monitor the security and whereabouts, etc. of the module
729 Renewable energy source based power such as wind power, etc.
730 Seat for base section of the landing with smart landing and alignment mechanisms for the unmanned vehicle
731 Negative terminal charging wire that connects the on-board energy storage and energy-producing device to the charging mechanism located on the landing gear of the unmanned vehicle
732 Positive terminal charging wire that connects the on-board energy storage and energy-producing device to the charging mechanism located on the landing gear of the unmanned vehicle
733 Rolling element that permits the alignment of the unmanned vehicle on the landing platform
734 Metallic charging plate that transfer the electrical energy from the power module to the on-board energy storage and energy producing device located on the unmanned vehicle
735 Capturing block to contain the rolling element that permits the alignment of the unmanned vehicle on the landing platform
736 Insulation plate that electrically isolates the metallic charging plate from the second alignment beams/mechanism
737 Passive or active thermal management device

The invention claimed is:

1. A storage unit for enclosing at least one unmanned vehicle, the storage unit comprising:
 a container configured to enclose the at least one unmanned vehicle;
 a first unmanned vehicle module configured to receive and cover the at least one unmanned vehicle, the first unmanned vehicle module comprising:
  a landing platform comprising:
   a landing area comprising:
    a predetermined charging region;
    a first charging plate; and
    a second charging plate;
    wherein the first charging plate and the second charging plate are positioned in the predetermined charging region;
   an electrical energy storage device electrically connected to each of the first charging plate and the second charging plate, and
   an unmanned vehicle alignment mechanism configured to move the at least one unmanned vehicle into the predetermined charging region, the unmanned vehicle alignment mechanism comprising:
    a first beam,
    a second beam,
    a third beam,
    a fourth beam, and
    an actuation device configured to actuate at least two of the first beam, the second beam, the third beam, and the fourth beam to push the at least one unmanned vehicle into the charging region; and
  a movable cover configured to cover the landing area and/or the first unmanned vehicle;
 at least one second unmanned vehicle module configured to receive the at least one unmanned vehicle, the at least one second unmanned vehicle module being movable into and outside the container, the at least one second unmanned vehicle module comprising:
  a landing platform comprising:

a landing area comprising:
   a predetermined charging region;
   a first charging plate; and
   a second charging plate;
      wherein the first charging plate and the second charging plate are positioned in the predetermined charging region;
   an electrical energy storage device electrically connected to each of the first charging plate and the second charging plate, and
   an unmanned vehicle alignment mechanism configured to move an unmanned vehicle into the predetermined charging region, the unmanned vehicle alignment mechanism comprising:
      a first beam,
      a second beam,
      a third beam,
      a fourth beam, and
      an actuation device configured to actuate at least two of the first beam, the second beam, the third beam, and the fourth beam to push the unmanned vehicle into the charging region;
wherein the at least one second unmanned vehicle module is adapted to be stacked vertically, the first unmanned vehicle module being adapted to be vertically stacked on top of the at least one second unmanned vehicle module;
a camera configured to receive a beacon unit light signal from the unmanned vehicle and
an unmanned vehicle controller configured to:
   select one unmanned vehicle module from a group consisting of the first unmanned vehicle module and the at least one second unmanned vehicle module,
   generate an unmanned vehicle flight instruction for landing the unmanned vehicle on the selected unmanned vehicle module according to light signal data from the camera, and
   send out the unmanned vehicle flight instruction to the unmanned vehicle.

2. The storage unit according to claim 1,
wherein the movable cover comprises an electrically insulating material configured to allow radio waves to pass through with low attenuation; and
wherein the electrically insulating material comprises canvas.

3. The storage unit according to claim 1, further comprising a mechanism configured to move the at least one second unmanned vehicle module into and out of the container.

4. The storage unit according to claim 1, further comprising:
a wind speed sensor; and
a controller module, wherein the controller module is configured to generate the unmanned vehicle flight instruction according to wind speed data from the wind speed sensor.

5. The storage unit according to claim 1, further comprising:
a wind direction sensor; and
a controller module, wherein the controller module is configured to generate the unmanned vehicle flight instruction according to wind direction data from the wind direction sensor.

6. The storage unit according to claim 1, further comprising a wireless communication unit configured to send out the unmanned vehicle flight instruction.

7. A landing and deployment system for an unmanned vehicle module, the system comprising:
a landing and deployment platform defining a landing region defining a code and a recessed area, the landing and deployment platform further comprising:
   doors parallel to each other and configured to approach or move away from each other, and
   first and second alignment mechanisms located on a moveable base section, the code and the recessed area located on the base section, the base section defining a resting seat in a fully rested state, the first and second alignment mechanisms configured to move an unmanned vehicle of the unmanned vehicle module vertically or horizontally to align with a pre-determined landing region and electrically connect an on-board charging mechanism or the unmanned vehicle to a power module of the system for charging of an on-board powering device of the unmanned vehicle;
an unmanned vehicle comprising:
   a body;
   a sensing device attached to the body, the sensing device being a camera, the code viewable by the camera;
   on-board charging elements integrated into the body and configured to contact with a smart charging mechanism located on the system; and
   rolling elements attached to the body, the rolling elements integrated into the body receivable into the recessed area of the landing region;
   the on-board powering device electrically connected to the on-board charging elements;
a smart charging mechanism comprising:
   a first charging mechanism located on the landing and deployment platform, the first charging mechanism allowing electrical contact to be made between the power module and the on-board charging elements of the unmanned vehicle via metallic contacts of the first and second alignment mechanisms; and
   a second charging mechanism located on-board the unmanned vehicle, an electrical connection selectively available via the second charging mechanism between the on-board powering device of the unmanned vehicle and the first charging mechanism on the landing and deployment platform, the first charging mechanism and the second charging mechanism being connected to a power module with first and second polarity switches;
an integrated remote box station comprising:
   a third polarity switch;
   a standalone power module configured to provide electrical energy to the on-board powering device of the unmanned vehicle via the third polarity switch;
   a security and sensing device comprising a camera providing a virtual-line-of-sight to the unmanned vehicle, the landing and deployment platform, and/or a remote user;
   a weather station comprising a sensor configured to measure an environmental condition, the sensor being a wind direction sensor, a wind speed sensor, a temperature sensor, a rain sensor, a humidity sensor, a pressure sensor, a solar radiation measuring sensor, a disdrometer, a transmissometer, a UV light measuring sensor, a ceilometer, or a dew-point measuring sensor, the sensor being able to calibrate itself, the system configured to use one of wireless and wired communication to feed sensor data to the unmanned vehicle, the landing and deployment platform, and/or the remote user; the sensor having its own power module;
a communication/control module;
a weed/plant killer integrated with an insecticide/pesticide killer device;
an antenna; and
a source of renewable power;
a fence comprising a deterring mechanism;
a security device configured to notify an operator regarding a security breach;
a thermal management device configured to manage a temperature of the landing and deployment platform and/or the remote box station;
a cover covering the landing and deployment platform.

8. The landing and deployment system of claim 7, wherein:
the code is a QR code or a light pattern, the light pattern generated by a light illuminating device comprising a control configured to facilitate generation of the pattern;
the landing and deployment platform comprises a photovoltaic module configured to generate additional electrical energy, the photovoltaic module able to rotate about an axis;
an electrically insulating material is installed between the smart charging mechanisms and each of the first and second alignment mechanisms;
the landing and deployment platform comprises a processing unit, the processing unit of the landing and deployment platform configured to control the landing and deployment platform, the unmanned vehicle, and the remote box station;
each of the rolling elements attached to the body of the unmanned vehicle is electrically isolated from the charging mechanisms of each of the unmanned vehicle and the landing and deployment platform;
each of the charging elements of the unmanned vehicle is made of an electrically conductive material, each of the charging elements establishing electrical contact with the charging plates by physical touch;
the integrated remote box station comprises a plurality of interfaces to receive power from a plurality of energy supplies;
the security and sensing device of the remote box station comprises an anti-theft device or an anti-tamper device configured to alert a user of the landing and deployment system regarding a security breach; and
the remote box station comprises a processing unit, the processing unit of the remote box station configured to control the remote box station, the unmanned vehicle, and the landing and deployment platform.

9. The landing and deployment system of claim 7, wherein:
the code is a QR code or a light pattern, the light pattern generated by a light illuminating device comprising a control configured to facilitate generation of the pattern.

10. The landing and deployment system of claim 7, wherein:
the landing and deployment platform comprises a photovoltaic module configured to generate additional electrical energy, the photovoltaic module able to rotate about an axis.

11. The landing and deployment system of claim 7, wherein:
an electrically insulating material is installed between the smart charging mechanisms and each of the first and second alignment mechanisms.

12. The landing and deployment system of claim 7, wherein:
the landing and deployment platform comprises a processing unit, the processing unit of the landing and deployment platform configured to control the landing and deployment platform, the unmanned vehicle, and the remote box station.

13. The landing and deployment system of claim 7, wherein:
each of the rolling elements attached to the body of the unmanned vehicle is electrically isolated from the charging mechanisms of each of the unmanned vehicle and the landing and deployment platform.

14. The landing and deployment system of claim 7, wherein:
each of the charging elements of the unmanned vehicle is made of an electrically conductive material, each of the charging elements establishing electrical contact with the charging plates by physical touch.

15. The landing and deployment system of claim 7, wherein:
the integrated remote box station comprises a plurality of interfaces to receive power from a plurality of energy supplies.

16. The landing and deployment system of claim 7, wherein:
the security and sensing device of the remote box station comprises an anti-theft device or an anti-tamper device configured to alert a user of the landing and deployment system regarding a security breach.

17. The landing and deployment system of claim 7, wherein:
the remote box station comprises a processing unit, the processing unit of the remote box station configured to control the remote box station, the unmanned vehicle, and the landing and deployment platform.

* * * * *